(12) United States Patent
Wippermann et al.

(10) Patent No.: US 12,106,500 B2
(45) Date of Patent: Oct. 1, 2024

(54) MULTI-CHANNEL IMAGING DEVICE AND DEVICE HAVING A MULTI-APERTURE IMAGING DEVICE

(71) Applicant: Fraunhofer-Gesellschaft zur Förderung der angewandten Forschung e.V., Munich (DE)

(72) Inventors: Frank Wippermann, Jena (DE); Jacques Duparré, Jena (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 223 days.

(21) Appl. No.: 17/540,520

(22) Filed: Dec. 2, 2021

(65) Prior Publication Data

US 2022/0094902 A1 Mar. 24, 2022

Related U.S. Application Data

(63) Continuation of application No. PCT/EP2020/065626, filed on Jun. 5, 2020.

(30) Foreign Application Priority Data

Jun. 6, 2019 (DE) ...................... 10 2019 208 294.7

(51) Int. Cl.
*H04N 13/243* (2018.01)
*G06T 7/55* (2017.01)
(52) U.S. Cl.
CPC ............. *G06T 7/55* (2017.01); *H04N 13/243* (2018.05); *G06T 2207/20212* (2013.01)

(58) Field of Classification Search
CPC ........................ G06T 7/55; H04N 13/243–25
See application file for complete search history.

(56) References Cited

U.S. PATENT DOCUMENTS 9,892,488 B1 * 2/2018 Brailovskiy ............... G06T 5/50
10,334,172 B2 6/2019 Wippermann et al.
(Continued)

FOREIGN PATENT DOCUMENTS

CN 105842847 A 8/2016
CN 109479126 A 3/2019
(Continued)

OTHER PUBLICATIONS

Korean language office action dated Jun. 20, 2023, issued in application No. KR 10-2022-7000510.
(Continued)

*Primary Examiner* — Frank Johnson
(74) *Attorney, Agent, or Firm* — McClure, Qualey & Rodack, LLP

(57) ABSTRACT

A multi-aperture imaging device includes image sensor means with a plurality of image sensor areas and a plurality of optical channels, wherein each optical channel includes an optic for imaging a partial field of view of a total field of view onto an image sensor area of the image sensor means associated with the optical channel. The plurality of optical channels is configured to image the total field of view completely. A first partial field of view of the total field of view and a second partial field of view of the total field of view are captured by a different number of optical channels.

31 Claims, 31 Drawing Sheets

(56) References Cited

U.S. PATENT DOCUMENTS

| | | | |
|---|---|---|---|
| 10,362,229 | B2 | 7/2019 | Wippermann et al. |
| 10,996,460 | B2 | 5/2021 | Wippermann et al. |
| 2007/0285554 | A1* | 12/2007 | Givon .................. G03H 1/268 348/E13.019 |
| 2010/0007718 | A1* | 1/2010 | Rohaly, Jr. ........... H04N 13/218 348/46 |
| 2010/0328471 | A1 | 12/2010 | Boland |
| 2013/0033577 | A1 | 2/2013 | Lo |
| 2014/0111650 | A1 | 4/2014 | Georgiev et al. |
| 2015/0035988 | A1* | 2/2015 | Traub .................... H04N 23/90 348/159 |
| 2015/0293328 | A1 | 10/2015 | Laroia |
| 2016/0150142 | A1* | 5/2016 | Lapstun ................ G03B 35/02 348/36 |
| 2016/0255330 | A1* | 9/2016 | Wippermann ....... H04N 13/232 348/49 |
| 2016/0381345 | A1 | 12/2016 | Wu |
| 2017/0111558 | A1* | 4/2017 | Brueckner ........... H04N 17/002 |
| 2017/0118388 | A1 | 4/2017 | Wippermann et al. |
| 2017/0264825 | A1* | 9/2017 | Wippermann ....... H04N 23/687 |
| 2018/0172945 | A1 | 6/2018 | Wippermann et al. |
| 2018/0176437 | A1 | 6/2018 | Wippermann et al. |
| 2018/0176471 | A1 | 6/2018 | Wippermann et al. |
| 2018/0176472 | A1 | 6/2018 | Wippermann et al. |
| 2018/0176473 | A1 | 6/2018 | Wippermann et al. |
| 2018/0184068 | A1* | 6/2018 | Wippermann ......... H04N 23/90 |
| 2018/0198963 | A1 | 7/2018 | Wippermann et al. |
| 2018/0241920 | A1 | 8/2018 | Wippermann et al. |
| 2019/0068950 | A1* | 2/2019 | Wippermann ......... H04N 23/45 |
| 2019/0179149 | A1* | 6/2019 | Curtis ................ G02B 27/0172 |
| 2019/0230262 | A1* | 7/2019 | Wang .................... H04N 23/56 |
| 2020/0029023 | A1 | 1/2020 | Wippermann et al. |
| 2020/0160012 | A1* | 5/2020 | Nunnink ............ G06K 7/10722 |

FOREIGN PATENT DOCUMENTS

| | | |
|---|---|---|
| DE | 102013222780 B3 | 4/2015 |
| DE | 102014213371 B3 | 8/2015 |
| DE | 102015215833 A1 | 2/2017 |
| DE | 102015215837 A1 | 2/2017 |
| DE | 102015215840 B4 | 3/2017 |
| DE | 102015216140 A1 | 3/2017 |
| DE | 102015215836 B4 | 5/2017 |
| DE | 102015215844 B4 | 5/2017 |
| DE | 102015215841 B4 | 6/2017 |
| DE | 102015215845 B4 | 6/2017 |
| DE | 10 2017 206 442 A1 | 10/2018 |
| DE | 102017206429 A1 | 10/2018 |
| DE | 102015220566 B4 | 3/2021 |
| JP | 2000-112019 A | 4/2000 |
| JP | 2016-500962 A | 1/2016 |
| JP | 2018-532143 A | 11/2018 |
| KR | 10-2018-0042338 A | 4/2018 |
| KR | 10-2018-0042340 A | 4/2018 |
| TW | 201806383 A | 2/2018 |
| WO | 2011038457 A1 | 4/2011 |
| WO | 2016154470 A1 | 9/2016 |
| WO | 2018/189321 A1 | 10/2018 |

OTHER PUBLICATIONS

English language translation of office action dated Jun. 20, 2023 (pp. 1-8 of attachment).

English translation of International Search Report issued in application No. PCT/EP2020/065626, mailed Jul. 20, 2020.

Japanese language office action dated Dec. 21, 2022, issued in application No. JP 2021-572325.

English language translation of office action dated Dec. 21, 2022, issued in application No. JP 2021-572325 (pp. 1-4 of attachment).

Notice of Allowance dated Nov. 6, 2023 in Japanese patent application No. 2021-572325.

Chinese language office action dated Feb. 7, 2024, issued in application No. CN 202080056095.2.

* cited by examiner

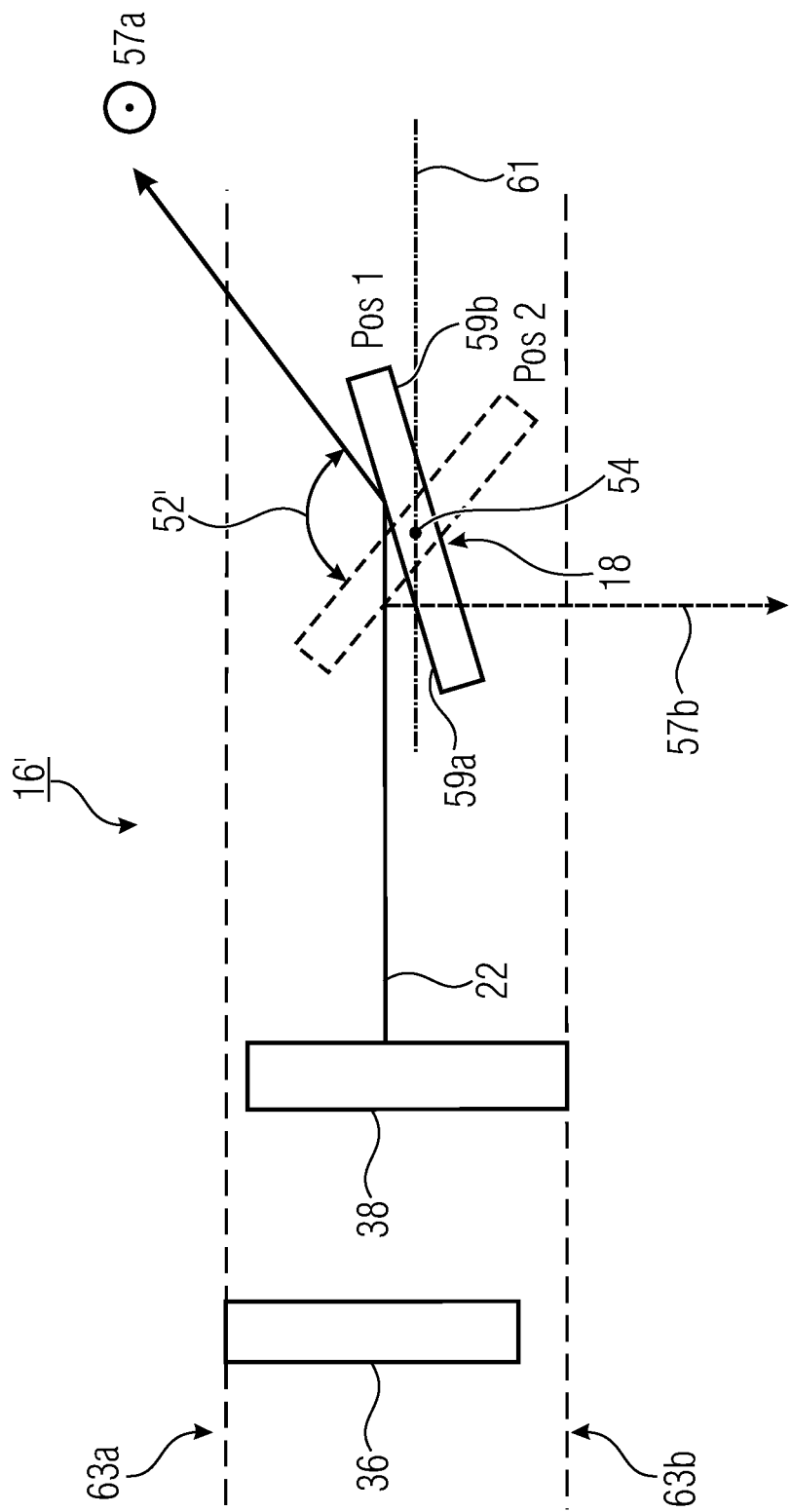

MULTI-CHANNEL IMAGING DEVICE AND DEVICE HAVING A MULTI-APERTURE IMAGING DEVICE

CROSS-REFERENCES TO RELATED APPLICATIONS

This application is a continuation of copending International Application No. PCT/EP2020/065626, filed Jun. 5, 2020, which is incorporated herein by reference in its entirety, and additionally claims priority from German Application No. DE 10 2019 208 294.7, filed Jun. 6, 2019, which is incorporated herein by reference in its entirety.

BACKGROUND OF THE INVENTION

The present invention relates to a multi-channel imaging device and to a device having a multi-channel imaging device. The present invention further relates to a portable device having a multi-aperture imaging device.

Conventional cameras transmit the total field of view within one channel and are limited in terms of their miniaturization. In mobile devices such as smart phones, for example, two cameras are employed which are oriented in and counter to the direction of the surface normal of the display.

SUMMARY

According to an embodiment, a multi-aperture imaging device may have: an image sensor unit with a plurality of image sensor regions; a plurality of optical channels, wherein each optical channel comprises an optic for imaging a partial field of view of a total field of view onto an image sensor area of the image sensor unit associated with the optical channel; wherein the plurality of optical channels is configured to image the total field of view completely; and wherein a first partial field of view of the total field of view and a second partial field of view of the total field of view are captured by a different number of optical channels.

A core idea of the present invention consists in having found that, for combining partial images of a total image, it is sufficient to determine depth information for the part of the total image that is added to a reference part, and that stereoscopic information is not imperatively needed for the reference part, which allows for omitting the channels and simultaneously avoiding occlusions for the image parts to be changed.

According to an embodiment, a multi-aperture imaging device includes image sensor means with a plurality of image sensor regions; and a plurality of optical channels, wherein each optical channel includes an optic for imaging a partial field of view of a total field of view onto an image sensor region of the image sensor means associated with the optical channel. The plurality of optical channels is configured to image the total field of view. A first partial field of view of the total field of view and a second partial field of view of the total field of view are captured by a different number of optical channels.

BRIEF DESCRIPTION OF THE DRAWINGS

Embodiments of the present invention will be detailed subsequently referring to the appended drawings, in which:

FIG. 5c shows a schematic sectional side view of a modified imaging device wherein the beam-deflecting means can be rotationally switched between a first position of the first operating state and a second position;

FIG. 12a shows a schematic perspective view of a multi-aperture imaging device according to an embodiment, wherein the arrangement of optics of optical channels is changed in comparison with the multi-aperture imaging device of FIG. 11a;

DETAILED DESCRIPTION OF THE INVENTION

Figure 1:
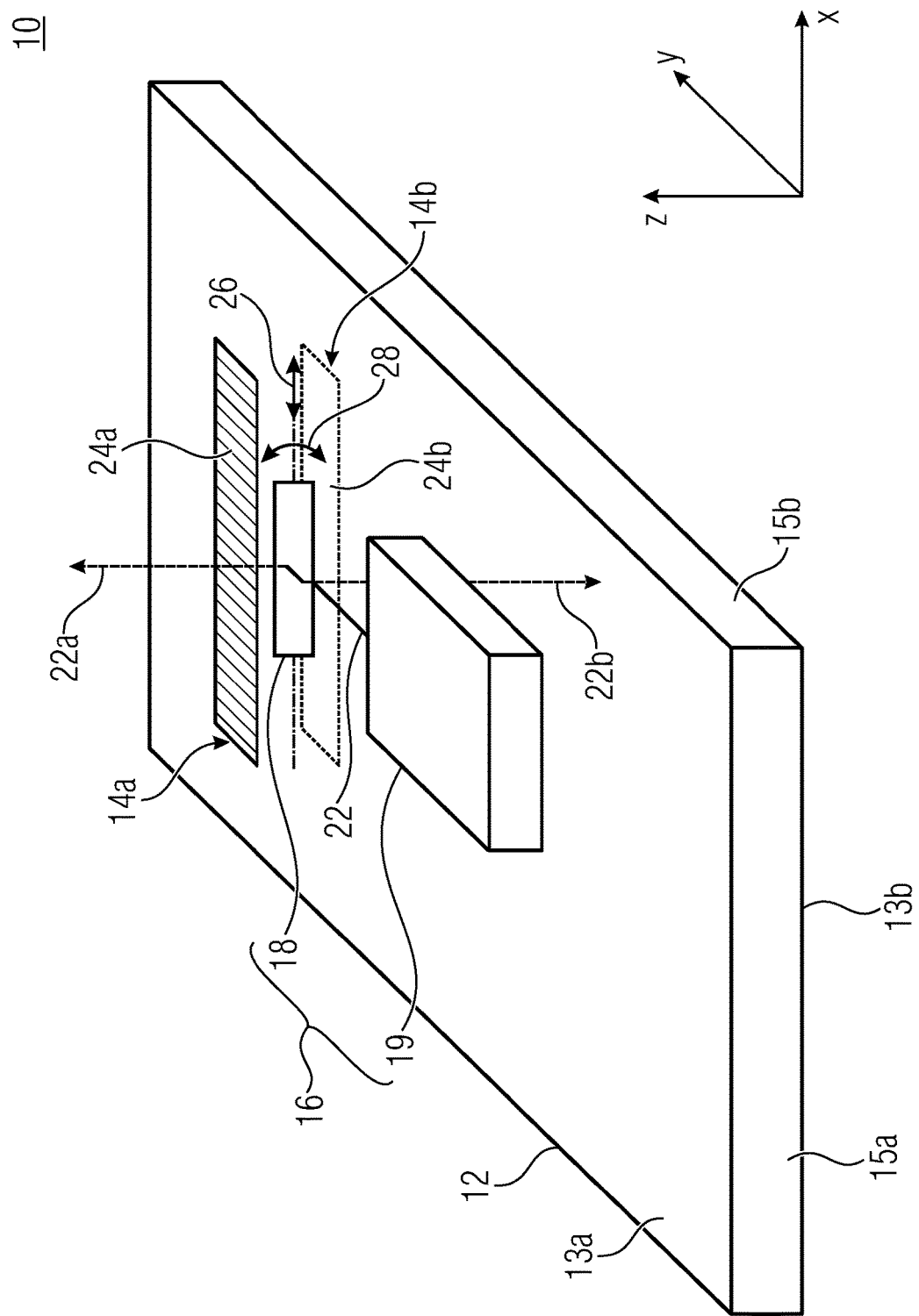
FIG. 1 shows a schematic perspective view of a device in accordance with an embodiment.

Before embodiments of the present invention will be explained in more detail below with reference to the drawings, it shall be noted that elements, objects and/or structures which are identical and have identical functions or actions will be provided with identical reference numerals in the various figures, so that the descriptions, presented in different embodiments, of said elements are interchangeable and/or mutually applicable.

Subsequent embodiments relate to the use of different wavelength ranges for imaging on an image sensor. The wavelength range relates to electromagnetic radiation, in particular to light. For example, an example for different wavelength ranges is the use of visible light, e.g., in a wavelength range of approximately 380 nm to approximately 650 nm. For example, a wavelength range different thereto may be an ultraviolet spectrum having wavelengths of less than 380 nm and/or an infrared spectrum having wavelengths of more than 700 nm, approximately 1000 nm to approximately 1000 µm, in particular a near-infrared spectrum having wavelengths in a range of approximately 700 nm or 780 nm up to approximately 3 µm. The first and the second wavelength range comprise at least partially different wavelengths. According to an embodiment, the wavelength ranges do not comprise any overlaps. According to an alternative embodiment, the wavelength ranges comprise an overlap, however, which is only partial, so that there are wavelengths in both ranges that enable a differentiation.

Subsequently described embodiments relate to beam-deflecting areas of beam-deflecting means. A beam-deflecting area may a surface area or an area of an object that is configured to perform a deflection of an optical path in at least one wavelength range. This may be a sequence of at least one applied layer such as a dielectric layer, but also electrically conductive layers that provide or adjust a reflectivity. This may be an electrically passive or active property.

In subsequently described embodiments, reference will be made to main sides and secondary sides of a device. A main side of a device may be understood, in embodiments described herein, to be a side of a housing or of the device which has a large or a largest dimension as compared to other sides. For example, a first main side may designate a front side and a second main side may designate a rear side, even though this is not to have any limiting effect. Secondary sides may be understood to mean sides or faces which connect the main sides with one another.

Even though embodiments described below relate to portable devices, the aspects set forth may readily be transferred to other mobile or immobile devices. It is understood that the described portable devices may be installed in other devices, e.g., in vehicles. Moreover, a housing of a device may be configured to be non-portable. This is why the embodiments described below are not intended to be limited to portable devices but may refer to any implementation of a device.

FIG. 1 shows a schematic perspective view of a portable device 10 in accordance with an embodiment. The portable device 10 includes a housing 12 comprising a first transparent area 14a and a second transparent area 14b. For example, the housing 12 may be formed of an opaque plastic, a metal or the like. The transparent areas 14a and/or 14b may be integrally formed with the housing 12 or be formed in a multi-part manner. The transparent areas 14a and/or 14b may be recesses in the housing 12, for example. Alternatively, a transparent material may be arranged in an area of the recesses or of the transparent areas 14a and/or 14b. Transparent materials of the transparent areas 14a and/or 14b may be transparent at least within such a wavelength range of an electromagnetic radiation to which an imaging device, in particular a multi-aperture imaging device 16, or an image sensor of same, is receptive. This means that the transparent areas 14a and/or 14b may be configured to be partly or fully opaque in wavelength ranges different from the former. For example, the imaging device 16 may be configured to capture a first and a second wavelength range, such as a visible wavelength range, and to capture a wavelength range that at least partially differs therefrom.

The imaging device or multi-aperture imaging device 16 is disposed inside the housing 12. The imaging device 16 includes beam-deflecting means 18 and image capturing means 19. The image capturing means 19 may include two or more optical channels, each of which comprises one or more optics for changing (e.g., concentrating, focusing or scattering) an optical path of the imaging device 16, and an image sensor. Optics may be disjunctive, or undivided or channel-individual, with respect to different optical channels. Alternatively, it is also possible for the optics to comprise elements that together function for two, several, or all optical channels, such as a convergent lens, a mutual filter or the like combined with a channel-individual lens.

For example, the image capturing means 19 may comprise one or more image sensors whose assigned optical paths are directed through one or more optical channels onto the beam-deflecting means 18 and are deflected by the latter. As is described in the context of FIG. 6a, the at least two optical channels may be deflected such that they will capture mutually overlapping partial fields of view (partial object areas) of a total field of view (total object area). The imaging device 16 may be referred to as a multi-aperture imaging device. Each image sensor area of the image sensor may be assigned to an optical channel. A structural gap may be arranged between adjacent image sensor areas, or the image sensor areas may be implemented as different image sensors or parts thereof, however, alternatively or additionally, it is also possible that adjacent image sensor areas directly border on each other and are separated from each other through the readout of the image sensor.

The portable device 10 has a first operating state and a second operating state. The operating state may be correlated with a location, position or orientation of the beam-deflecting means 18. This may influence which wavelength range is deflected by the beam-deflecting means 16, by using sides with a different effectiveness for the deflection. Alternatively or additionally, two different operating states may influence the direction into which the optical path is deflected. In the exemplary multi-aperture imaging device 16, there may be 4 operating states, for example, two for two different viewing directions and two for the different wavelength ranges. One reason for this is that the beam-deflecting means 16 comprises a first beam-deflecting area that is operative for the first wavelength range of electromagnetic radiation passing through the optical channel; and comprises a second beam-deflecting area that is operative for the second wavelength range of electromagnetic radiation passing through the optical channel, the second wavelength range being different from the first wavelength range.

With respect to the viewing directions, in the first operating state, the beam-deflecting means 18 may deflect the optical path 22 of the imaging device 16 such that said optical path passes through the first transparent area 14*a*, as indicated by the optical path 22*a*. In the second operating state, the beam-deflecting means 18 may be configured to deflect the optical path 22 of the imaging device 16 such that said optical path passes through the second transparent area 14*b*, as indicated by the optical path 22*b*. This may also be understood to mean that the beam-deflecting means 18 directs the optical path 22 through one of the transparent areas 14*a* and/or 14*b* at one point in time and on the basis of the operating state. On the basis of the operating state, a position of a field of view (object area) captured by the imaging device 16 may be arranged in a manner varying in space.

The first beam-deflecting area that is operative for the first wavelength range and the second beam-deflecting area that is operative for the second wavelength range may be used alternately in order to deflect the optical paths of the optical channels, or the optical path 22. This enables directing towards the image sensor the part of the spectrum for which the beam-deflecting area is operative. For example, the beam-deflecting area may comprise a band pass functionality and may deflect, i.e. reflect, the wavelength ranges the band pass functionality is configured for, while other wavelength ranges are suppressed, filtered out or at least strongly attenuated, e.g. by at least 20 dB, at least 40 dB or at least 60 dB.

The beam-deflecting areas may be arranged on a same side of the beam-deflecting means 18, offering advantages with beam-deflecting means that may be translationally displaced. Alternatively or additionally, different beam-deflecting areas may also be arranged at different sides of the beam-deflecting means 18, wherein said areas may face the image sensor alternately based on a rotational movement of the beam-deflecting means 18. In this case, any tilt angle may be used. However, when using two possibly opposite viewing directions of the multi-aperture imaging device 16, it is advantageous to select an angle of approximately 45° so that a rotational movement of 90° is sufficient to change the viewing direction. On the other hand, with only one viewing direction, a further degree of freedom may be selected.

Through alternately turning different beam-deflecting areas to face, the total field of view of the respective viewing direction may be captured with different wavelength ranges, due to the fact that the multi-aperture imaging device is configured to capture with the image sensor a first capturing of the total field of view using the first beam-deflecting area so that the first capturing is based on the first wavelength range; and to capture with the image sensor a second capturing of the total field of view using the second beam-deflecting area so that the second capturing is based on the second wavelength range. Thus, for example, a wavelength range that is not visible for the human eye may be used to obtain additional image information such as depth maps.

The portable device 10 may include a first diaphragm 24*a* and a second diaphragm 24*b*. The diaphragm 24*a* is arranged in an area of the transparent area 14*a* and is configured to at least partly optically close the transparent area 14*a* when the diaphragm 24*a* is in a closed state. In accordance with an embodiment, the diaphragm 24*a* is configured to close the transparent area 14*a* fully or at least 50%, 90% or at least 99% of the surface area of the transparent area 14*a* when the diaphragm is in the closed state. The diaphragm 24*b* is configured to close the transparent area 14*b* in the same or a similar manner as described for the diaphragm 24*a* in the context of the transparent area 14*a*. In the first operating state, during which the beam-deflecting means 18 deflects the optical path 22 toward the optical path 22*a*, the diaphragm 24*b* may at least partly optically close the transparent area 14*b* so that stray light enters the housing 12 to a small extent or possibly not at all through the transparent area 14*b*. This enables a small impact on the capturing of the field of view in the first operating state by stray light entering the diaphragm 14*b*. In the second operating state, in which, e.g., the optical path 22*b* exits the housing 12, the diaphragm 24*a* may at least partly optically close the transparent area 14*a*. In simplified terms, the diaphragms 24*a* and/or 24*b* may be configured such that they close transparent areas 14*a* and/or 14*b* such that stray light enters to a small extent, or does not enter at all, through them from undesired directions (in which, e.g., the captured field of view is not located). The diaphragms 24*a* and/or 24*b* may be configured to be continuous and may be arranged in each case in relation to all of the optical channels of the imaging device 16. This means that on the basis of the respective operating state, the diaphragms 24*a* and 24*b* may be used by any of the optical channels of the multi-aperture imaging device. In accordance with an embodiment, one diaphragm 24*a* or 24*b*, which is used by all of the optical channels, is arranged rather than individual round diaphragms being arranged for each optical channel. The diaphragms 24*a* and/or 24*b* may have, e.g., rectangular, oval, round or elliptical shapes, in line with a polygon chain.

Switching between the first and second operating states may include, e.g., a movement of the beam-deflecting means 18 on the basis of a translational movement 26 and/or on the basis of a rotational movement 28.

The diaphragms 24*a* and/or 24*b* may be configured as mechanical diaphragms, for example. Alternatively, the diaphragms 24*a* and/or 24*b* may be configured as electrochromic diaphragms. This enables using a small number of mechanically moveable parts. Moreover, configuring the diaphragms 24*a* and/or 24*b* as electrochromic diaphragms enables noiseless opening and/or closing of the transparent areas 14*a* and/or 14*b* as well as an implementation that can be readily integrated into an optic of the portable device 10. For example, the diaphragms 24*a* and/or 24*b* may be configured such that they are hardly or not at all perceived by a user when they are in a closed state since there are few optical differences as compared to the housing 12.

The housing 12 may be configured to be flat. For example, the main sides 13*a* and/or 13*b* may be spatially arranged within an x/y plane or a plane parallel thereto. Secondary sides or secondary faces 15*a* and/or 15*b* located between the main sides 13*a* and 13*b* may be spatially arranged such that they are oblique or perpendicular thereto, it being possible for the main sides 13*a* and/or 13*b* and/or the secondary sides 15*a* and/or 15*b* to be configured to be curved or planar. An extension of the housing 12 along a first housing direction z between the main sides 13*a* and 13*b*, for example in a manner that is parallel or anti-parallel to a surface normal of a display of the portable device 10, may be small as compared to further dimensions of the housing 12 along further extensions, i.e., along an extension direction of the main side 13a and/or 13b. The secondary sides 15a and 15b may be parallel or anti-parallel to the surface normal of a display. The main sides 13a and/or 13b may be spatially arranged perpendicularly to a surface normal of a display of the portable device 10. Thus, for example, an extension of the housing along the x direction and/or along the y direction may be at least three times, at least five times or at least seven times an extension of the housing 12 along the first extension z. In simplified terms, however without having any limiting effect, the extension of the housing z may be understood to be the thickness or depth of the housing 12.

Figure 2:
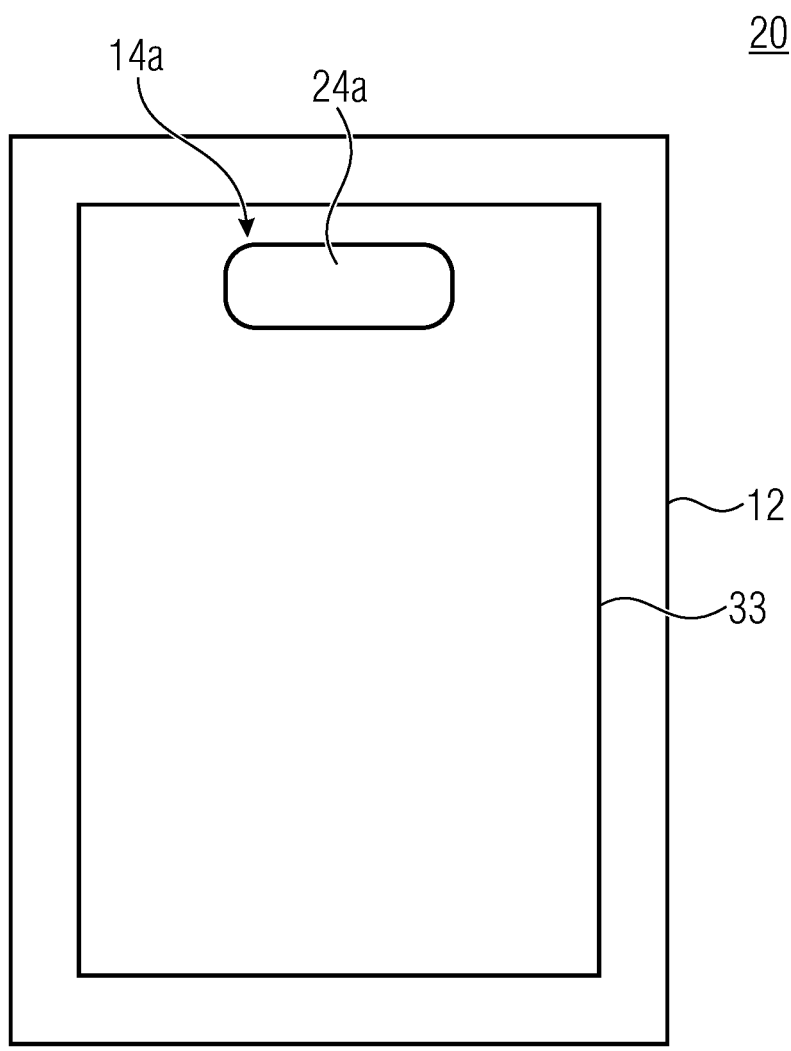
FIG. 2 shows a schematic view of a main side of a device in accordance with a further embodiment.

FIG. 2 shows a schematic view of a main side of a portable device 20 in accordance with an embodiment. The portable device may include the device 10. The portable device 20 may include a display 33, for example a screen. For example, the device 20 may be a portable communication device such as a mobile phone (smartphone), a tablet computer, a mobile music player, a monitor or a visual display unit, which comprises the imaging device 16. The transparent area 14a and/or the transparent area 14b may be arranged in an area of the housing 12 within which the display 33 is arranged. This means that the diaphragm 24a and/or 24b may be arranged in an area of the display 33. For example, the transparent area 14a and/or 14b and/or the diaphragm 24a and/or 24b may be concealed by the display 33. In an area of the display 33 in which the diaphragm 24a and/or 24b is arranged, information of the display may be presentable at least periodically. Said presentation of the information may be any operation of the portable device 20. For example, a view-finder function may be presentable on the display 33 wherein a field of view may be presented which is sampled or captured by the imaging device inside the housing 12. Alternatively or additionally, images which have already been captured or any other information may be presentable. In simple words, the transparent area 14a and/or the diaphragm 24a may be concealed by the display 33, so that the transparent area 14a and/or the diaphragm 24a can hardly be perceived or cannot be perceived during operation of the portable device 20.

The transparent areas 14a and 14b may each be arranged in at least one main side 13a of the housing 12 and/or in an opposite main side. In simple words, the housing 12 may have a transparent area at the front and a transparent area at the back. In this context it shall be noted that the terms front and back may be randomly replaced by other terms such as left and right, top and bottom or the like, for example, without limiting any of the embodiments described herein. In accordance with further embodiments, the transparent areas 14a and/or 14b may be arranged in a secondary side. Arranging of the transparent areas may be arbitrary and/or be dependent on directions into which the optical paths of the optical channels are deflectable.

In the area of the transparent area 14a or of the diaphragm 24a, the display 33 may be configured, for example, to be periodically deactivated while an image is being captured by means of the imaging device, or to increase transparency of the display 33 beyond the housing 12. Alternatively, the display 33 may also remain active in this area, for example when the display 33 emits no or hardly any electromagnetic radiation in a relevant wavelength range into the interior of the portable device 20 and/or of the housing 12 or toward the imaging device 16.

Figure 3A:
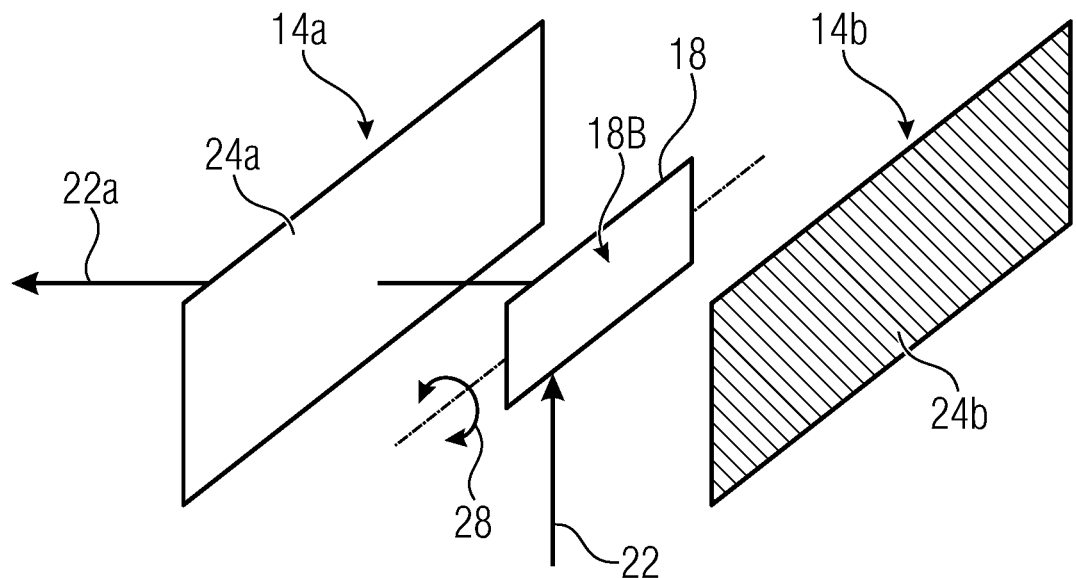
FIG. 3a shows beam-deflecting means and a state of diaphragms in a first operating state in accordance with an embodiment.

FIG. 3a shows the beam-deflecting means 18 and a state of the multi-aperture imaging device, e.g., accompanying an operating state of the first diaphragm 24a as well as of the second diaphragm 24b. E.g., the beam-deflecting means 18 deflects the optical path 22 with a beam-deflecting area 18A shown in FIG. 3b such that same passes through the transparent area 14a as the optical path 22a. The diaphragm 24b may periodically at least partly close the transparent area 14b, so that stay light does not enter, or enters to a small extent only, the interior of the housing of the portable device through the transparent area 14b.

Figure 3B:
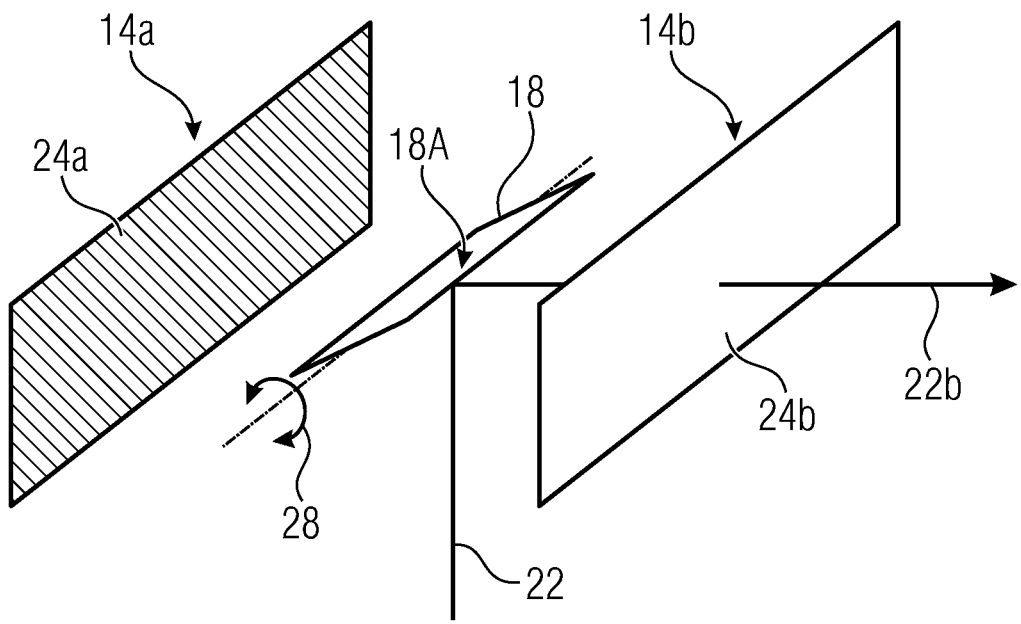
FIG. 3b shows the beam-deflecting means and the diaphragms in a second operating state.

FIG. 3b shows the beam-deflecting means 18, the diaphragm 24a and the diaphragm 24b in a second operating state, e.g., wherein the beam-deflecting means 18 comprises a different viewing direction using the rotational movement 28 by 90°. However, the beam-deflecting means now deflects the optical path with a beam-deflecting area 18B that is operative for the second wavelength range, so that capturing a total field of view arranged in the viewing direction of the optical path 22b may be carried out in the range of the second wavelength range.

When the beam-deflecting means rotates around 90° more and therefore around 180° as compared to the original state, the first viewing direction illustrated in FIG. 3a would again be adopted, however, under the influence of the beam-deflecting area 18B. Although capturing only one total field of view is possible, e.g., by the viewing direction 22a or 22b being provided using an arbitrary angle, a higher number of total fields of view may therefore be captured, e.g. 2, 3, or more.

The beam-deflecting means 18 may deflect the optical path 22 such that same passes through the transparent area 14b as the optical path 22b while the diaphragm 24a at least partly optically closes the transparent area 14a. In the second operating state, the diaphragm 24b may exhibit an at least partly or fully opened state. The opened state may relate to a transparency of the diaphragm. For example, an electrochromic diaphragm may be referred to as being opened or closed as a function of a control state, without mechanical components being moved. During the second operating state, a diaphragm 24b configured as an electrochromic diaphragm may be at least periodically partly or fully transparent to a wavelength range to be detected by the imaging device. In the first operating state as depicted in FIG. 3a, the diaphragm 24b may be partly or fully untransparent or opaque to this wavelength range. Switching between the first operating state of FIG. 3a and the second operating state of FIG. 3b may be obtained on the basis of the rotational movement 28 of the deflecting means 18 and/or on the basis of a translational movement, as described in the context of FIGS. 4a and 4b, or may include at least one of said movements.

Figure 4A:
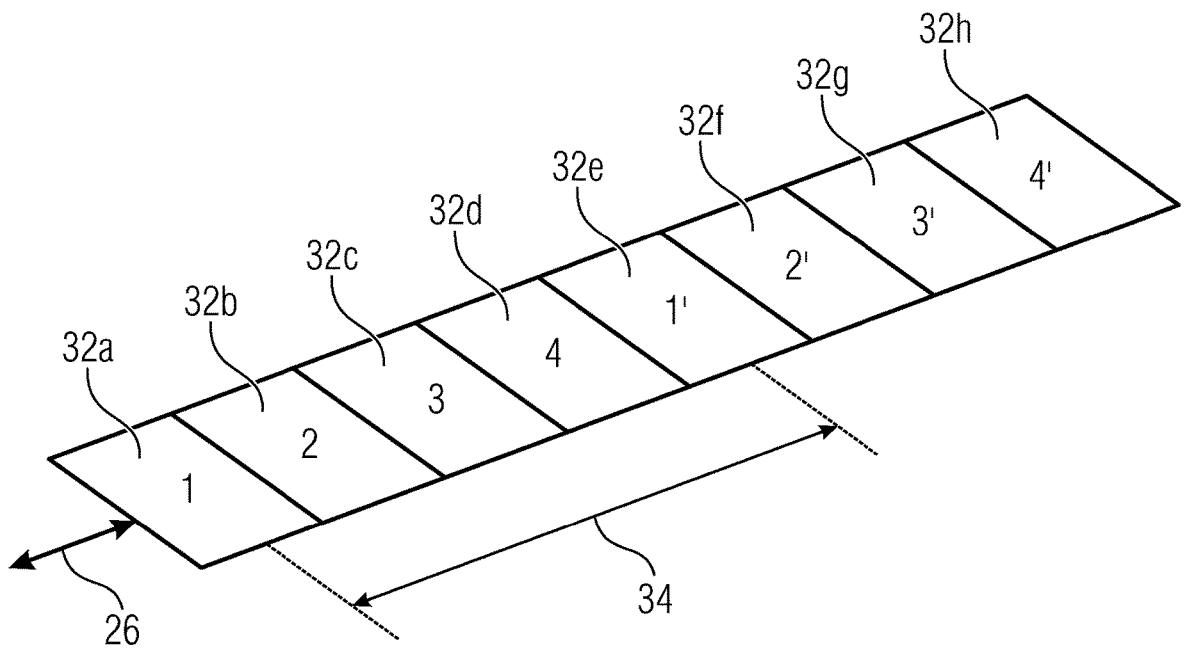
FIG. 4a shows a schematic view of the beam-deflecting means in accordance with an embodiment, said beam-deflecting means including a plurality of beam-deflecting areas.

FIG. 4a shows a schematic view of the beam-deflecting means 18, which includes a multitude of beam-deflecting elements 32a-h. For example, the imaging device may include a plurality or a multitude of optical channels, e.g., two, four or a larger number. For example, if the imaging device comprises four optical channels, the beam-deflecting means 18 may include a number of beam-deflecting elements 32a-h in accordance with a number of the optical channels multiplied by a number of operating states between which the beam-deflecting means 18 or the portable device can be switched. For example, the beam-deflecting elements 32a and 32e may by associated with a first optical channel, the beam-deflecting element 32a deflecting the optical path of the first optical channel in the first operating state, and the beam-deflecting element 32e deflecting the optical path of the first optical channel in the first operating state. Similarly, the beam-deflecting elements 32b and 32f, 32c and 32g, and 32d and 32h, respectively, may be associated with further optical channels.

The beam-deflecting means may be translationally moveable along the translational direction of movement 26 and/or may be moveable to and fro between a first position and a second position of the beam-deflecting means 18 with regard to the optical channels of the imaging device so as to change between the first operating state and the second operating state. A distance 34 across which the beam-deflecting means 18 is moved between the first position and the second position may correspond at least to a distance between four optical channels of the imaging device. The beam-deflecting means 18 may comprise block-by-block sorting of the beam-deflecting elements 32a-h. For example, the beam-deflecting elements 32a-d may be configured to deflect the optical paths of the imaging device into a first viewing direction toward a first field of view, it being possible for each optical channel to be associated with a partial field of view of the total field of view. The beam-deflecting elements 32e-h may be configured to deflect the optical paths of the imaging device into a second viewing direction toward a second field of view, it being possible for each optical channel to be associated with a partial field of view of the total field of view. In accordance with further embodiments, it is possible for optical paths of at least two optical channels to be deflected by a beam-deflecting element, so that a number of beam-deflecting elements of the beam-deflecting means 18 may be smaller.

The beam-deflecting elements 32a-h may be areas of the beam deflection means 18 which have mutually different curvatures, or they may be planar facets of a facet mirror. For example, the beam-deflecting means 18 may be understood to be an array of facets and/or deflection elements 32a-h exhibiting mutually different inclinations, so that optical paths of optical channels which impinge on the beam-deflecting means 18 are directed into mutually different partial fields of view of the field of view of the first operating state, and that optical paths which impinge on deflection elements 32e-h and are deflected by same are directed into mutually different partial fields of view of a field of view of the second operating state.

Figure 4B:
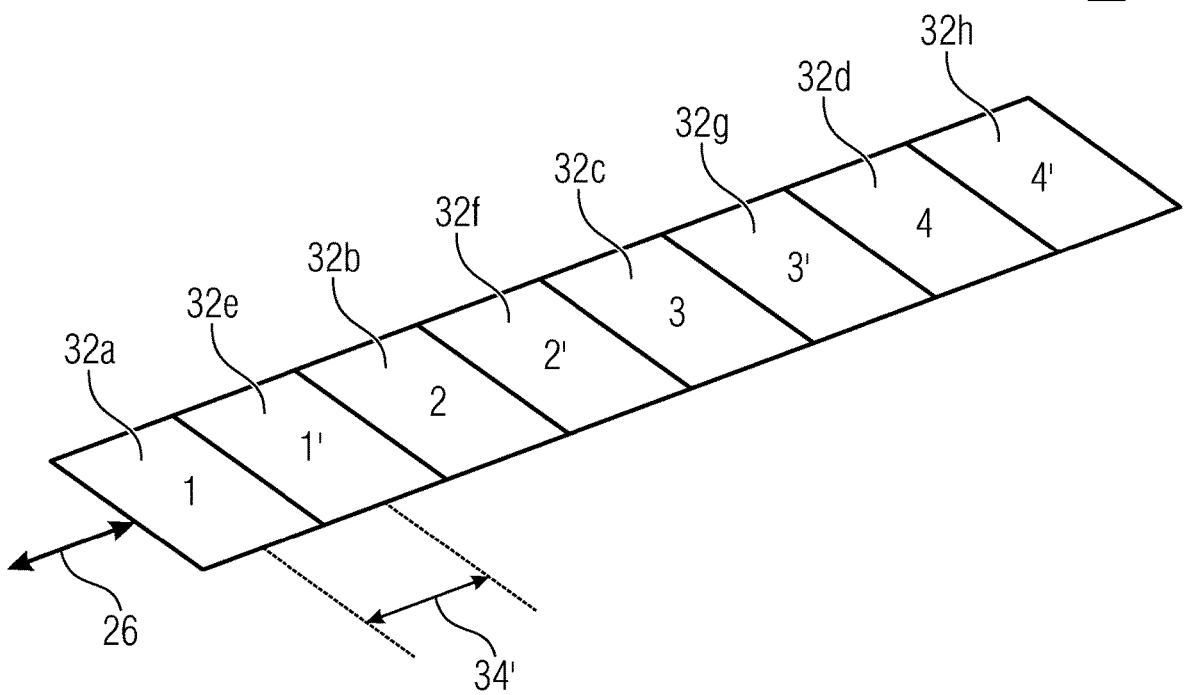
FIG. 4b shows a schematic view of the beam-deflecting means in accordance with a configuration that is an alternative to FIG. 4a, and in accordance with an embodiment.

FIG. 4b shows a schematic view of the beam-deflecting means 18 in accordance with a configuration different from the configuration of FIG. 4a. While the configuration of FIG. 4a may be understood to be block-by-block sorting of the beam-deflecting elements 32a-h on the basis of an operating state, the configuration of FIG. 4b may be understood to be channel-by-channel sorting of the beam-deflecting elements 32a-h on the basis of a sequence of the optical channels of the imaging device. The beam-deflecting elements 32a and 32e which are associated with the first optical channel may be arranged adjacently to each other. By analogy, the beam-deflecting elements 32b and 32f, 32c and 32g, and 32d and 32h, respectively, which may be associated with the optical channels 2, 3 and 4, respectively, may be arranged adjacently to each another. For example, if the optical channels of the imaging device have a sufficiently large distance to one another, a distance 34' across which the beam-deflecting means 18 is moved so as to be moved to and fro between the first position and the second position may be smaller than the distance 34, for example it may be a quarter or half thereof. This enables a further reduced structural design of the imaging device and/or of the portable device.

Instead of solely assigning the beam-deflecting elements to optical channels, they may each also provide beam-deflecting areas of different types so that a first optical channel is deflected, e.g., either by deflecting with the beam-deflecting element 32a in the first wavelength range or by deflecting with the beam-deflecting element 32e in the second wavelength range.

The rotational movement may be combined with the translational movement. Thus, e.g., it is conceivable that a translational movement switches between the wavelength ranges, i.e. the different beam-deflecting elements 32a-h are arranged at a mutual side of the beam-deflecting means 18, wherein an implementation that is reflective on both sides enables switching the viewing direction, and vice versa.

By means of FIGS. 4c-h, advantageous implementations of the beam-deflecting means 18 will be described. The explanations will illustrate a number of advantages which can be implemented individually or in any combination but are not intended to be limiting.

Figure 4C:
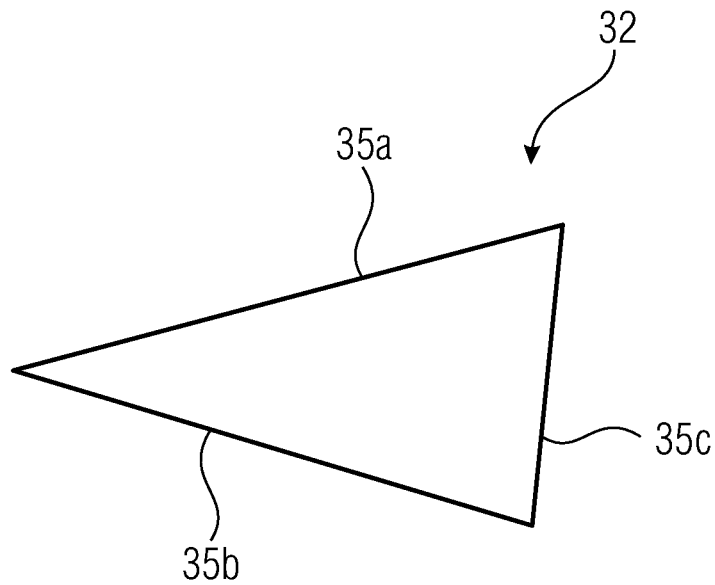
FIGS. 4c-h show advantageous implementations of beam-deflecting means of an imaging device in accordance with an embodiment.

FIG. 4c shows a schematic sectional side view of a beam-deflecting element 32 as may be employed for beam-deflecting means described herein, e.g., the beam-deflecting means 18 of FIG. 4a or 4b. The beam-deflecting element 32 may have a cross section in the manner of a polygon chain. Even though a triangular cross section is shown, any other polygon is also possible. Alternatively or additionally, the cross section may also comprise at least one curved surface; in particular with reflecting surfaces, a configuration which is planar at least in sections may be advantageous so as to avoid aberrations. Beam-deflecting areas operating differently with respect to wavelengths may be arranged at different and opposite main sides 35a and 35b.

For example, the beam-deflecting element 32 comprises a first side 35a, a second side 35b and a third side 35c. At least two sides, e.g. sides 35a and 35b, are configured to be reflective, so that the beam-deflecting element 32 is configured to be reflective on both sides. The sides 35a and 35b may be main sides of the beam-deflecting element 32, i.e., sides whose surface areas are larger than that of side 35c.

In other words, the beam-deflecting element 32 may have the shape of a wedge and be formed to be reflective on both sides. A further face which, however, is considerably smaller than the face 35c, may be arranged opposite the face 35c, i.e., between the faces 35a and 35b. In other words, in such a case the wedge formed by the faces 35a, 35b and 35c does not taper arbitrarily but is provided with a face on the pointed side and is therefore truncated.

Figure 4D:
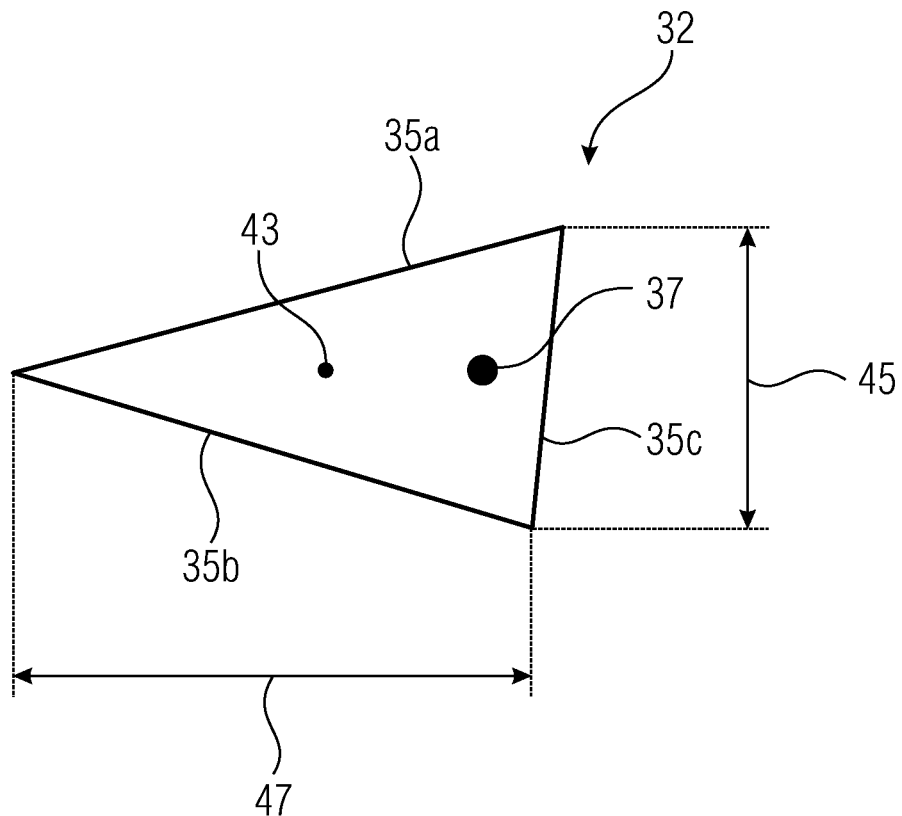

FIG. 4d shows a schematic sectional side view of the beam-deflecting element 32, wherein a suspension or a displacement axis 37 of the beam-deflecting element 32 is described. The displacement axis 37 about which the beam-deflecting element 32 may be rotationally and/or translationally moveable in the beam-deflecting means 18 may be eccentrically displaced with regard to a centroid 43 of the cross section. The centroid may alternatively also be a point which describes half the dimension of the beam-deflecting element 32 along a thickness direction 45 and along a direction 47 perpendicular thereto.

The displacement axis may be unchanged, e.g., along a thickness direction 45 and may have any offset in a direction perpendicular thereto. Alternatively, an offset along the thickness direction 45 is also conceivable. The displacement may be effected, e.g., such that upon rotation of the beam-deflecting element 32 about the displacement axis 37, a travel range is obtained which is larger than that obtained upon rotation about the centroid 43. Thus, the travel by which the edge between the sides 35a and 35b is moved upon rotation may increase, due to the displacement of the displacement axis 37, as compared to a rotation about the centroid 43, given an identical angle of rotation. Advantageously, the beam-deflecting element 32 is arranged such that the edge, i.e., the pointed side of the wedge-shaped cross section, located between the sides 35a and 35b faces the image sensor. Thus, a respectively other side 35a or 35b may deflect the optical path of the optical channels by means of small rotational movements. This shows that the rotation may be performed such that a space requirement of the beam-deflecting means along the thickness direction 45 is small since a movement of the beam-deflecting element 32 such that a main side will be perpendicular to the image sensor is not required.

The side 35c may also be referred to as a secondary side or as a rear side. Several beam-deflecting elements may be connected to one another such that a connecting element is arranged on the side 35c or extends through the cross section of the beam-deflecting elements, i.e., is arranged inside the beam-deflecting elements, for example in the area of the displacement axis 37. In particular, the holding element may be arranged to not project, or to project to a small extent only, i.e., by a maximum of 50%, by a maximum of 30% or by a maximum of 10%, beyond the beam-deflecting element 32 along the direction 45, so that the holding element does not increase or determine the extension of the overall design along the direction 45. Alternatively, the extension in the thickness direction 45 may be determined by the lenses of the optical channels, i.e., said lenses have the dimension defining the minimum thickness.

The beam-deflecting element 32 may be formed from glass, ceramics, glass ceramic, plastic, metal or any combination of said materials and/or of further materials.

In other words, the beam-deflecting element 32 may be arranged such that the tip, i.e. the edge located between the main sides 35a and 35b, points toward the image sensor. Retention of the beam-deflecting elements may be effected such that it occurs only on the rear side of, or inside, the beam-deflecting elements, i.e. the main sides are not concealed. A shared holding or connecting element may extend across the rear side 35c. The axis of rotation of the beam-deflecting element 32 may be arranged eccentrically.

Figure 4E:
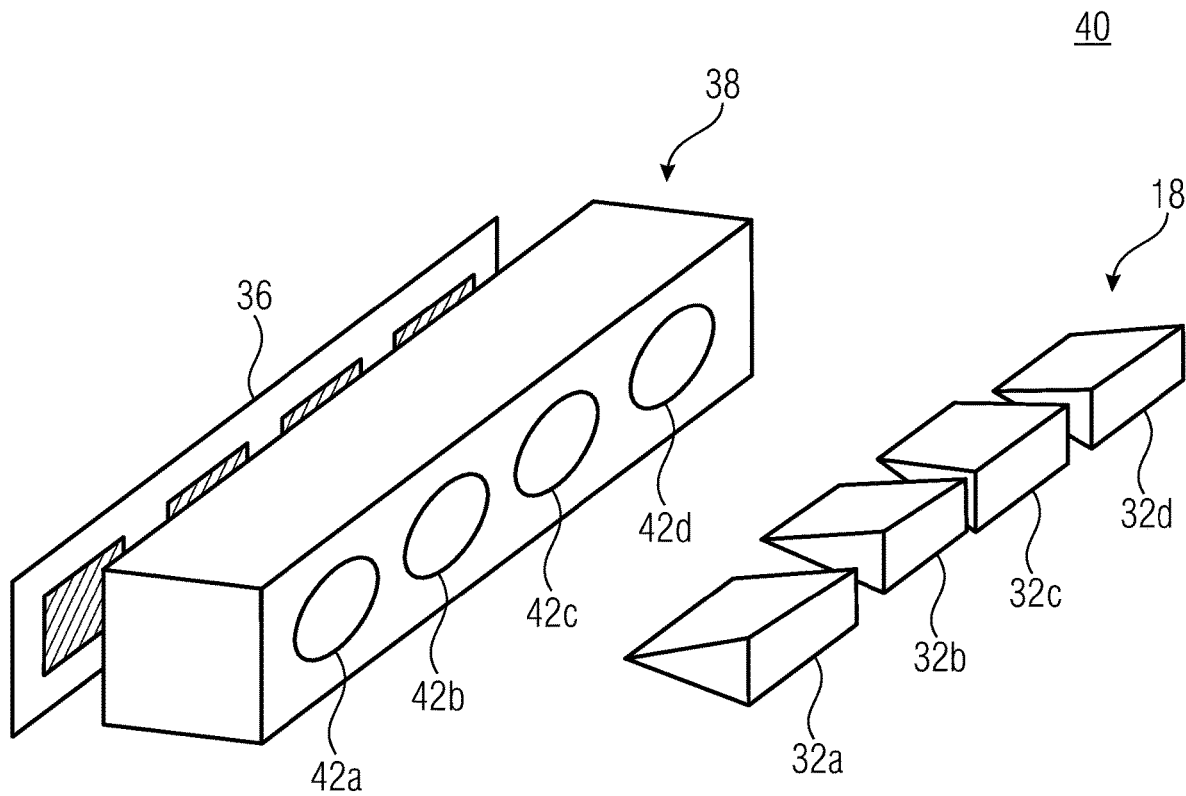

FIG. 4e shows a schematic perspective view of a multi-aperture imaging device 40 including an image sensor 36 and a one-line array 38 of adjacently arranged optical channels 42a-d. The beam-deflecting means 18 includes a number of beam-deflecting elements 32a-d which may correspond to the number of optical channels. Alternatively, a smaller number of beam-deflecting elements may be arranged, for example when at least one beam-deflecting element is used by two optical channels. Alternatively, a larger number may be arranged, such as when the deflection direction of the beam-deflecting means 18 is switched by a translational movement, as described in connection with FIGS. 4a and 4b. Each beam-deflecting element 32a-d may be associated with an optical channel 42a-d. The beam-deflecting elements 32a-d may be configured as a multitude of elements 32 in accordance with FIGS. 4c and 4d. Alternatively, at least two, several or all of the beam-deflecting elements 32a-d may be formed integrally with one another.

Figure 4F:
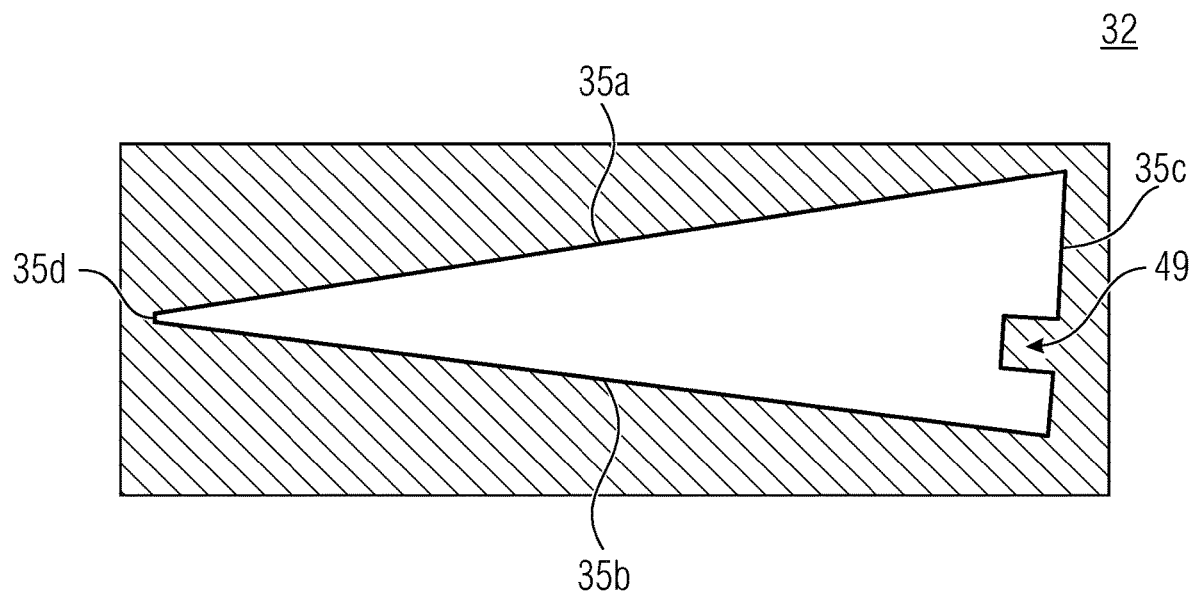

FIG. 4f shows a schematic sectional side view of the beam-deflecting element 32, the cross section of which is formed as a freeform surface. Thus, the side 35c may comprise a recess 49 enabling attachment of a holding element; the recess 49 may also be formed as a protruding element, such as a key of a slot-and-key system. The cross section further comprises a fourth side 35d which has a smaller surface area than the main sides 35a and 35b and connects same with each other.

Figure 4G:
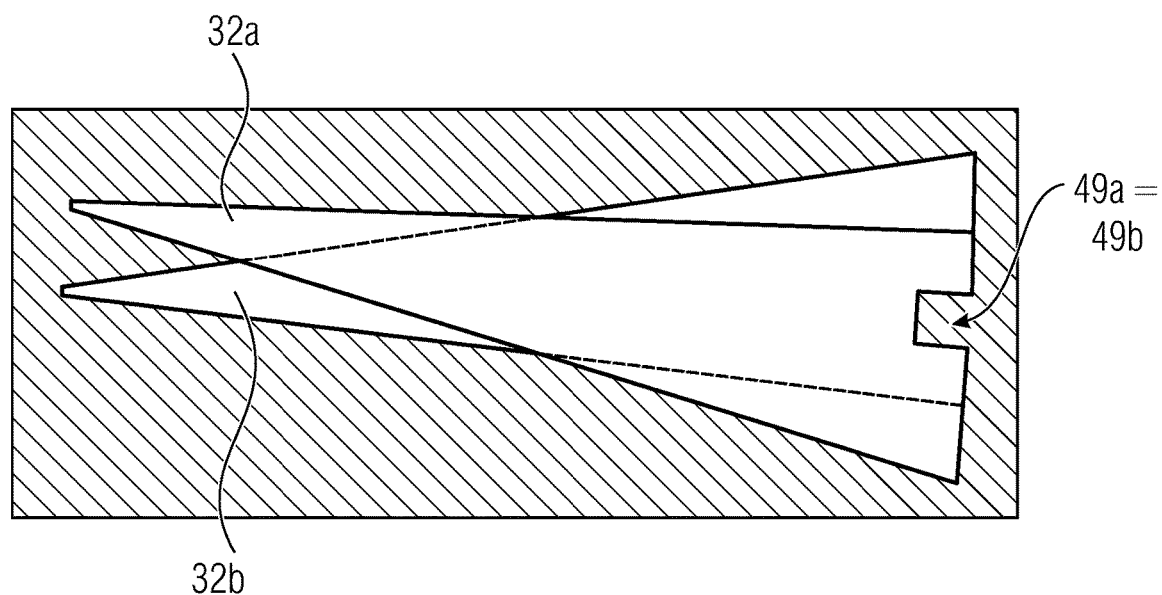

FIG. 4g shows a schematic sectional side view of a first beam-deflecting element 32a and of a second beam-deflecting element 32b, which is located behind the former as seen in the direction of presentation. The recesses 49a and 49b may be arranged to be essentially congruent, so that it is possible to arrange a connecting element in the recesses.

Figure 4H:
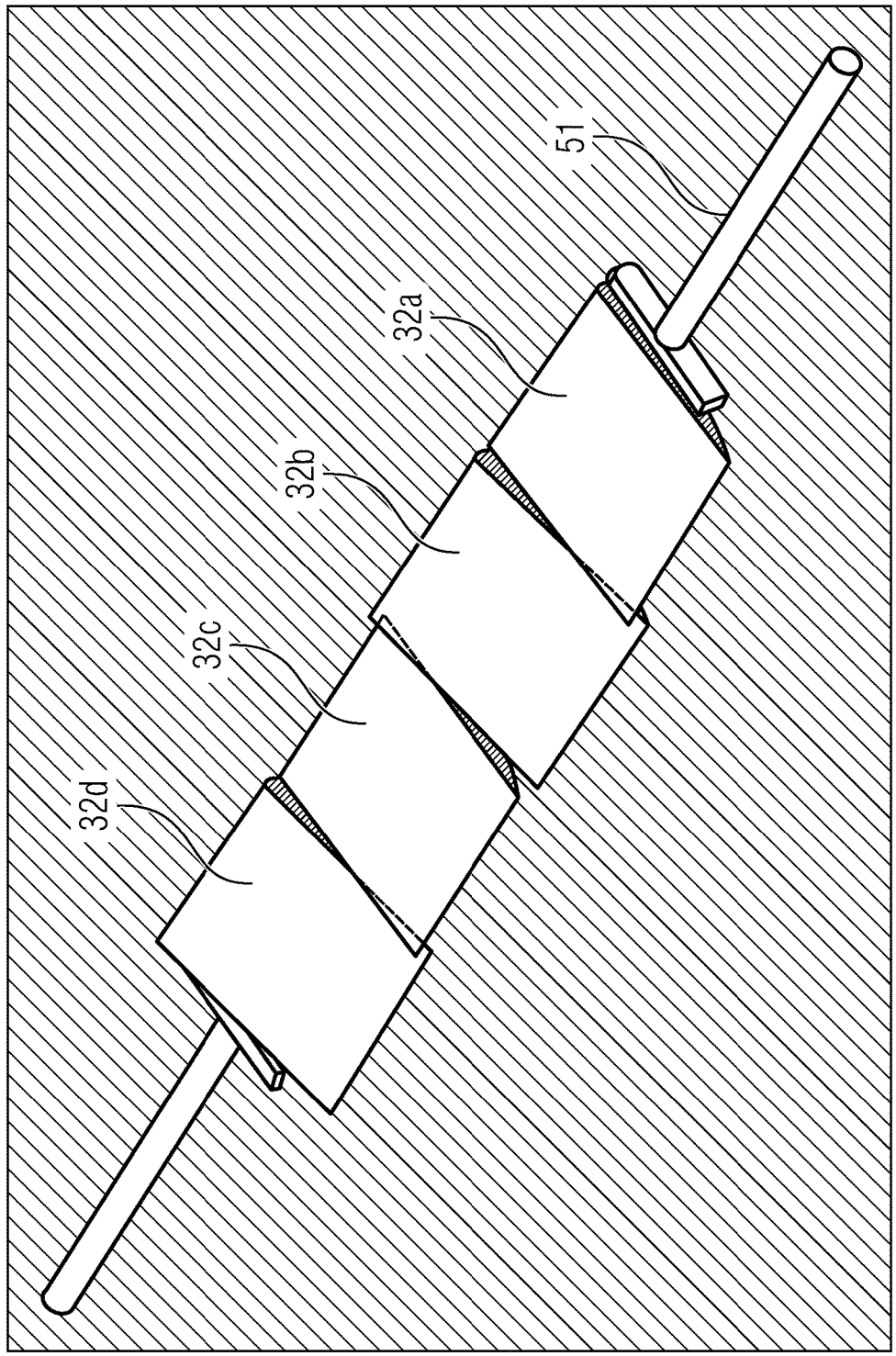

FIG. 4h shows a schematic perspective view of the beam-deflecting means 18 including, e.g., four beam-deflecting elements 32a-d which are connected to a connecting element 51. The connecting element may be used for being translationally and/or rotationally moveable by an actuator. The connecting element 51 may be integrally formed and may extend across an extension direction, e.g. the y direction in FIG. 4e, on or within the beam-deflecting elements 32a-d. Alternatively, the connecting element 51 may be coupled only to at least one side of the beam-deflecting means 18, for example when the beam-deflecting elements 32a-d are integrally formed. Alternatively, a connection to an actuator and/or a connection of the beam-deflecting elements 32a-d may also occur in any other way, for example by means of adhesion, wringing or soldering, for example.

Figure 5A:
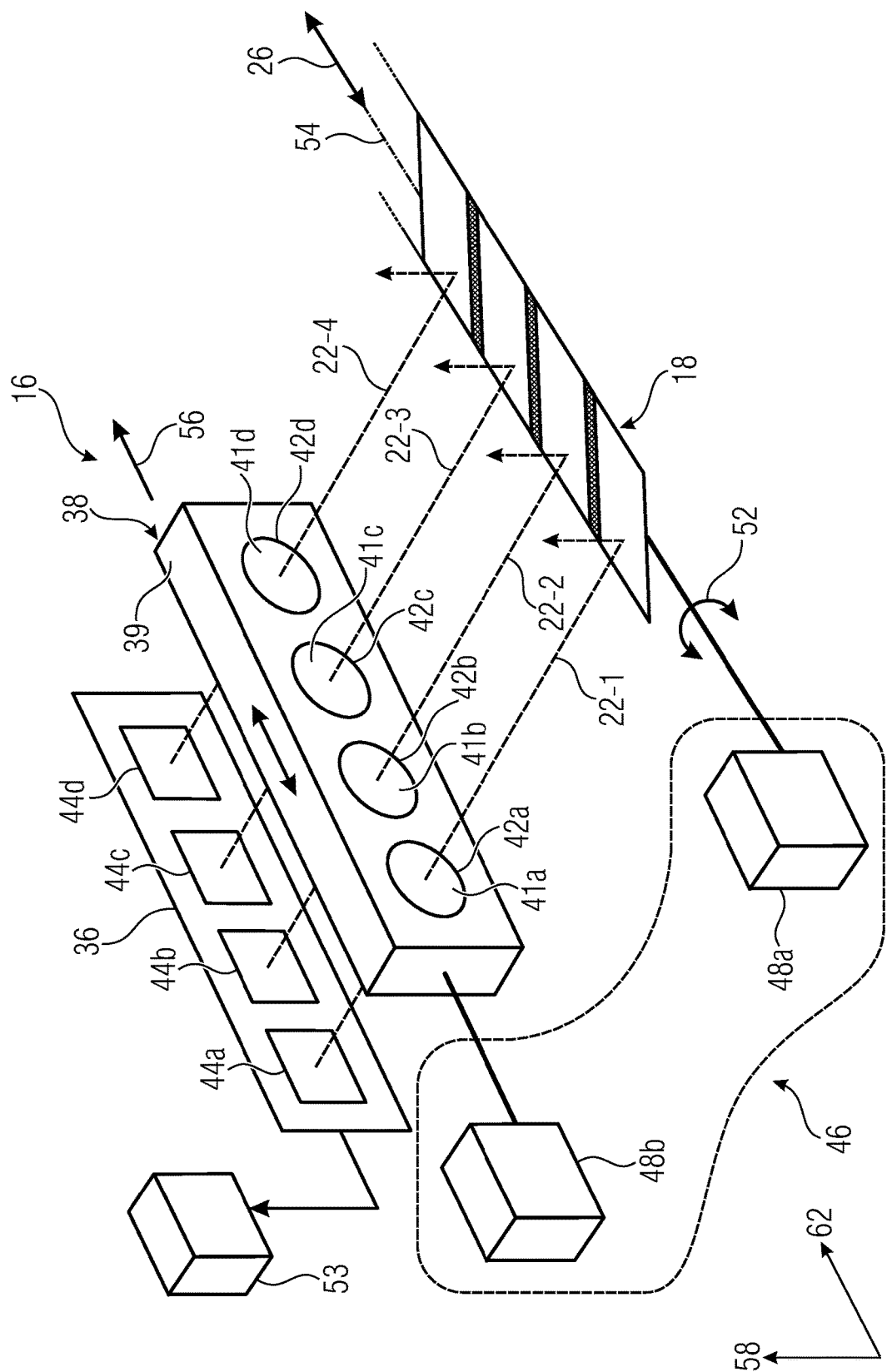
FIG. 5a shows a schematic perspective view of an imaging device in accordance with an embodiment.

FIG. 5a shows a schematic perspective view of the imaging device 16. The imaging device 16 includes the beam-deflecting means 18, an image sensor 36, and a one-line array 38 of adjacently arranged optical channels 42a-d. Each optical channel 42a-d may comprise an optic configured to optically influence optical paths 22-1 to 22-4 of the imaging device 16. The optic may be channel-individual or may comprise mutual components for groups of two or more optical channels.

The image sensor 36 may include image sensor areas 44a-d; the optical paths 22-1 to 22-4 of the optical channels 22a-d each may impinge upon an image sensor area 44a-d. In simplified terms, each image sensor area 44a-d may have an optical channel 22a-d and/or an optical path 22-1 to 22-4 associated therewith. The beam-deflecting means 18 may be configured to deflect the optical paths 22-1 to 22-4 into mutually different directions and/or different wavelengths on the basis of mutually different operating states of the portable device and/or of mutually different positions of the beam-deflecting means 18, as described, for example, in connection with FIGS. 1, 2, 3a, 3b, 4a-h. This means that the imaging device 16 may be formed as or include the multi-aperture imaging device 40.

The image sensor areas 44a-d may each be formed from a chip, for example, which includes a corresponding pixel array; the image sensor areas may be mounted on a shared substrate and/or a shared circuit board. Alternatively, it would also be possible, of course, for the image sensor areas 44a-d to each be formed from a part of a shared pixel array continually extending across the image sensor areas 44a-d, the shared pixel array being formed, e.g., on an individual chip. For example, only the pixel values of the shared pixel array will then be read out in the image sensor areas 44a-d. Various combinations of said alternatives are also possible, of course, such as the presence of one chip for two or more channels and of a further chip for yet other channels or the like. In the case of several chips of the image sensor 36, said chips may be mounted on one or more circuit boards, for example all together or in groups or the like.

The one-line array 38 may comprise a carrier 39 at which optics 41a-d of the optical channels are arranged. The carrier 39 may be passed through by the optical paths 22-1 to 22-4 used for imaging in the individual optical channels. The optical channels of the multi-aperture imaging device may traverse the carrier 39 between the beam-deflecting means 18 and an image sensor 36. The carrier 39 may maintain a relative position between the optics 41a-d in a stable manner. The carrier 39 may be transparently formed and include, e.g., a glass material and/or a polymer material. The optics 41a-d may be arranged on at least one surface of the carrier 39. This enables a small dimension of the carrier 39, and, therefore, of the one-line array 38 along a direction parallel to the image sensor 36 and perpendicular to the line extension direction 56 since enclosure of the optics 41a-d within a circumferential area of same may be dispensed with. In accordance with embodiments, the carrier 39 is not configured to be larger, or is configured to be only marginally larger, i.e. by a maximum of 20%, by a maximum of 10% or by a maximum of 5%, than a corresponding dimension of the optic 41a-d along the direction that is parallel to a main side of the image sensor 36 and perpendicular to the line extension direction 56.

The beam-deflecting means may be configured such that in the first positon and in the second position, it deflects the optical path 22-1 to 22-4 of each optical channel 42a-d in mutually different directions. This means that the deflected optical paths 22-1 to 22-4 may have mutual angles, as described in the context of FIG. 6a. The optical channels 16a-d may be arranged in at least one line along a line extension direction 56. The array 38 may be formed as a multi-line array including at least two lines or as a one-line array including (exactly) one line of optical channels. The optical channels may be directed by the beam-deflecting means 18 on the basis of a viewing direction set toward varying fields of view. The optical channels may have angles in relation to one another within a viewing direction, so that the optical channels are directed into partial fields of view of the total field of view that only partly overlap, if they overlap at all. The different angles of the optical channels may be obtained on the basis of the optics of the optical channels and/or on the basis of mutually different deflections of the optical channels at the beam-deflecting means 18.

The imaging device 16 may include an actuator 48a, e.g., which is part of an optical image stabilizer 46a and/or may be used for switching the position of the beam-deflecting means 18. The optical image stabilizer 46 may be configured to enable optical image stabilization of an image captured by the image sensor 36. To this end, the actuator 48a may be configured to produce a rotational movement 52 of the beam-deflecting means 18. The rotational movement 52 may occur about a rotational axis 54; the rotational axis 54 of the beam-deflecting means 18 may be arranged in a central area of the beam-deflecting means 18 or at a distance therefrom. The rotational movement 52 may be superimposed upon the rotational movement 28 and/or the translational movement 26 for switching the beam-deflecting means between first and second positions or operating states. If the beam-deflecting means 18 is translationally moveable, the translational movement 26 may be spatially arranged in parallel with a line extension direction 56 of the one-line array 38. The line extension direction 56 may relate to a direction along which the optical channels 42a-d are adjacently arranged. On the basis of the rotational movement 52, an optical image stabilization may be obtained along a first image axis 58, possibly perpendicularly to the line extension direction 56.

Alternatively or additionally, the optical image stabilizer 46 may include an actuator 48b configured to translationally move the one-line array 38 along the line extension direction 56. On the basis of the translational movement of the one-line array 38 along the line extension direction 56, optical image stabilization may be obtained along a second image axis 62, possibly in parallel with the line extension direction 56 and/or in parallel with the direction of movement of the one-line array 38. The actuators 48a and 48b may be formed, for example, as piezoelectric actuators, pneumatic actuators, hydraulic actuators, DC motors, stepper motors, thermal actuators, electrostatic actuators, electrostrictive actuators, and/or magnetostrictive actuators. The actuators 48a and 48b may be formed to be identical with or different from each other. Alternatively, it is also possible for an actuator to be arranged which is configured to rotationally move the beam-deflecting means 18 and to translationally move the one-line array 38. For example, the rotation axis 54 may be parallel to the line extension direction 56. The rotational movement 52 about the axis of rotation 54 may result in little installation space needed for the imaging device 16 along a direction parallel to the image axis 58, so that the portable device, which inside a housing includes the imaging device 16, may also have small dimensions. In simplified terms, the portable device may comprise a flat housing.

The translational movement 26 may be implementable, e.g., in parallel or essentially in parallel with an extension of a main side 13a and/or 13b of the device 10, so that additional installation space, which may be required for switching the beam deflection between operating states, may be arranged along the line extension direction 56 and/or so that provision of installation space along a thickness direction of the device may be dispensed with. The actuators 48a and/or 48b may be arranged along the line extension direction and/or, perpendicular thereto, in parallel with an extension direction of main sides of the housing of the device. In simplified terms, this can be described such that actuators for switching between operating states and/or actuators of the optical image stabilizer may be arranged next to, in front of or behind an extension between the image sensor, the one-line array 38 and the beam-deflecting means 18, an arrangement there above and/or there below being dispensed with in order to keep an installation height of the imaging device 16 small. This means that actuators for switching the operating state and/or the optical image stabilizer may be arranged within a plane within which the image sensor 36, the one-line array 38, and the beam-deflecting means 18 are arranged.

In accordance with further embodiments, the actuator 48b and/or other actuators may be configured to change a distance between the image sensor 36 and the one-line array 38 and/or the optics of the optical channels. To this end, e.g., the actuator 48b may be configured to move the one-line array 38 and/or the image sensor 36 in relation to each other along an optical path of the optical paths 22-1 to 22-4 and/or perpendicularly to the line extension direction 56 so as to change a focus of the imaging of the field of view and/or to obtain an autofocus function.

The imaging device 16 may comprise focusing means configured to change the focus of the imaging device. The focusing means may be configured to provide a relative movement between the one-line array 38 and the image sensor 36. The focusing means may be configured to perform the relative movement while performing a movement of the beam-deflecting means 18 that is simultaneous with the relative movement. For example, the actuator 48b or a further actuator may be configured to keep a distance between the one-line array 38 and the beam-deflecting means 18 at least essentially constant or, when no additional actuator is used, at least essentially constant, possibly precisely constant, i.e. to move the beam-deflecting means 18 as much as the one-line array 38 is moved. With cameras comprising no beam-deflecting means, implementation of a focusing function may result in an increased dimension (thickness) of the device.

On the basis of the beam-deflecting means, this may occur without any additional dimension resulting along a dimension that is parallel to a main side of the image sensor 36 and perpendicular to the line extension direction 56 (e.g. a thickness) of the multi-aperture imaging device since an installation space enabling said movement may be arranged to be perpendicular thereto. On the basis of a constant distance between the one-line array 38 and the beam-deflecting means 18, beam deflection may be maintained in an adjusted (possibly optimum) state. In simplified terms, the imaging device 16 may comprise focusing means for changing a focus. The focusing means may be configured to provide a relative movement (focusing movement) between at least one optic 41a-d of the optical channels of the multi-aperture imaging device 16 and the image sensor 36. The focusing means may comprise an actuator for providing the relative movement, e.g., the actuator 48b and/or 48a. The beam-deflecting means 18 may be moved along, on account of corresponding constructive configuration or utilization, possibly while using a further actuator, simultaneously with the focusing movement. This means that a distance between the one-line array 38 and the beam-deflecting means remains unchanged and/or that the beam-deflecting means 18 is moved, at the same time or with a time lag, to a same or comparable extent as the focusing movement occurs, so that it is unchanged, as compared to a distance prior to a change of focus, at least at a point in time when the field of view is captured by the multi-aperture imaging device.

The imaging device 16 includes a control means 53 configured to receive image information from the image sensor 36. To this end, an image of the total field of view is evaluated, said image being obtained by deflecting the optical paths 22-1 to 22-4 of the optical channels 42a to 42d with the first beam-deflecting area, and a corresponding, i.e. matching, image is evaluated, said image being obtained by deflecting the optical paths 22-1 to 22-4 of the optical channels 42a to 42d with the second beam-deflecting area, wherein any order of the first and second images may be used.

The control means 53 may generate two total images of the captured total field of view, e.g., using methods for the combination of images (stitching), wherein a first total image is based on the first wavelength range and a second total image is based on the second wavelength range.

The control means may be configured to, using the second capturing, to determine a depth map for the first capturing, e.g. based on a wavelength range that is not visible for humans, such as an infrared range, in particular a near-infrared range (NIR). To this end, the control means may be configured to, e.g., evaluate a pattern that is visible in the second wavelength range. Thus, e.g., a predefined pattern such as a dot pattern may be emitted in the NIR wavelength range towards the total field of view and a distortion of the pattern may be evaluated in the second capturing or image. The distortion may correlate with depth information. The control means 53 may be configured to provide the depth map using the evaluation of the depth information. As an alternative or addition to the spatial information of a pattern, temporal information may also be evaluated, e.g., when a temporal variance of the pattern is known.

The illumination source may be configured to emit the temporal and/or spatial illumination pattern with a third wavelength range that fully or partially includes the second wavelength range, so that the third wavelength range at least partially corresponds to the second wavelength range. This includes the fact that a partial reflection of the wavelengths of the emitted pattern already represents a sufficient source for the second wavelength range reaching the image sensor, and that wavelength shifts or partial reflections, e.g. based on absorptions, are also included. For example, the second wavelength range and the third wavelength may also be congruent.

As is described in connection with FIG. 1, the deflected optical paths of the optical channels may pass through a transparent area of a housing of the device, in which transparent area a diaphragm may be arranged. In at least one operating state of the device, a diaphragm arranged in an area of the transparent area may at least partly optically close said area such that the diaphragm is operative for two, a multitude of or all of the optical channels, i.e. is in the at least partly closed state. In a different operating state, the diaphragm may be in an opened state for the two, the multitude of, or all of the optical channels. This means that the diaphragms may be operative for at least two optical channels of the multi-aperture imaging device. In the first operating state, the diaphragm 24b may at least partly optically close the transparent area 14b for the two, the multitude of, or all of the optical channels. In the second operating state, the diaphragm 24a may at least partly optically close the transparent area 14a for the two, the multitude of, or all of the optical channels.

Figure 5B:
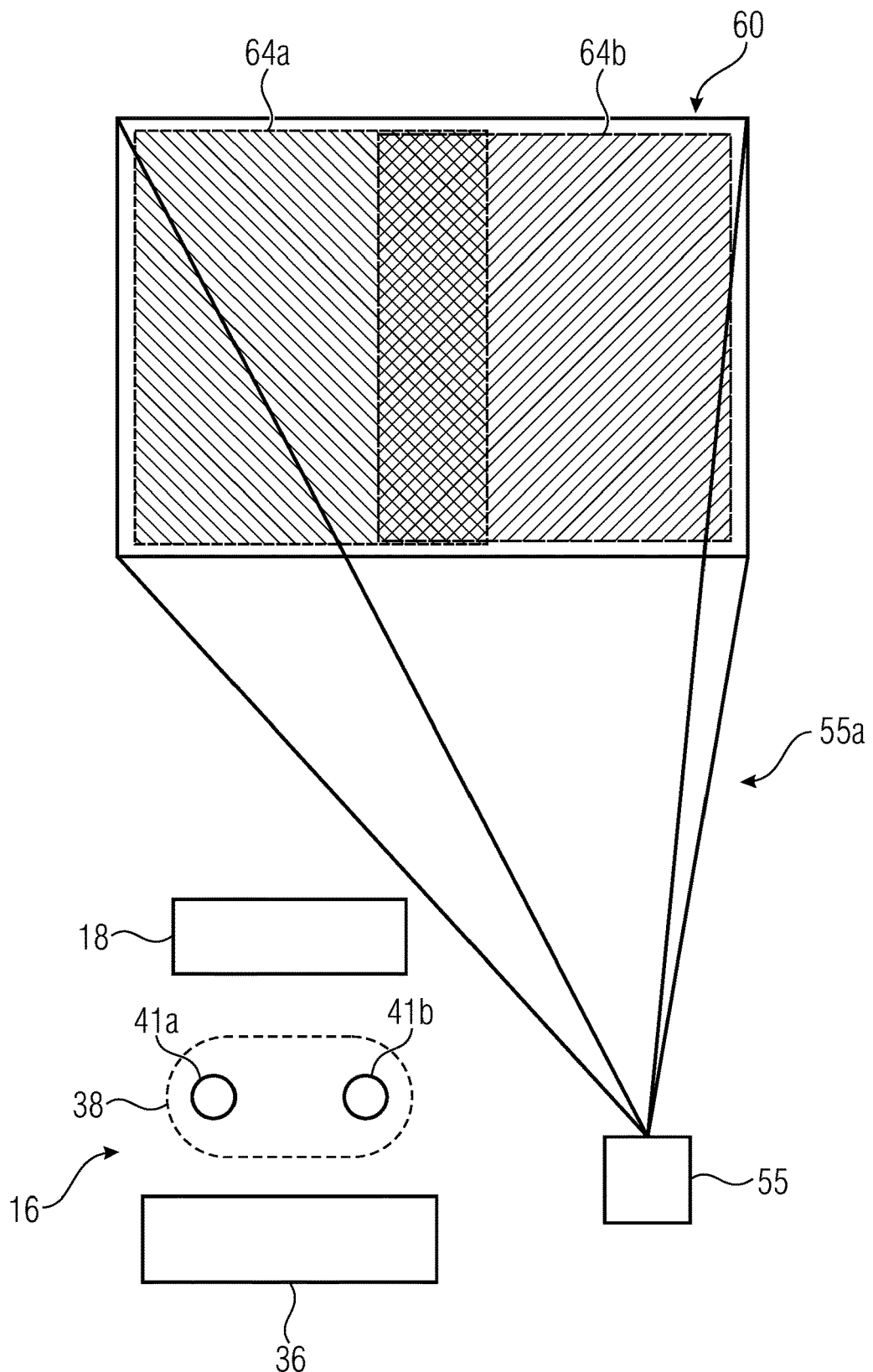
FIG. 5b shows a schematic perspective view of a multi-aperture imaging device according to an embodiment, comprising an illumination means configured to emit a temporal or spatial illumination pattern.

FIG. 5b shows a schematic perspective view of the multi-aperture imaging device 16 in accordance with an embodiment, wherein the array 38 exemplarily comprises two optical channels including the optics 41a-b, wherein any higher number is possible, such as three, four, five, or more. The optical channels 41a and 41b are each configured to capture a partial field of view 64a or 64b of a total field of view 60. The partial fields of view 64a and 64b overlap with one another and together form the total field of view 60.

The multi-aperture imaging device 16 includes an illumination means 55 configured to emit a temporal or spatial illumination pattern 55a, in particular towards the total field of view 60. The illumination pattern 55a may include a third wavelength range that at least partially overlaps with or corresponds to the second wavelength range, so that, when deflecting the optical paths using the second beam-deflecting area, the pattern distorted in the total field of view hits the image sensor and may be evaluated by the control means 53.

FIG. 5c shows a schematic sectional side view of a modified imaging device 16', wherein the beam-deflecting means 18 can be moved between a first position Pos1 of the first operating state and a second position Pos2 of the second operating state on the basis of a rotational movement 52' about the axis of rotation 54. In the first operating state, the imaging device 16' may comprise a first viewing direction 57a. In the second operating state, the imaging device 16' may have a first viewing direction 57b. Main sides 59a and 59b of the beam-deflecting means 18 may be formed to be reflective as mirrors and/or as facet elements. During switching between the operating states, the beam-deflecting means 18 may be switchable between a central position 61, so that a difference between parallel planes 63a and 63b, which distance may describe a minimum dimension of the imaging device 16' along a normal direction of the planes 63a and 63b, is influenced by the dimensions of the image sensor 36, of the array 38, but not by a movement of the beam-deflecting means 18. The rotational movement 52 may be superimposed by the rotational movement 28. In simplified terms, superposition of switching and of optical image stabilization may be implemented.

Actuators of the multi-aperture imaging device may be arranged to be at least partly arranged between two planes 63a and 63b spanned (defined) by sides of a cuboid. The sides of the cuboid may be arranged in parallel with one another as well as in parallel with the line extension direction of the array and of some of the optical path of the optical channels between the image sensor and the beam-deflecting means. The volume of the cuboid is minimal and nevertheless includes the image sensor, the array and the beam-deflecting means as well as their operation-related movements.

A thickness direction of the multi-aperture imaging device may be arranged perpendicularly to the planes 63a and/or 63b. The actuators may have a dimension or extension that is in parallel with the thickness direction. Starting from an area located between the planes 63a and 63b, a proportion of a maximum of 50%, a maximum of 30%, or a maximum of 10% of the dimension may project beyond the plane 63a and/or 63b or beyond said area. Thus, the actuators protrude beyond the plane 63a and/or 63b to a most insignificant extent, for example. In accordance with embodiments, the actuators do not protrude beyond the planes 63a and/or 63b. What is advantageous about this is that extension of the multi-aperture imaging device along the thickness direction is not increased by the actuators.

A volume of the multi-aperture imaging device may comprise a small, or minimal, installation space between the planes 63a and 63b. Along the lateral sides or extension directions of the planes 63a and/or 63b, an installation space of the multi-aperture imaging device may be large or have any size desired. The volume of the virtual cuboid is influenced, for example, by an arrangement of the image sensor 36, of the array 38 and of the beam-deflecting means; these components may be arranged, in accordance with the embodiments described herein, such that the installation space of these components along the direction perpendicular to the planes and, therefore, the mutual distance between the planes 63a and 63b become small or minimal. As compared to other arrangements of the components, the volume and/or the distance of other sides of the virtual cuboid may be enlarged.

Figure 6A:
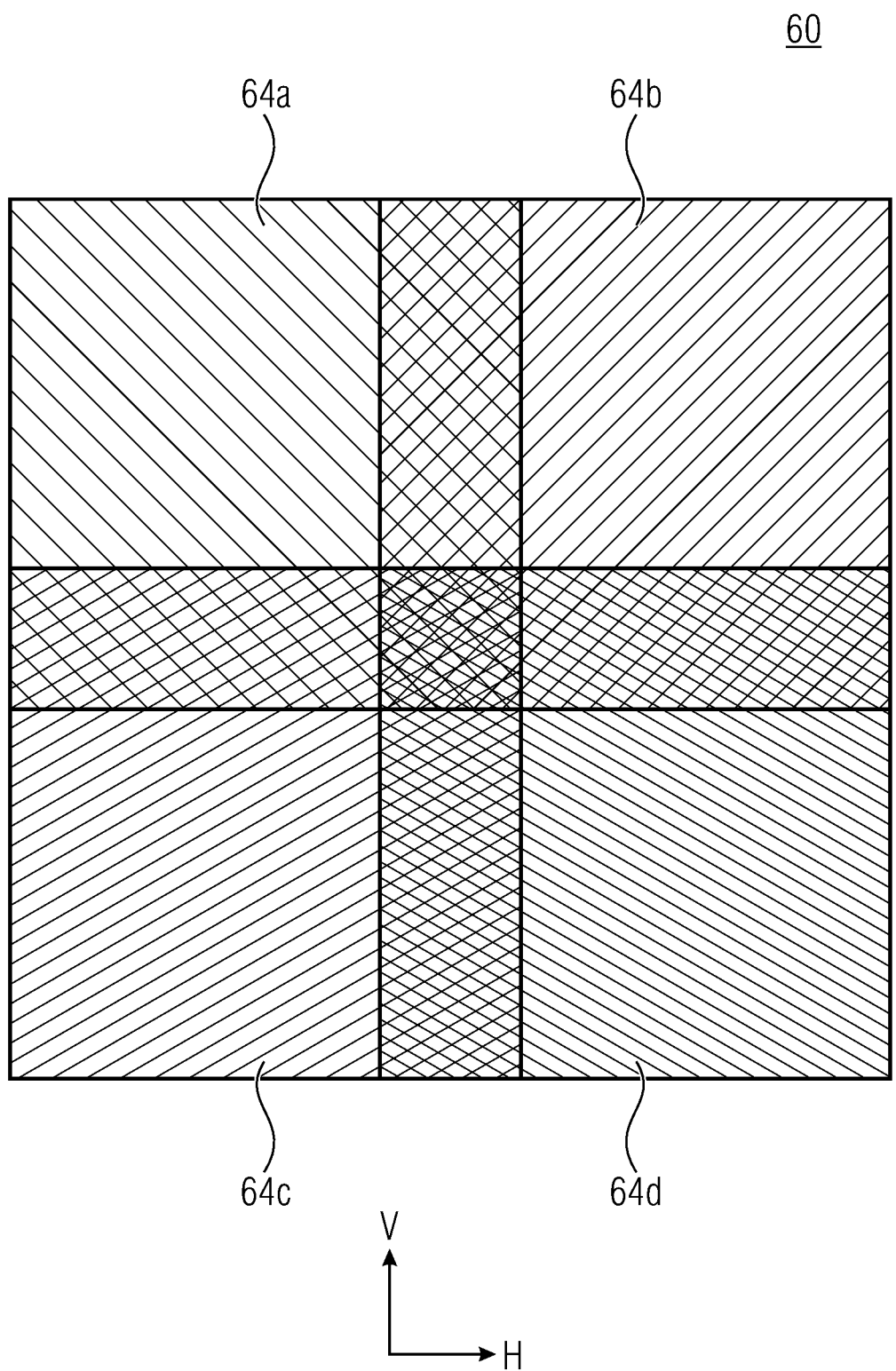
FIG. 6a shows a schematic view of a total field of view including four mutually overlapping partial fields of view.

FIG. 6a shows a schematic view of a total field of view 60 including four mutually overlapping partial fields of view 64a-d. The partial fields of view 64a-d are exemplarily arranged in the object area along two directions H and V that, for example but not in a limiting manner, may designate a horizontal direction and a vertical direction. Any other directional arrangement is possible. With reference to FIG. 5a, for example, the optical path 22-1 may be directed toward the partial field of view 64a, the optical path 22-2 may be directed toward the partial field of view 64b, the optical path 22-3 may be directed toward the partial field of view 64c, and/or the optical path 22-4 may be directed toward the partial field of view 64d. Even though an association between the optical paths 22-1 to 22-4 with the partial fields of view 64a-d is arbitrary, it becomes clear that starting from the beam-deflecting means 18, the optical paths 22-1 to 22-4 are directed in mutually different directions. In the embodiment described, although the total field of view 60 is captured by means of four optical channels that capture the partial fields of view 64a-d, the total field of view 60 may also be captured by any other number of partial fields of view larger than 1, i.e. at least 2, at least 3, at least five, at least seven, or more.

Figure 6B:
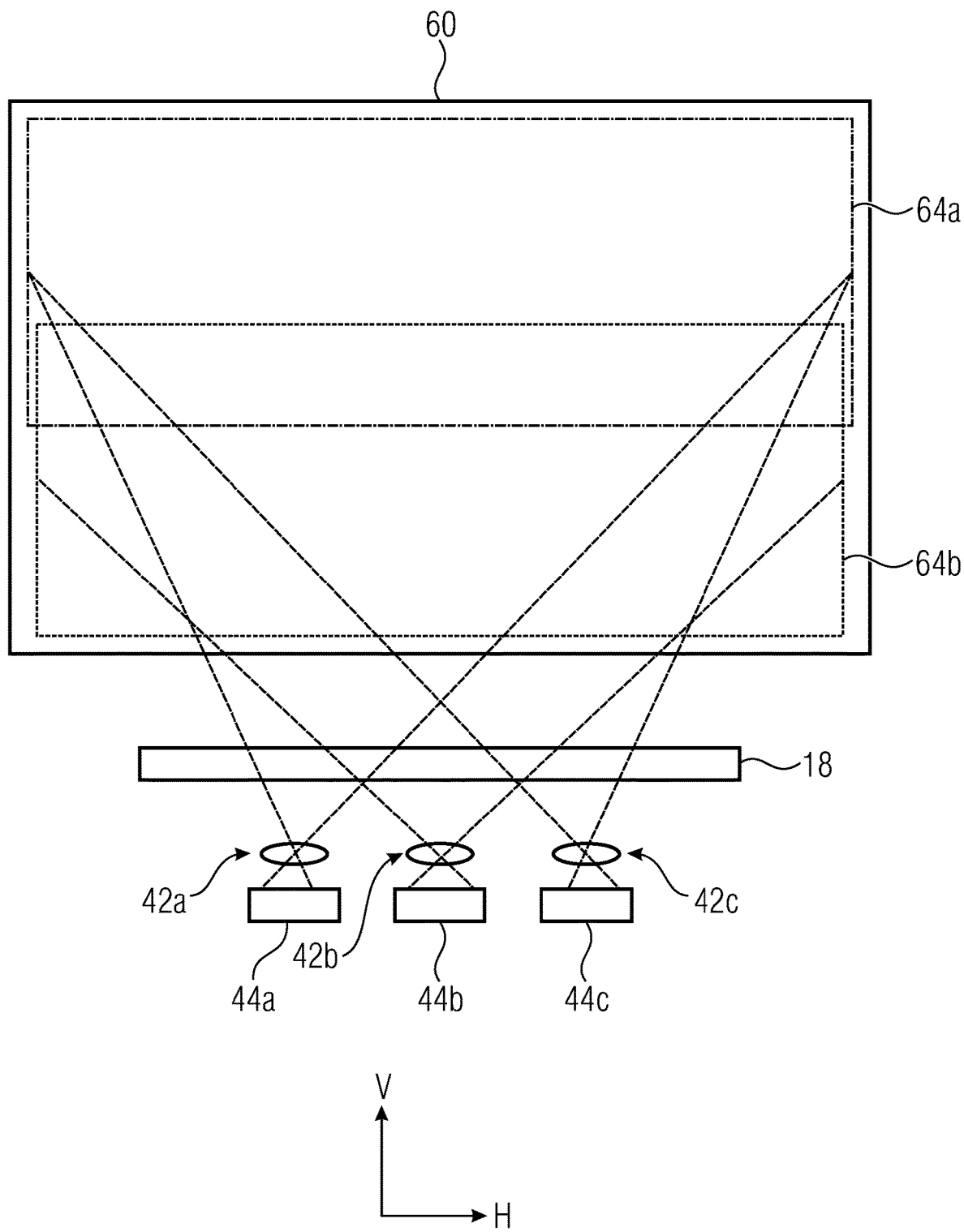
FIG. 6b shows the total field of view distributed differently than in FIG. 6a, wherein a partial field of view is captured twice and partial fields of view are adjacently arranged along a first direction.
Figure 6C:
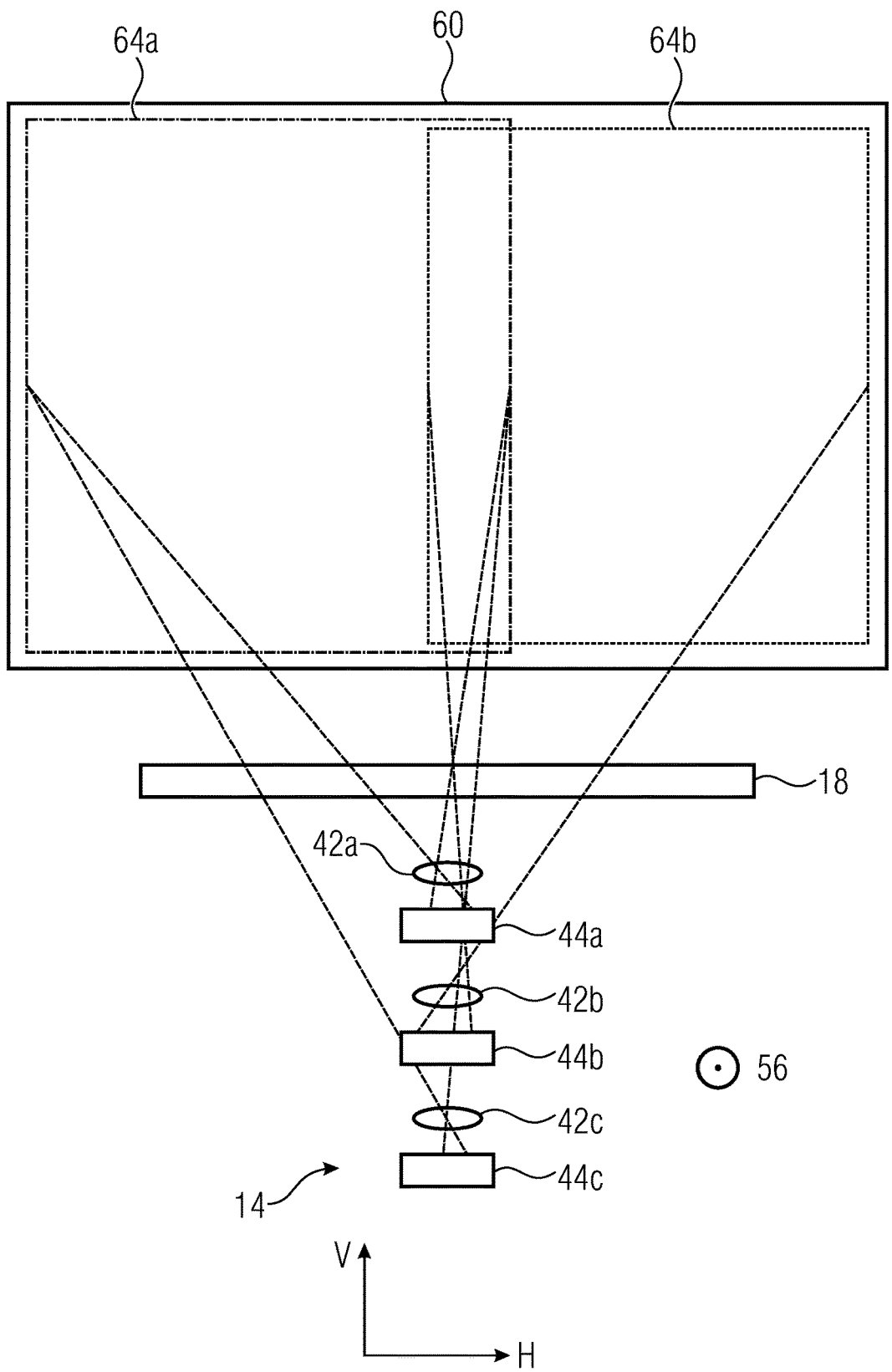
FIG. 6c shows the total field of view distributed differently than in FIG. 6a, wherein a partial field of view is captured twice and partial fields of view are adjacently arranged along a second direction.

FIG. 6b shows a possible division of the total field of view 60 that differs from FIG. 6a, e.g., the total field of view being captured by only two partial fields of view 64a and 64b. For example, the partial fields of view 64a and 64b may be arranged along the direction V or, as is illustrated in FIG. 6c, along the direction H, and overlap one another in order to enable an effective image combination. The partial fields of view are illustrated as having different sizes only in order to differentiate them more effectively, even if this may indicate a corresponding optional implementation in such a manner.

In principle, an assignment of the partial fields of view 64a and 64b with respect to the optical channels as well as a relative orientation of the array 14 may be arbitrary. A direction the partial fields of view are arranged along, e.g. V in FIG. 6b or H in FIG. 6c, may be arranged arbitrarily as to the line-extension direction 56 of the array 14. In an advantageous arrangement, the line-extension direction 56 and the direction the partial fields of view are arranged along are disposed perpendicularly to one another within a tolerance range of $\pm 25°$, $\pm 15°$, or $\pm 5°$, advantageously perpendicular to each other. In FIG. 6b, the line-extension direction 56 is arranged in parallel to the direction H that is arranged perpendicularly to V, for example. In FIG. 6c, the line-extension direction 56 is also rotated in accordance with the arrangement of the partial fields of view 64a and 64b, which are rotated as compared to FIG. 6b, so that the line-extension direction 56 is parallel to V, or perpendicular to H within the designated tolerance range. Therefore, the optical channels 42a-c and the image sensor areas 44a-c could also overlap in the illustration plane of FIG. 6c or could be congruent within the tolerance range, and are illustrated to be offset for the sake of the illustration.

Multi-aperture imaging devices in accordance with embodiments may be configured to capture the total field of view 60 through at least two partial fields of view 64a-b. In contrast to partial fields of view that are captured in a single-channel manner, such as the partial field of view 64b or the partial fields of view according to the discussions with respect to FIG. 6a, at least one of the partial fields of view may be captured by at least one first optical channel 42a and one second optical channel 42c. For example, the total field of view may be segmented into exactly two partial fields of view 64a and 64b. Exactly one of the partial fields of view, e.g., the partial field of view 64a, may be captured through two optical channels 42a and 42c. Other partial fields of view may be captured in a single-channel manner.

To this end, multi-aperture imaging devices according to embodiments provide the use of exactly two optical channels in order to image the two partial fields of view 64a and 64b in the respective wavelength range or in both wavelength ranges. With such a configuration, there is the possibility of overlaps, or occlusion effects, occurring in the overlap area, meaning that, instead of a dual capturing of a field of view arranged behind an object, only one viewing angle is captured. In order to reduce or avoid such effects, some embodiments provide capturing at least one of the partial fields of view 64a and/or 64b with a further optical channel 42a-c so that at least this channel 42a-c is captured multiple times, in particular twice. Any other number of partial fields of view captured twice and/or any other number of partial fields of view and/or any other number of optical channels is also possible.

As is shown based on FIG. 6b and FIG. 6c, in order to capture a partial field of view 64 several times, the optical channels 42a and 42c and/or the image sensor areas 44a and 44c may be arranged symmetrically around an optical channel 42b for capturing the other partial field of view, may be spaced apart in the array 14 by at least one optical channel 42b directed onto another partial field of view, and/or comprise an enlarged distance or maximum distance within the array towards each other in order to enable a certain measure of disparity.

Figure 7A:
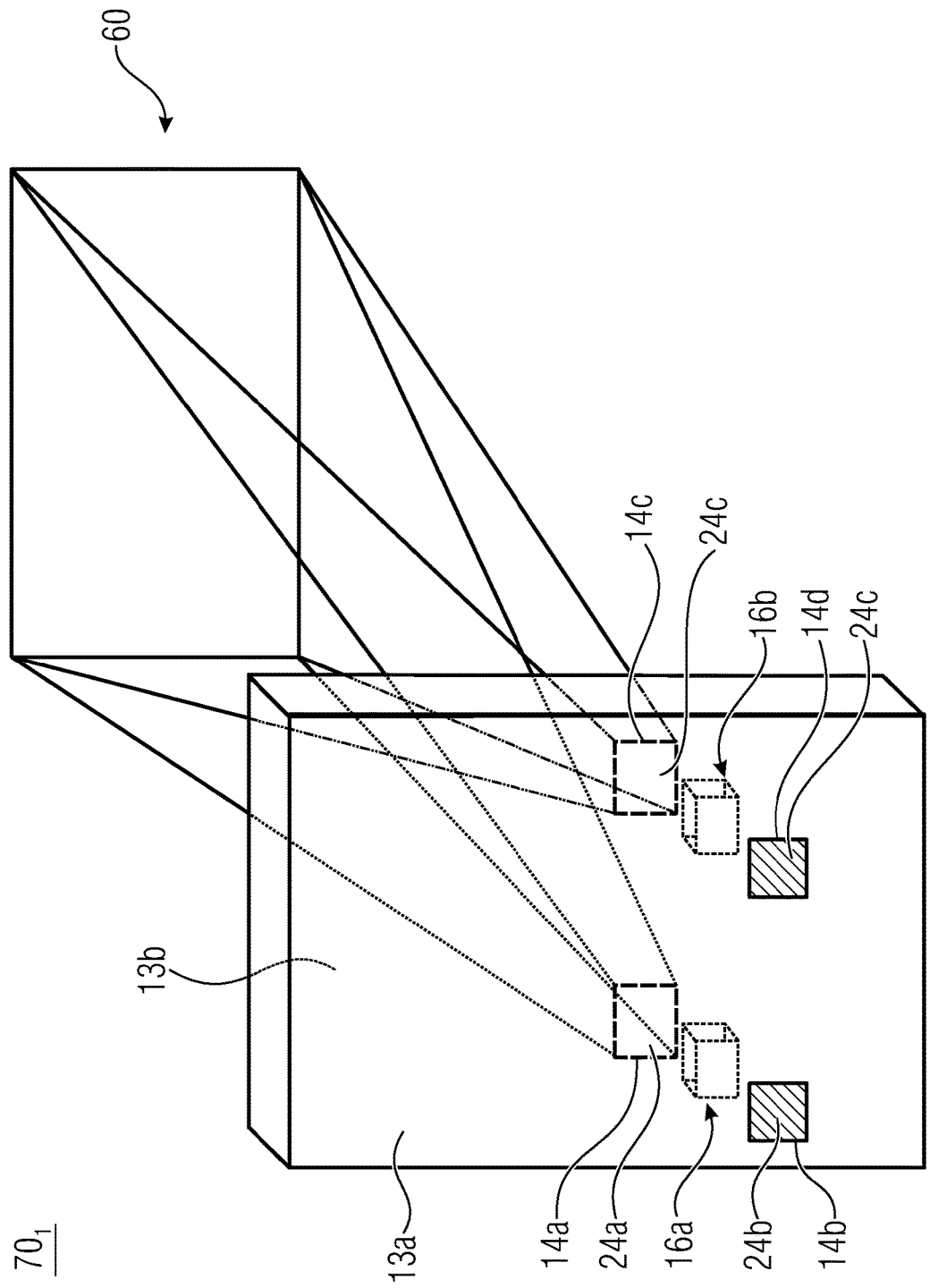
FIG. 7a shows a schematic perspective view of a device including two multi-aperture imaging devices for stereoscopically capturing a total field of view in accordance with an embodiment.

FIG. 7a shows a schematic perspective view of a device $70_1$ which includes a first multi-aperture imaging device 16a and a second multi-aperture imaging device 16b and is configured to stereoscopically capture the total field of view 60 by using the multi-aperture imaging devices. The total field of view 60 is arranged, e.g., on a main side 13b facing away from the main side 13a. For example, the multi-aperture imaging devices 16a and 16b may capture the total field of view 60 by means of transparent areas 14a and/or 14c; diaphragms 24a and 24c arranged in the main side 13b are at least partly transparent. Diaphragms 24b and 24d, arranged in the main side 13a, may at least partly optically close transparent areas 14b and/or 14d, so that an extent of stray light coming from a side facing the main side 13a, which stray light may falsify the images captured by the multi-aperture imaging devices 16a and/or 16b, is at least reduced. Even though the multi-aperture imaging devices 16a and 16b are depicted to be arranged in a mutually spaced-apart manner, the multi-aperture imaging devices 16a and 16b may also be arranged in a spatially adjacent or combined manner. For example, the one-line arrays of the imaging devices 16a and 16b may be arranged adjacently to or in parallel with one another. The one-line arrays may form lines with regard to one another, each multi-aperture imaging device 16a and 16b comprising a one-line array. The imaging devices 16a and 16b may comprise a shared beam-deflecting means and/or a shared carrier 39 and/or a shared image sensor 36.

The transparent areas 14a-d may additionally be equipped with a switchable diaphragm 24a-d that covers the optical structure for when it is not in use. The diaphragm 24a-d may include a mechanically moveable part. The movement of the mechanically moveable part may be effected while using an actuator as is described, e.g., for actuators 48a and 48b. Alternatively or additionally, the diaphragm may be electrically controllable and include an electrochromic layer or a sequence of electrochromic layers.

Figure 7B:
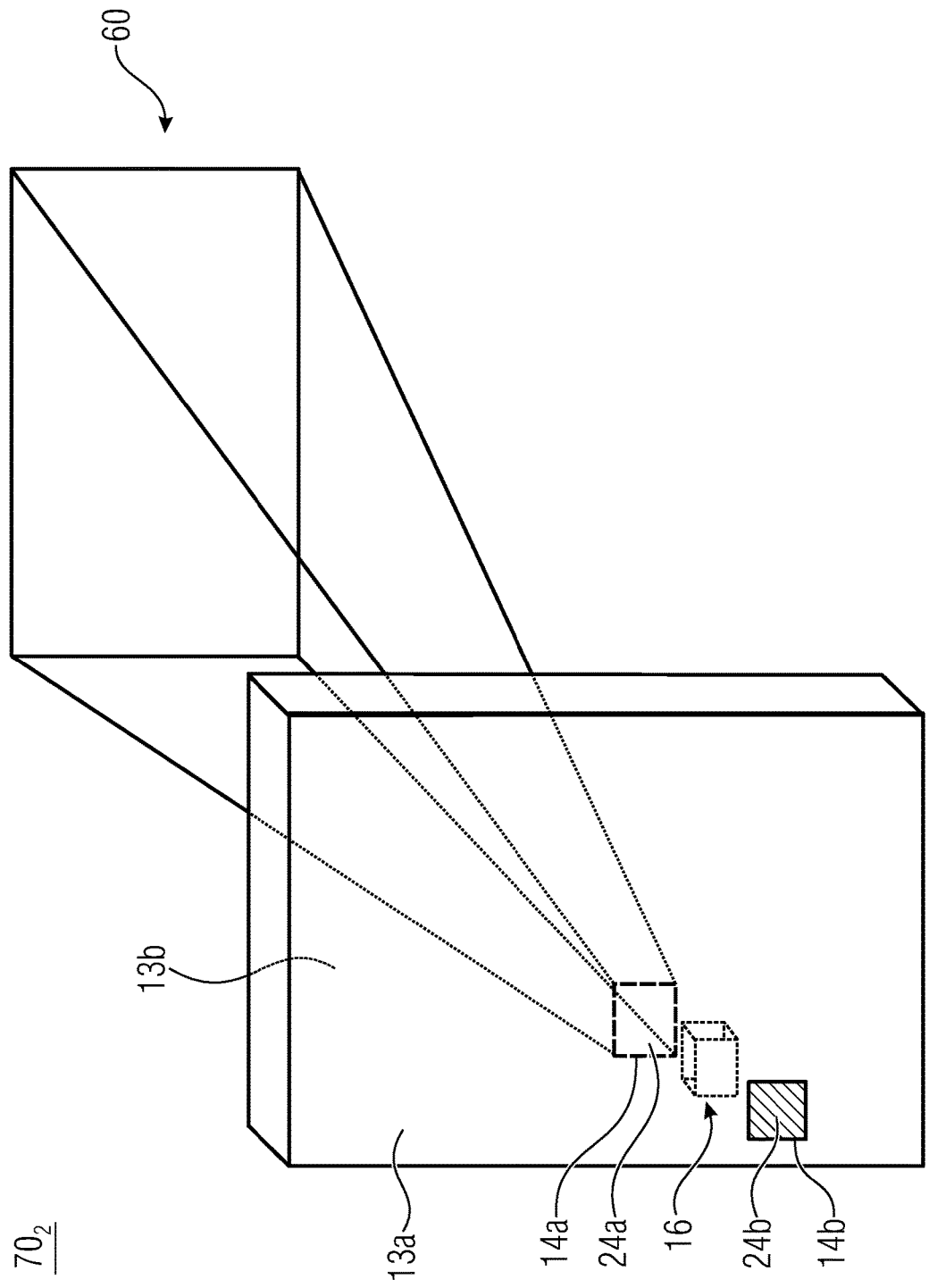
FIG. 7b shows a schematic perspective view of a device including two multi-aperture imaging devices in accordance with an embodiment, configured to, instead of a stereoscopic capturing, create the depth information from the capturing in one of the wavelength ranges.

In accordance with an embodiment in FIG. 7b, a device $70_2$ is similarly implemented as the device $70_1$, however, it is implemented such that, instead of a stereoscopic capturing, the depth information is created from the capturing in one of the wavelength ranges, e.g. through the evaluation of a pattern distortion in a non-visible wavelength range. According to this embodiment, e.g., the device 70 is implemented with only a single imaging device 16 and is configured to capture the total field of view from a perspective, i.e. that of the imaging device 16, and to not capture a stereoscopic capturing of the total field of view.

However, the device 70 may also be implemented according to the implementation in order to provide or generate a depth map of the total field of view, e.g. by evaluating a pattern distortion in one of the captured wavelength ranges, e.g. by means of the control means 53 or a specially implemented calculation means of the device 70 or the imaging device 16.

The device 70 may be implemented excluding an additional infrared camera that supplements or extends the imaging device 16, since such a functionality is already implemented in the imaging device 16, possibly involving the illumination means 55.

Figure 7C:
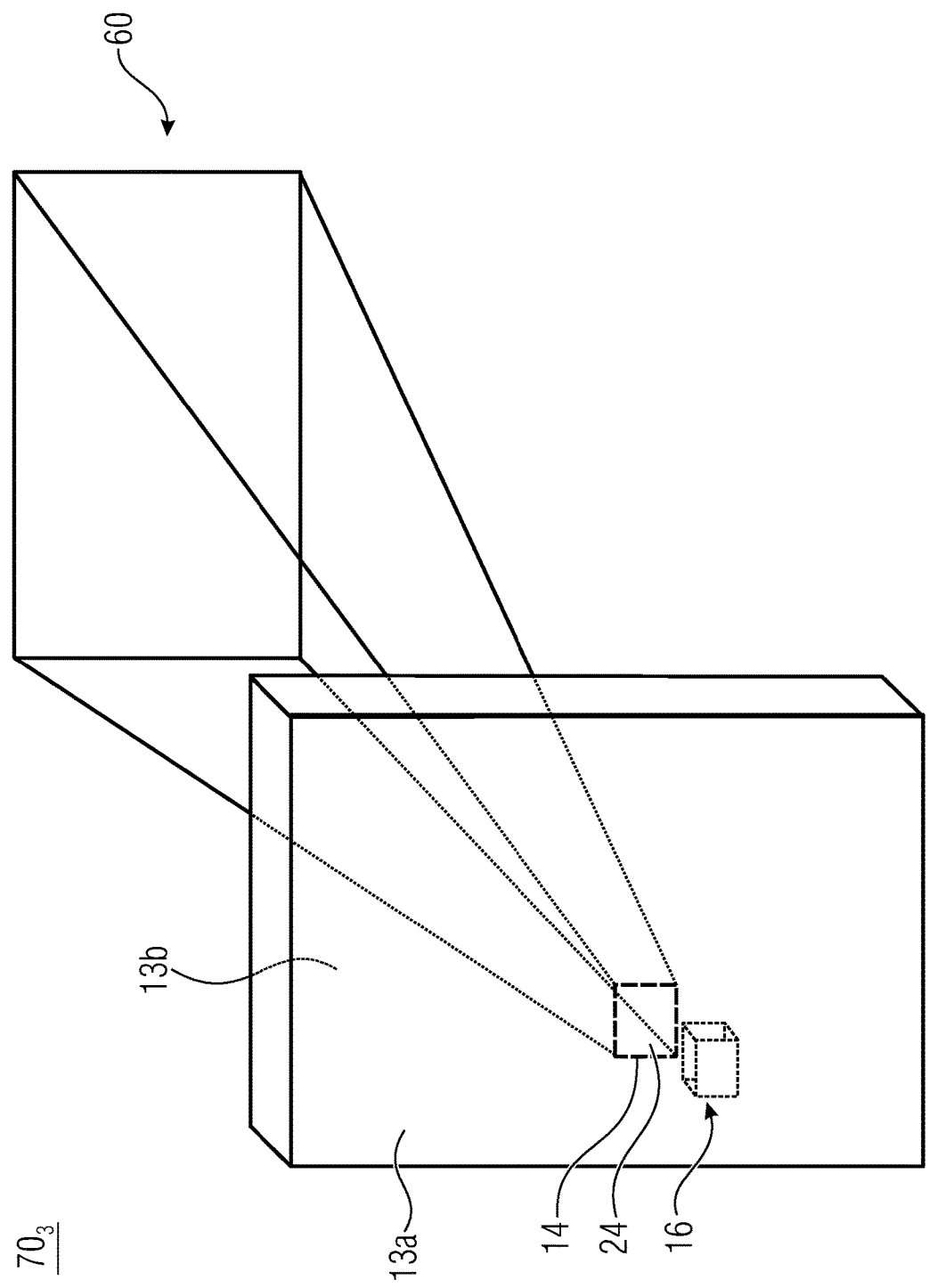
FIG. 7c shows a schematic perspective view of an implementation of a multi-aperture imaging device according to an embodiment, comprising a single viewing direction.

According to a further implementation that is illustrated in FIG. 7c, the imaging device 16 of a device $70_3$ is configured, in contrast to the devices $70_1$ and $70_2$, to comprise only one viewing direction so that an arrangement of a corresponding viewing window into other directions as well as the diaphragms, which are optional in any case, may be omitted.

Through the evaluation of the two wavelength ranges, the devices $70_2$ and $70_3$ may be configured to create a depth map of the total field of view.

Figure 8:
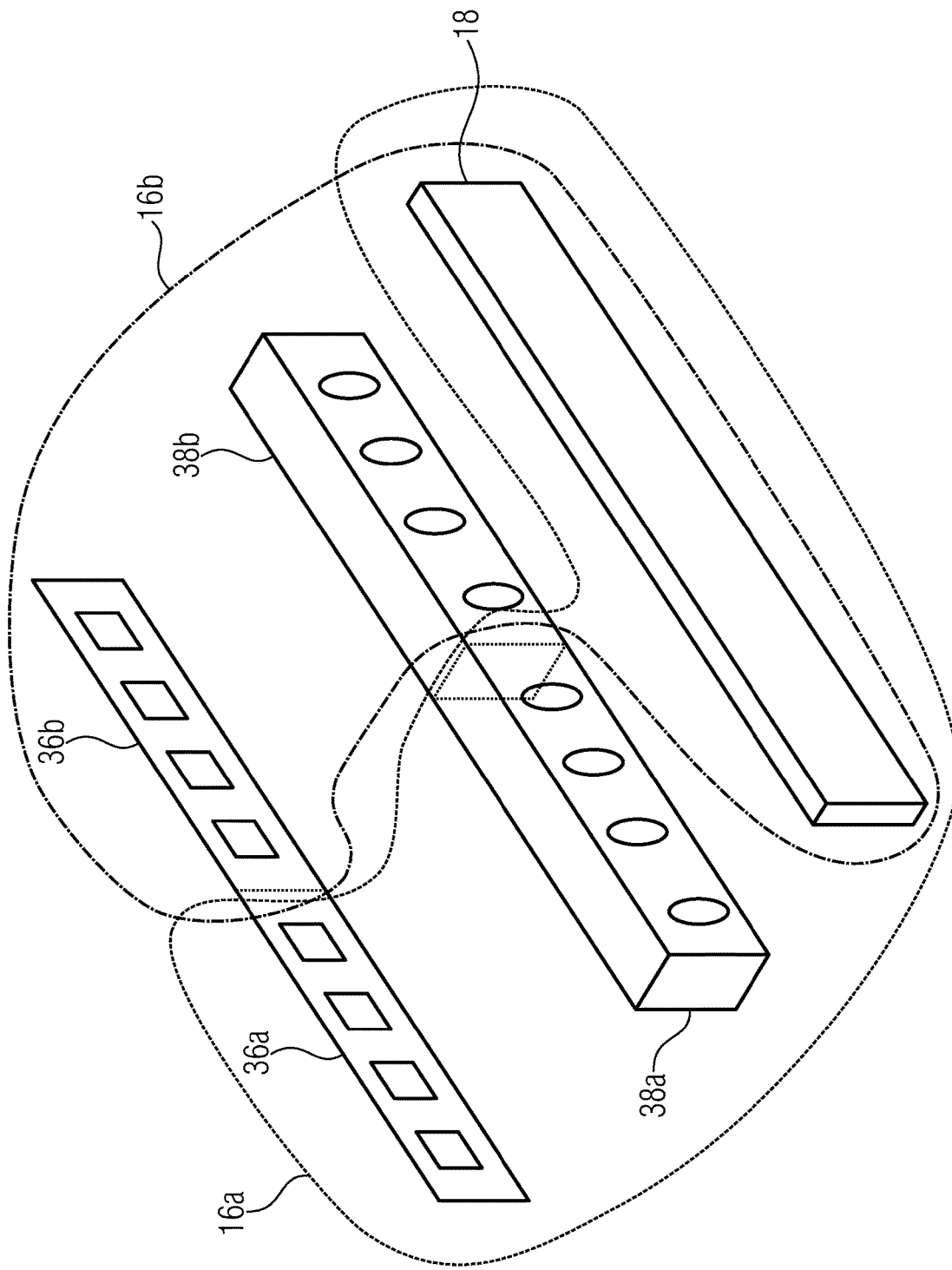
FIG. 8 shows a schematic structure including a first multi-aperture imaging device and a second multi-aperture imaging device comprising a shared image sensor.

FIG. 8 shows a schematic structure including a first multi-aperture imaging device 16a and a second multi-aperture imaging device 16b as may be arranged, for example, in the imaging system $70_1$. The multi-aperture imaging devices 16a and 16b may be formed fully or partially as a mutual multi-aperture imaging device. The one-line arrays 38a and 38b form a shared line. The image sensors 36a and 36b may be mounted on a shared substrate and/or on a shared circuit carrier such as a shared circuit board or a shared flex board. Alternatively, the image sensors 36a and 36b may also include mutually different substrates. Various combinations of said alternatives are also possible, of course, such as multi-aperture imaging devices including a shared image sensor, a shared array and/or a shared beam-deflecting means 18 as well as further multi-aperture imaging devices comprising separate components. What is advantageous about a shared image sensor, a shared one-line array and/or a shared beam-deflecting means is that a movement of a respective component may be achieved with high precision by controlling a small number of actuators and that synchronization between actuators may be reduced or avoided. Moreover, a high level of thermal stability may be achieved. Alternatively or additionally, further multi-aperture imaging devices may also comprise a shared array, a shared image sensor, and/or a shared beam-deflecting means. By arranging at least one further group of imaging optical channels, wherein any number thereof may be implemented, the multi-aperture imaging device may be configured to at least stereoscopically capture the total field of view.

It was already pointed out above that starting from the beam-deflecting means, the optical paths and/or optical axes may be directed into mutually different directions. This may be achieved in that the optical paths are directed during deflection at the beam-deflecting means and/or by the optics in deviation from being mutually parallel. The optical paths and/or optical axes may deviate from being parallel prior to, or without any, beam deflection. This circumstance will be circumscribed below by the fact that the channels may be provided with some kind of pre-divergence. With said pre-divergence of the optical axes it would be possible that, e.g., not all of the facet inclinations of facets of the beam-deflecting means differ from one another but that some groups of channels comprise, e.g., the facets having equal inclinations or are directed to same. The latter may then be formed to be integral or to continually merge into one another as a facet, as it were, which is associated with said group of channels adjacent in the line extension direction. The divergence of the optical axes of these channels might then originate from the divergence of these optical axes as is achieved by a lateral offset between optical centers of the optics of the optical channels and image sensor areas of the channels. The pre-divergence might be limited to a plane, for example. The optical axes might extend, e.g., within a shared plane prior to, or without any, beam deflection, but extend in a divergent manner within said plane, and the facets cause only an additional divergence within the other transversal plane, i.e. they are all inclined in parallel with the line extension direction and are mutually inclined only in a manner that is different from the above-mentioned shared plane of the optical axes; here, again, several facets may have the same inclination and/or be commonly associated with a group of channels whose optical axes differ pair by pair, e.g. already within the above-mentioned shared plane of the optical axes, prior to or without any beam deflection. In simplified terms, the optics may enable a (pre-) divergence of the optical paths along a first (image) direction, and the beam-deflecting means may enable a divergence of the optical paths along a second (image) direction.

The above-mentioned possibly existing pre-divergence may be achieved, for example, in that the optical centers of the optics lie on a straight line along the line extension direction, whereas the centers of the image sensor areas are arranged such that they deviate from the projection of the optical centers along the normal of the plane of the image sensor areas onto points that lie on a straight line within the image sensor plane, for example at points which deviate from the points that lie on the above-mentioned straight line within the image sensor plane, in a channel-specific manner, along the line extension direction and/or along the direction perpendicular to both the line extension direction and the image sensor normal. Alternatively, pre-divergence may be achieved in that the centers of the image sensors lie on a straight line along the line extension direction, whereas the centers of the optics are arranged to deviate from the projection of the optical centers of the image sensors along the normal of the plane of the optical centers of the optics onto points that lie on a straight line within the optic center plane, for example at points which deviate from the points that lie on the above-mentioned straight line within the optical center plane, in a channel-specific manner, along the line extension direction and/or along the direction perpendicular to both the line extension direction and the normal of the optical center plane. It is advantageous that the above-mentioned channel-specific deviation from the respective projection take place only in the line extension direction, i.e. that the optical axes which are located merely within a shared plane be provided with a pre-divergence. Both optical centers and image sensor area centers will then each be located on a straight line in parallel with the line extension direction, but with different intermediate gaps. A lateral offset between lenses and image sensors in the lateral direction perpendicular to the line extension direction would therefore result in an increase in the installation height. A mere in-plane offset in the line extension direction does not change the installation height but might possibly result in a reduced number of facets and/or in that the facets are tilted only in an angle orientation, which simplifies the design. For example, optical channels that are adjacent in each case may comprise optical axes that extend within the shared plane and are squinting in relation to one another, i.e. are provided with a pre-divergence. A facet may be arranged, with regard to a group of optical channels, to be inclined merely in one direction and to be parallel to the line extension direction.

Moreover, provision might be made for some optical channels to be associated with the same partial field of view, e.g. for the purpose of achieving a super-resolution and/or for increasing the resolution with which the corresponding partial field of view is sampled by said channels. The optical channels within such a group would then extend in parallel, e.g. prior to beam deflection, and would be deflected onto a partial field of view by one facet. Advantageously, pixel images of the image sensor of a channel of one group would be located at intermediate positions between images of the pixels of the image sensor of another channel of this group.

What would also be feasible, for example, even without any super-resolution purposes, but only for stereoscopy purposes, would be an implementation wherein a group of directly adjacent channels fully cover the total field of view with their partial fields of view in the line extension direction, and that a further group of mutually directly adjacent channels, for their part, fully cover the total field of view.

The above embodiments thus may be implemented in the form of a multi-aperture imaging device and/or of a device including such a multi-aperture imaging device, specifically with a one-line channel arrangement, wherein each channel transmits a partial field of view of a total field of view, and wherein the partial fields of view partly overlap. A design comprising several such multi-aperture imaging devices for stereo, trio, quattro, etc. designs for 3D imaging is possible. In this context, most modules may be implemented as one contiguous line. The contiguous line might benefit from identical actuators and a shared beam-deflecting element. One or more amplifying substrates that might possibly exist within the optical path may extend across the entire line, which may form a stereo, trio, quattro design. Super-resolution methods may be employed, several channels imaging the same partial image areas. The optical axes may extend in a divergent manner already without any beam-deflecting device, so that fewer facets on the beam-deflecting unit are needed. The facets will then advantageously only exhibit one angular component. The image sensor may be in one part, comprise only one contiguous pixel matrix or several interrupted ones. The image sensor may be composed of many partial sensors which are arranged, e.g., adjacently to one another on a printed circuit board. An autofocus drive may be configured such that the beam-deflecting element is moved synchronously with the optics or is idle.

In principle, any number of submodules including image sensor(s), imaging optic(s) and mirror array(s) may be arranged. Submodules may also be configured as a system. The submodules or systems may be installed within a housing such as a smart phone, for example. The systems may be arranged in one or more lines and/or rows and at any desired location. For example, two imaging devices 16 may be arranged within the housing 12 so as to enable stereoscopic capturing of a field of view.

In accordance with further embodiments, the device 70 includes further multi-aperture imaging devices 16, so that the total field of view 60 may be sampled by means of more than two multi-aperture imaging devices. This enables a number of partially overlapping channels that capture the total field since their viewing directions are adapted channel by channel. For capturing the total field of view in a stereoscopic manner or in a manner comprising a higher order, at least one further arrangement of channels may be arranged in accordance with embodiments described herein and/or with the described arrangement of channels, which may take shape as precisely one line or as separate modules. This means that the one-line array may be arranged, in a multi-line manner, with a further line; said further line of optical channels can be associated with a further multi-aperture imaging device. The optical channels of the further line may also capture respectively overlapping partial areas and together cover the total field of view. This enables obtaining a stereo, trio, quattro, etc. structure of array cameras consisting of channels which partly overlap and which cover the total field of view within their subgroup.

In other words, multi-aperture cameras comprising a linear channel arrangement may include several optical channels arranged adjacently to one another and transmitting parts of the total field of view, respectively. In accordance with embodiments, a mirror (beam-deflecting means) may be advantageously arranged before the imaging lenses, wherein said mirror may be used for beam deflection and may contribute to reducing the installation height. In combination with a mirror adapted channel-by-channel such as a facet mirror, for example, wherein the facets may be planar or exhibit any type of curvature or be provided with a freeform surface, it may be advantageous to structure the imaging optics of the channels in an essentially identical manner, whereas the viewing directions of the channels are influenced or predefined by the individual facets of the mirror array. In combination with a planar mirror (a mirror configured to be flat), the imaging optics of the channels may be configured or implemented differently, so that different viewing directions will result. The deflection mirror (beam-deflecting device) may be pivoted; the axis of rotation may extend perpendicularly to the optical channels, i.e., in parallel with the line extension direction of the channels. The deflection mirror may be reflective on both sides; metallic or dielectric layers or sequences of layers may be arranged to obtain reflectivity. Rotation or translational displacement of the mirror may be analogous or stable along two or several directions. Stable may be understood to mean that a force is to be applied to achieve a movement along a predicted direction, when said force is fallen below, this may result in freezing or a rearward movement of the beam-deflecting means.

The analogous rotation (rotation movement 52) may be used for one-dimensional adaptation of the image location, which may be understood as being optical image stabilization. For example, a movement by only a few degrees may be sufficient here, e.g., ≤15°, ≤10° or ≤1°. The rotation of the mirror that is stable along two or several directions may be used for switching the viewing direction of the camera. One may switch, for example, between the viewing directions in front of, next to, and behind the display. Analogous movements or positions and movements or positions which are stable along two/several directions may be combinable, i.e., superimposable. For example, solutions found for portable devices such as smartphones, for example, which use two cameras with different viewing directions toward the front and toward the rear, may be replaced, by embodiments described herein, by a structure that includes only one imaging device. Unlike known solutions, the structure may be characterized, for example, that the viewing window is arranged within the housing for the cameras with front and rear viewing directions at the same position, i.e. in an opposite manner within upper or lower housing covers. Areas of said housing covers that are arranged for beam passage may be transparent and may consist of, or include glass and/or polymers in the event that visible light is used.

Even though the above-described embodiments have been described in the sense that the device has first and second operating states, further operating states may be arranged, in accordance with further embodiments, for capturing further fields of view, i.e., at least a third field of view.

Subsequently, particularly advantageous implementations of multi-aperture imaging devices are described based on FIGS. 9a-d, wherein the devices may be implemented for themselves or as part of an inventive device such as the device $70_1$, $70_2$ and/or $70_3$.

For example, the illustrated side sectional views relate to respective facets of a facetted beam-deflecting means. For example, the beam-deflecting means may be formed as an array of facets. One facet may be assigned to each optical channel, wherein each facet may deflect one or several optical channels. Each of the facets may comprise a corresponding first beam-deflecting area and a second beam-deflecting area. As is illustrated FIGS. 4c-4f, the facets of the array of facets may be formed as mirrors that are reflective on both sides. The wedge shape illustrated in FIGS. 4c-4f may enable a small installation size, in particular when using only one viewing direction or when combining a rotational movement with a translational movement for switching between the four positions used for capturing two viewing directions and the use of two wavelength ranges. To this end, the beam-deflecting means may be moved such that, for alternately deflecting with different sides, the front edge of the facet is slightly moved up and down without the surface normal of the sides 35a and 35b being parallel to a surface normal of the image sensor.

On the other hand, a simple and/or small installation size along the line-extension direction of the array may be obtained by supporting the beam-deflecting means to be rotational around 90° or more, e.g. approximately 180° or even 360°. In this way, e.g., the four mentioned positions may be obtained solely by a rotational movement so that additional facets and/or a translational movement may be omitted. Furthermore, this enables a simple implementation of the facets as plane-parallel mirrors, e.g. as a single plane-parallel mirror, adjusting the divergence of the optical paths by means of the optics, and/or as mutually slanted or tilted plane-parallel facets that fully or partially adjust the divergence.

Figure 9A:
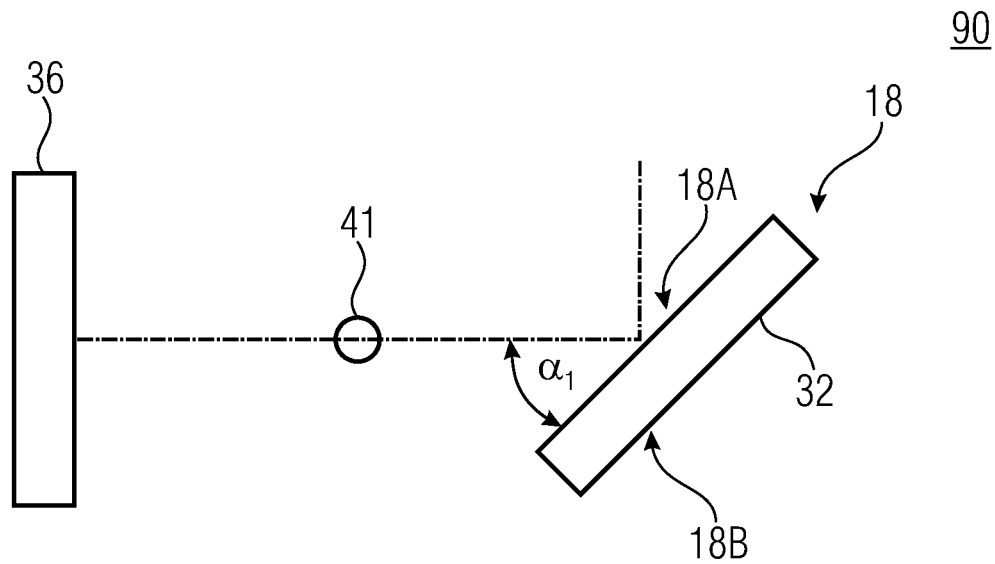
FIGS. 9a-d show schematic views of a multi-aperture imaging device according to an embodiment, using different wavelength ranges.

FIG. 9a shows a schematic side-sectional view of a multi-aperture imaging device 90 according to an embodiment, wherein the opposite sides 18A and 18B are implemented to deflect an optical path 22 in such a way that a filtering takes place at the sides 18A and 18B with respect to the reflective wavelength. The beam-deflecting means is shown in a first position in which the side 18A faces the image sensor 36.

The beam-deflecting means 18A comprises a first beam-deflecting area, e.g., formed at the side 18A and operative for a first wavelength range of electromagnetic radiation passing through the optical channel, e.g. the visible wavelength range. The beam-deflecting means comprises a second beam-deflecting area 18B, e.g., operative for a second wavelength range of electromagnetic radiation passing through the optical channel, e.g. ultraviolet (UV), infrared (IR) or near-infrared (NIR), the second wavelength range being different from the first wavelength range.

The wavelength ranges may be disjunctive, however, may also partially overlap, as long as they are at least partially different and therefore enable obtaining different image information.

This enables obtaining capturings of different wavelength ranges by means of the image sensor 36 so that, e.g., the second capturing may be used to create a depth map for the first capturing, particularly in combination with a coded (N)IR pattern emitted by the device 90.

FIG. 9a shows the beam-deflecting means 18 in a first position. For obtaining a first capturing of the total field of view, the beam-deflecting means may be configured to comprise a tilt angle $\alpha_1$ of the first beam-deflecting area 18A with respect to the image sensor of 45° within a tolerance range of ±10°, ±5°, or ±2°. For example, the side 18A fully provides the corresponding first beam-deflecting area and the side 18B fully provides the corresponding second beam-deflecting area, so that the terms are used synonymously herein. However, the beam-deflecting areas may also only cover part of the side.

Figure 9B:
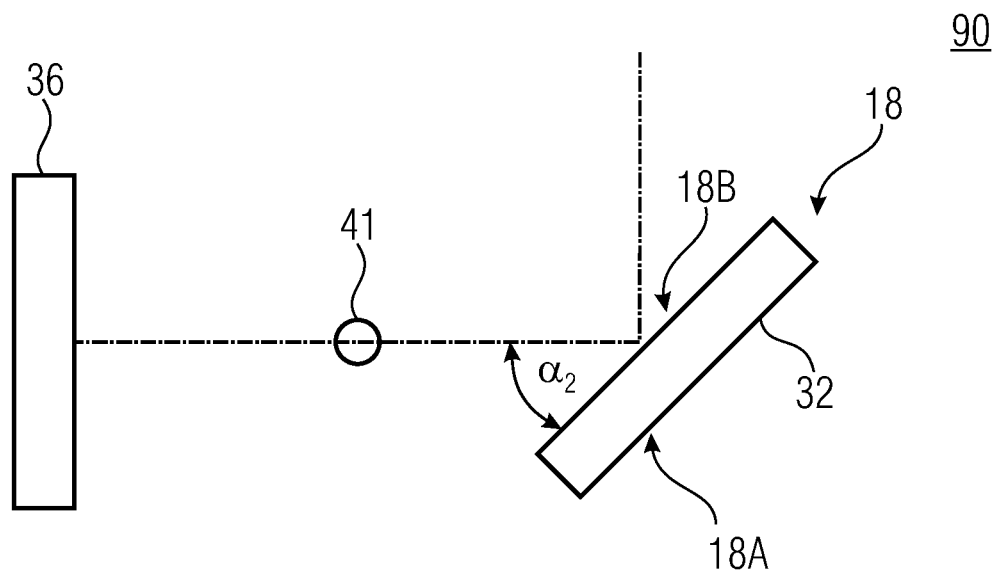

FIG. 9b shows the beam-deflecting means 18 in a second position, where the side 18B faces the image sensor so that the side 18B is operative to deflect NIR light, for example. For example, the beam-deflecting means 18 may be rotated around 180° compared to the first position. The beam-deflecting area 18A may be arranged on a first side of the beam-deflecting means 18, and the second beam-deflecting area 18B may be arranged on a second side arranged opposite to the first side. In its entirety or in the individual beam-deflecting elements, the beam-deflecting means 18 may be configured such that, in order to capture the first capturing of the total field of view, the first side is arranged to face the image sensor, and, in order to capture a second capturing of the total field of view, the second side is arranged to face the image sensor. A rotational and/or translational movement may be used to change the sides facing the image sensor.

A plane-parallel implementation of the beam-deflecting means or of the facet thereof makes it possible that the facet, or the beam-deflecting means 18, for obtaining a second capturing of the total field of view, e.g. using the second wavelength range, comprises a tilt angle $\alpha_2$ of the second beam-deflecting area 18B with respect to the image sensor of 45° within a tolerance range of ±10°, ±5°, or ±2°. For example, the tolerance ranges may compensate the fact that beam-deflecting elements include a tilt angle that slightly differs from 45°, resulting from a slanting or tilting of different facets of the beam-deflecting means 18 with respect to each other, so that approximately 45° may be obtained on average, however, the individual facets or deflection areas deviate therefrom due to their individual tilt.

The beam-deflecting means 18A and 18B may be obtained through differently implemented coatings that are operative to be reflective or non-reflective in the first and second wavelength ranges, respectively.

Embodiments provide that a corresponding coating having one or several layers is provided on the sides of the beam-deflecting means 18 in order to generate the beam-deflecting areas 18A and 18B. For example, these layers may comprise one or several dielectric layers that, with respect to their layer thickness, may be adapted to the tilt angle of the beam-deflecting means.

Since, depending on the selected operation mode or the desired wavelength range for the capturing, portions of wavelength ranges, particularly of the respectively other wavelength range, may strike the beam-deflecting means 18, some embodiments comprise an area for absorbing certain wavelengths, e.g. a volume absorber or the like. The area may be covered by the coating so that, e.g., a reflection of some wavelengths is first carried out, and non-reflected, e.g. transmitted, wavelength ranges are absorbed. Thus, e.g., when capturing the first wavelength range, the corresponding wavelengths may be reflected by the coating, whereas other wavelengths, e.g. at least undesired parts of the second wavelength range, for example, are transmitted, i.e. let to pass through, by these layers. The absorption area arranged behind the coating may absorb these portions in order to avoid, or at least reduce, a negative influence on the imaging in the multi-aperture imaging device. A complementary means for absorption of undesired parts of the first wavelength range may be arranged on the second side, operative when the second wavelength range 18B is used for the beam-deflection.

Figure 9C:
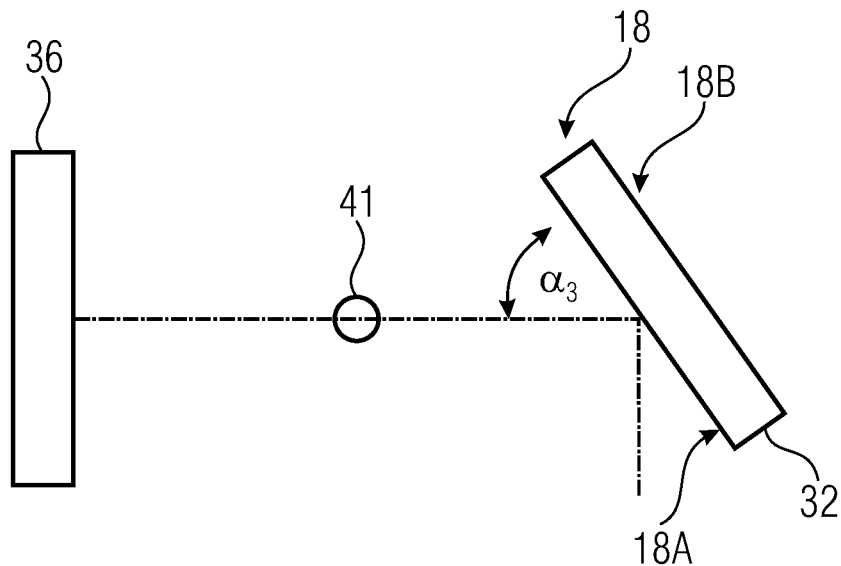

FIG. 9c shows the beam-deflecting means 18 in an optional third position, where the side 18A again faces the image sensor, however, the tilt is selected such that the optical paths are deflected towards a second total field of view, e.g., which is the first total field of view of FIG. 9a and FIG. 9b.

Figure 9D:
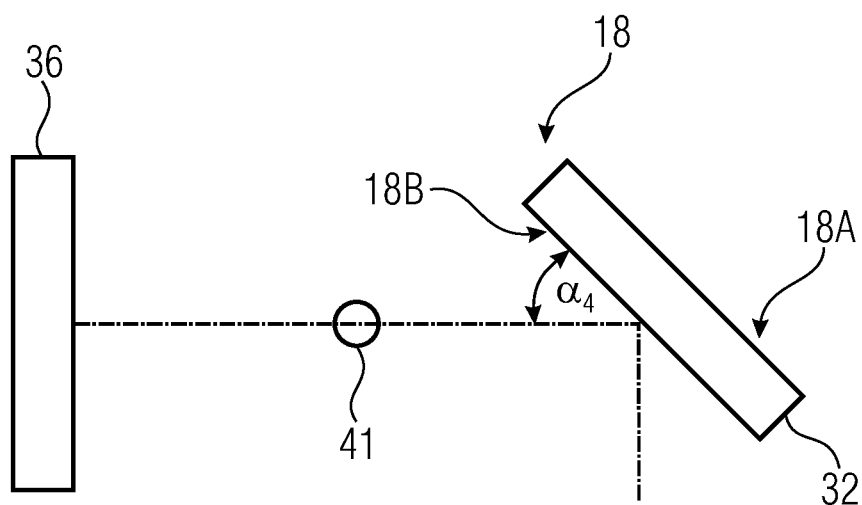

FIG. 9d shows the beam-deflecting means in an optional fourth position, where the side 18B again faces the image sensor, e.g., so that the side 18B is operative to deflect from the second total field of view towards the image sensor 36.

By means of the additional positions for capturing the second total field of view according to FIG. 9c and FIG. 9d, a capturing of the second total field of view may be captured with the image sensor using the first beam-deflecting area 18A, so that this capturing is based on the first wavelength range. In addition, the second total field of view may be imaged with a further capturing by using the beam-deflecting area 18B with the image sensor, so that this capturing is based on the second wavelength range.

The two total fields of view may be arranged along different main directions of the multi-aperture imaging device, e.g. along opposite directions, i.e. along directions that differ approximately by 180°. When performing a continuous rotational movement, e.g. along a sequence analogous to the sequence of FIGS. 9a-d, the beam-deflecting areas may deflect the optical path alternately towards the first total field of view and the second total field of view and alternately with the first beam-deflecting area 18A and the second beam-deflecting area 18B. This may be a possible but not necessary movement sequence. In fact, e.g., the rotational direction that enables a shortest and/or fastest positional change may be selected so that the positions may be changed in any sequence, particularly in the case of capturing a third total field of view along a third direction and/or when arranging the total fields of view in an angle unequal to 180°.

The angles of FIGS. 9a-9d may be selected in any sequence, e.g. each being approximately 45°.

A translational displacement of the beam-deflecting means may also be implemented instead of or in combination with the described rotational displacement.

In order to obtain images, image information or images with different wavelength information, pixels of the image sensor may be configured to be operative for both wavelength ranges, and/or cells with different sensitivities may be arranged spatially adjacent so that at least the image sensor area is sensitive as to both wavelength ranges.

For example, the image sensor areas may be configured to generate images in the first wavelength range and to generate images in the second wavelength range. To this end, CMOS pixels may be sensitive, e.g., in the visual range and in the NIR range at the same time, the superimposed color filter array ("CFA"—in the visual range typically in the Bayer arrangement) may also contain "filter pixels" according to the color (red, green, blue; or magenta, cyan, yellow) from which only some and only partially transmit the NIR, however, which is sufficient. Alternatively or additionally, in a cell arrangement, e.g., in the extended Bayer pattern, individual cells may be exchanged for or implemented as cells that are only sensitive in the NIR.

For example, pixels of the image sensor areas may be configured to generate images in the first wavelength range and to generate images in the second wavelength range. Thus, the invention relates to beam-deflecting means using the facetVISION architecture with a different implementation of the front and rear sides of the mirrors, wherein facetVISION refers to the multi-aperture imaging devices described herein.

A core idea consists in implementing the deflection mirror such that it has different functionalities on its front and rear sides.

This particularly concerns the reflectivity, in particular the spectral reflectivity (i.e. depending on the incident wavelengths), the $1^{st}$ side particularly reflects the visual spectral range (visual—VIS) using the desired beam-deflecting angle, however, it does not reflect the near-infrared (NIR), and the $2^{nd}$ side reflects the NIR using the desired beam-deflection, however, it does not deflect VIS, which is all performed by the dielectric layer systems that are differently implemented on the $1^{st}$ and $2^{nd}$ mirror sides.

This enables the following:

The same camera may be used "simultaneously" or very quickly in succession as a VIS or NIR camera—just by mirror switching.

The mirror no longer necessarily has a wedge shape, but is a simple plane-parallel plate. A 180° rotation is used for mirror switching of VIS/NIR. Possible negative installation space implications in the rotation range of the mirror may be solved by opening and closing cover glasses in the location of the windows (openings of the device).

The camera may be constructed with only a one-sided viewing direction ("world" or "selfie"), the mirror switching (180°) is then only used to change the captured spectral range. However, it may also continue to allow front and rear viewing directions. For example, in rotation steps of 90° of the mirror: world-VIS, selfie-NIR, world-NIR, selfie-VIS.

The combination with field of view division and image stitching (e.g. 2 channels) is obviously possible.

An implementation as a dual camera is also possible, in order to generate a disparity-based depth map for the image stitching (e.g. 4 channels). However, this is not required (and therefore channel-efficient and significantly cost-efficient) because:

The above arrangement may now be combined with structured, or coded, illumination (such as with Kinect) in the NIR (in one mirror position, the camera now sees also in the NIR) and may therefrom generate a depth map which is needed for image-stitching of the VIS image. This all takes place only with two field of view-divided camera channels, the special mirror and only with the help of the NIR dot pattern projector, without an additional NIR camera.

The target of reduction from 4 to 2 channels is achieved even without adding an additional NIR camera (which would be the $3^{rd}$ optical channel), only an additional NIR projector is needed.

Cost reduction while maintaining the advantage of the overall installation height, just through an alternative generation of the depth map, which is partly integrated into the system itself.

Figure 10:
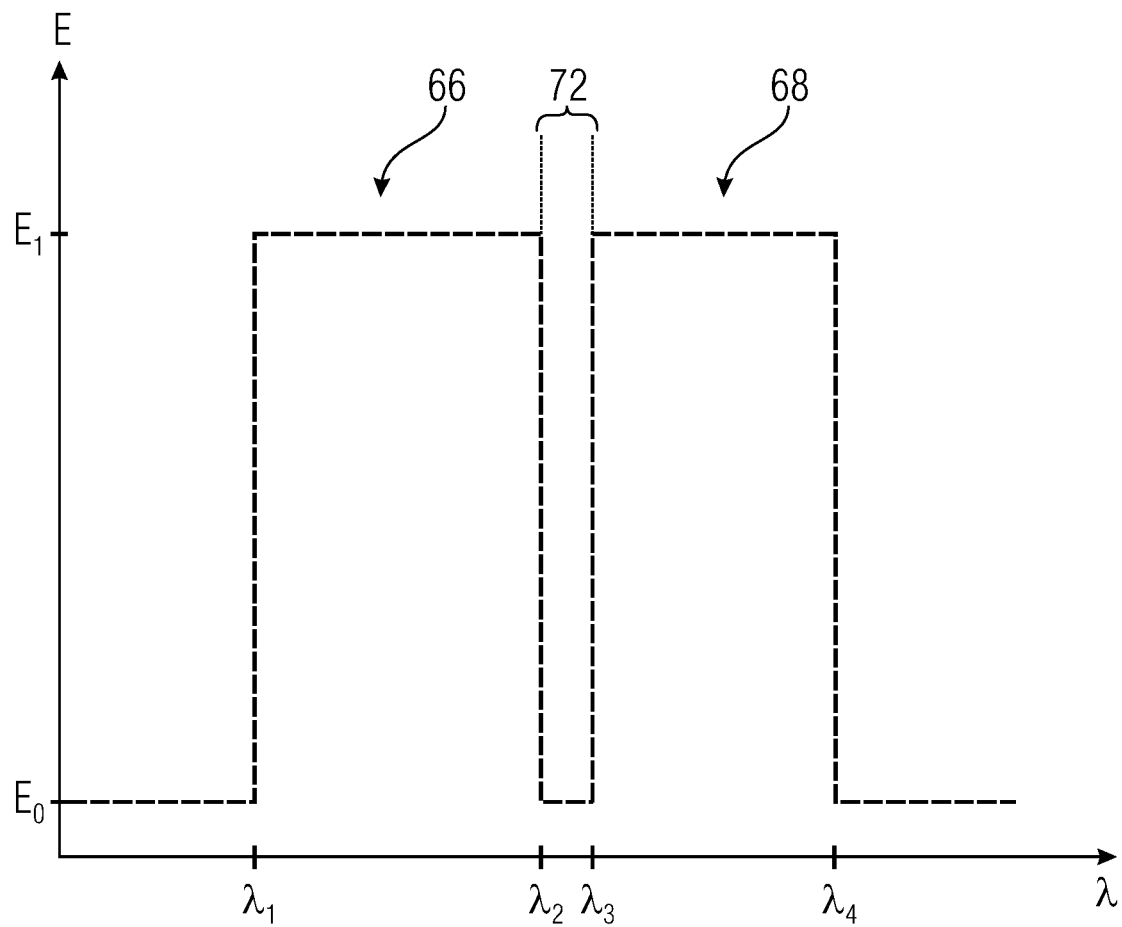
FIG. 10 shows a schematic graph of a sensitivity of an image sensor area of the image sensor of the multi-aperture imaging device across the wavelengths of a first and a second wavelength range according to an embodiment.

FIG. 10 shows a schematic graph of a sensitivity E of an image sensor area of the image sensor of the multi-aperture imaging device across the wavelengths λ of wavelength ranges 66 and 68, e.g. the sensitivity of one or several of the image sensor ranges 44a-d. The image sensor ranges may be configured to generate images in the first wavelength range 66 and to generate images in the second wavelength range 68. For example, the first wavelength range 66 is arranged between a first lower wavelength $\lambda_1$ and a first upper wavelength $\lambda_2$, wherein $\lambda_1 < \lambda_2$. For example, the second wavelength range 68 is arranged between a second lower wavelength $\lambda_3$ and a second upper wavelength $\lambda_4$, wherein $\lambda_3 < \lambda_4$. Although FIG. 10 is illustrated such that the second wavelength range 68 comprises larger wavelengths than the first wavelength range 66, it is also possible for the second wavelength range 68 to comprise smaller wavelength than the first wavelength range 66. The wavelength ranges 66 and 68 may overlap one another, however, they may also be spaced apart from one another by an intermediate area 72.

The image sensor area may be configured to generate image data at least in the wavelength ranges 66 and 68, meaning that it comprises a sensitivity $E_1$ at least in the wavelength ranges 66 and 68, which is increased with respect to a sensitivity $E_0$, e.g., where the image sensor range does not generate image data or image signals since it is not sensitive to these wavelengths.

The beam deflection may be carried out selectively for the wavelength ranges 66 and 68 so that attenuating or filtering out wavelengths accordingly takes place outside of the respective wavelength range for which the beam-deflecting area is currently in operative, it being sufficient to only suppress or attenuate wavelengths that are arranged in the complementary wavelength range. For example, this means that a wavelength range for which the image sensor is not sensitive may also be deflected by the beam-deflecting area 18A and/or 18B. In simplified terms, the image sensor area may also be implemented for imaging outside of the wavelength ranges 66 and 68.

For example, the image sensor area may comprise a multitude of image points, i.e. pixels (image elements). Each pixel may be formed from at least one, advantageously several, imaging sensor cells, i.e. which are photo-sensitive. They may be arranged freely or according to a pattern such as a Bayer pattern. For example, a sensitivity of the image sensor area for the second wavelength range 68 may be obtained through a first subset of pixels being sensitive to the first wavelength range 66 and a second subset of different pixels being sensitive to the second wavelength range 68. Depending on the desired resolution of the first and/or second capturing, a pixel of the first subset may be arranged interlaced or alternately, i.e. 1:1, or in any other ratio. Alternatively or additionally, it is possible for one, several, or all of the sensor cells of a pixel to be sensitive to the first and the second wavelength ranges 66 and 68. Alternatively or additionally, it is also possible for the pattern of the sensor cells to be changed for the first wavelength range 66 in such a way that sensor cells that are sensitive to the second wavelength range 68 are added and/or substitute sensor cells from the pattern. Pixels of the image sensor areas may be configured to generate images in the first wavelength range 66 or to generate at least partially images in the second wavelength range 68.

Above-described embodiments concern single or stereoscopic capturing of total fields of view. The following describes implementations of multi-aperture imaging devices that may comprise the same or at least comparable structural individual features such as with respect to the implementation of image sensor areas, optics, the combination of optics into an array and/or the optional use of beam-deflecting means.

The embodiments described in the following aim to reduce the installation space and/or the number of components needed in order to obtain small cameras or multi-aperture imaging devices. In addition, the described embodiments aim to counteract the effect of occlusions, i.e. masking of image contents.

In this context, embodiments concern a multi-aperture imaging device having image sensor means with a plurality of image sensor areas. This refers to the fact that a single image sensor may be arranged, or several image sensors may be arranged continuously or at distributed locations. The multi-aperture imaging device includes a plurality of optical channels 42a-42c, wherein each optical channel includes an optic for imaging a partial field of view of a total field of view onto an image sensor area 44a/44c of the image sensor means 12 associated with the optical channel. The plurality of optical channels 42a-42c is configured to fully image the total field of view. However, a first partial field of view of the total field of view and a second partial field of view of the total field of view are captured by a different number of optical channels.

The different number allows providing a smaller number of optical channels, which makes smaller cameras possible. At the same time, an occlusion effect may be at least partially eliminated by a suitable arrangement of the optical channels, and in particular of those that capture multiple times a partial field of view, enabling high-quality images.

Figure 11A:
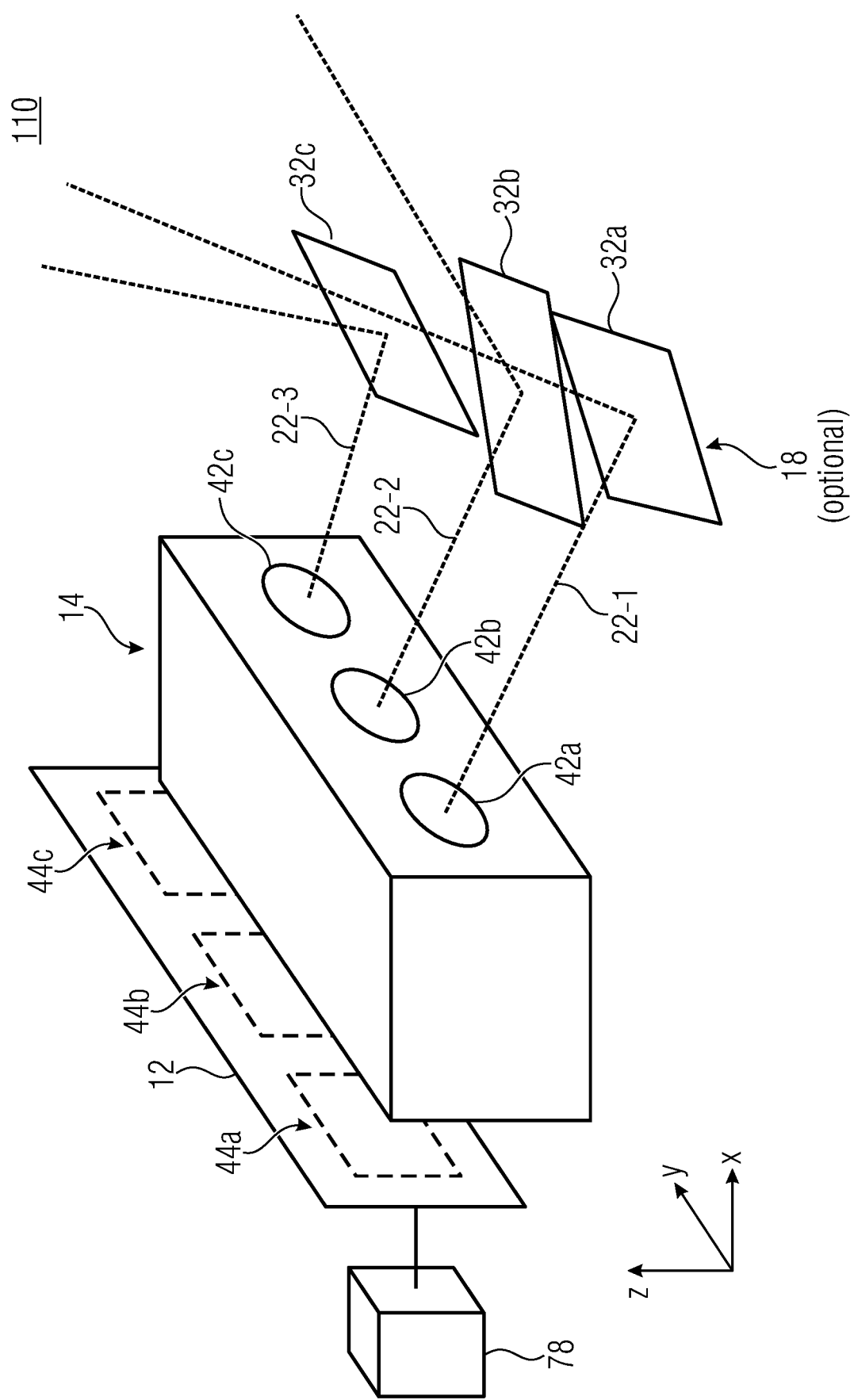
FIG. 11a shows a schematic perspective illustration of a multi-aperture imaging device according to an embodiment for capturing a total field of view with three optical channels.

FIG. 11a shows a schematic perspective illustration of a multi-aperture imaging device 110 in connection with this implementation. The multi-aperture imaging device 110 includes the image sensor 12, also referred to as image sensor means, including image sensor areas 44a-44c configured to receive images of optical channels 42a-42c and to convert the same into electronic signals. The optional beam-deflecting means 18 may deflect the optical paths 22-1 to 22-3 of the optical channels 42a-42c.

Figure 11B:
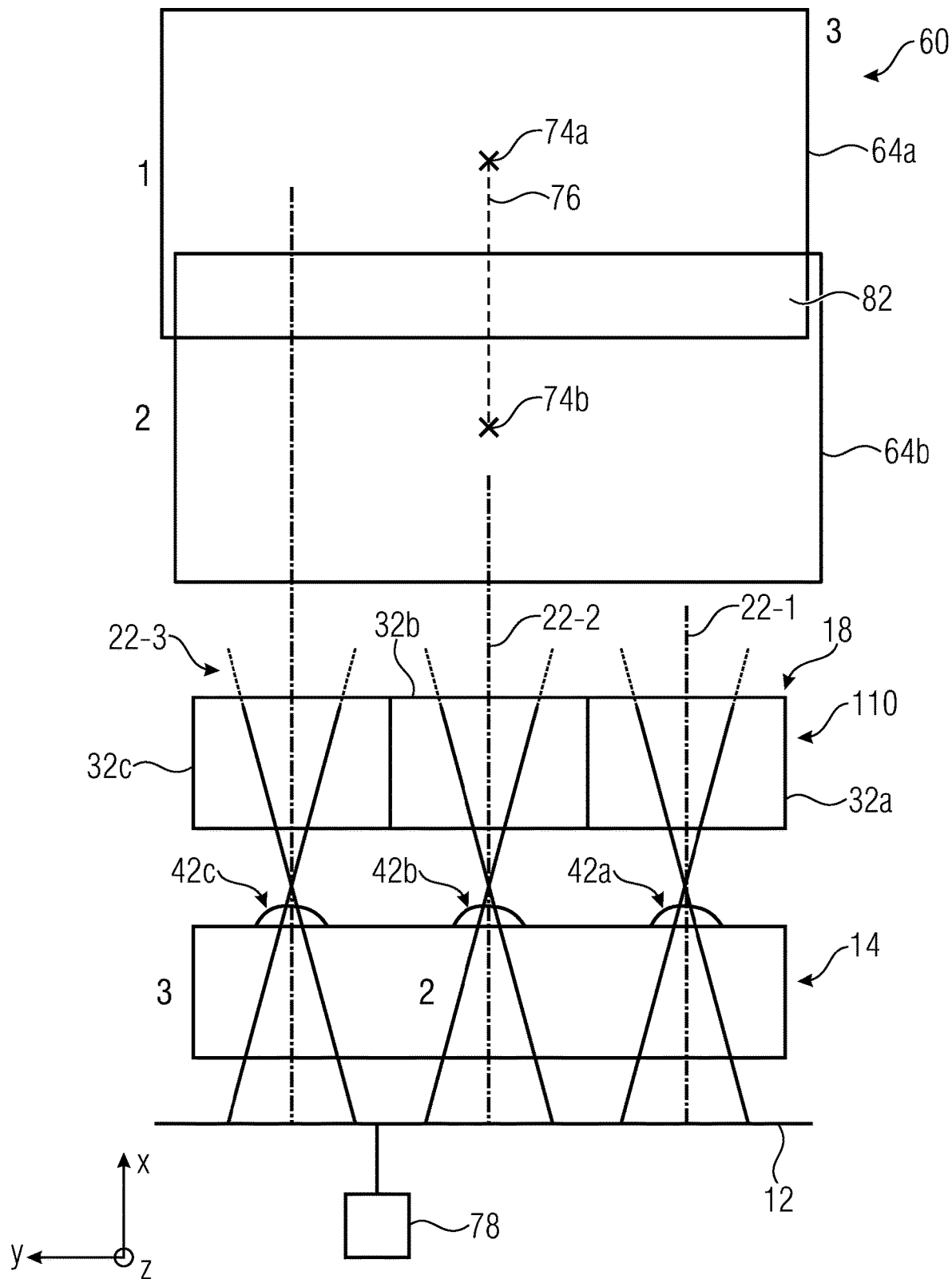
FIG. 11b shows a schematic top view of the multi-aperture imaging device of FIG. 11a as well as a schematic illustration of the total field of view.

FIG. 11b shows a schematic top view of the multi-aperture imaging device 110 of FIG. 11a as well as a schematic illustration of the total field of view 60 captured or recorded by the multi-aperture imaging device 110. For example, the multi-aperture imaging device 110 includes three optical channels, wherein any higher number may be implemented, e.g. 4, 5, 6, 7, 8, 9, 10, or more. The principles described herein remain valid. Thus, an increase in resolution or the like may be obtained by additional optical channels.

The plurality of the optical channels is adjacently arranged in the array 14. The optical channel for imaging the partial field of view 64b is exemplarily arranged between the optical channels for imaging the partial field of view 64a in the array 14. Alternatively, a different implementation may be selected.

The total field of view 60 is exemplarily divided into two partial fields of view 64a and 64b, wherein any other division is also possible, in particular, more than two partial fields of view that are arranged one-dimensionally or two-dimensionally in the object area.

The partial fields of view 64a and 64b may be arranged adjacent to each other and may overlap in an overlap area 82. For example, the centers 74a and 74b, e.g. geometrical centers, of the partial fields of view 64a and 64b, respectively, form a single-line array 76 that is arranged transversely, or perpendicularly, to the line-extension direction y of the array 14. However, it is also possible to position the partial fields of view 64a and 64b differently. However, the arrangement of the array 76 to be transverse to the line-extension direction y enables a particularly advantageous avoidance of occlusions.

The multi-aperture imaging device 110 is implemented such that the partial field of view 64b is imaged through a single optical channel, the optical channel 42b. Single may be understood to mean that only a single channel is provided to capture the partial field of view in order to create the total image. In contrast, the partial field of view 64ba is imaged through the optical channels 42a and 42c, i.e. with a different number than the partial field of view 64b. The number of optical channels is geared towards the number of times the respective partial fields of view 64a or 64b is actually imaged as such by the multi-aperture imaging device 60 and the number of times the information obtained is used for creating a total field of view. For example, this does not include additional or other capturings of partial fields of view that are implemented differently with respect to orientation and/or size and are used, for example, for a wide-angle functionality or a zoom functionality, as will be described later.

Identical partial fields of view refer to a matching section in the object area that may have mechanical tolerances, but does not comprise any intentional deviation in the object area.

According to the embodiment of FIGS. 11a and 11b, the partial field of view 64a is now captured stereoscopically, whereas the partial field of view 64b is recorded with a different number, for example with a smaller number, i.e. once.

For joining or stitching the individual images of the partial fields of view 64a and 64b, depth information is advantageously used. The same may be created for the partial field of view 64a by means for image evaluation 78. The means for image evaluation is connected directly or indirectly to the image sensor 12 and is configured to obtain and evaluate image information from the image sensor area 44a-44c.

For example, for the partial field of view 64a, image information that was captured from different viewing directions of the optical channels 42a and 42c is available from two optical channels for the partial field of view 64a. The means 78 for image evaluation may be configured to combine the image information of the partial field of view 64a in order to obtain depth information for the corresponding partial image.

Thus, depth information may also be obtained for an overlap area 82 in which the partial fields of view 64a and 64b overlap with each other. This makes it possible to implement the means 78 for image evaluation in such a way that image information for the partial field of view 64a is aligned with image information of the partial field of view 64b obtained by the optical channel 42b and evaluated by the means 78. That is, the image of the partial field of view 64b may be used as a reference image and individual objects and/or the total image of the partial field of view 64a may be aligned with respect to the partial image of the partial field of view 64b.

This makes it possible, through the means 78, to obtain a total image that is based on a different number of partial images in different total image areas, e.g., based on two capturings in a total image area of the partial field of view 64a, and based on a single capturing in a total image area of the partial field of view 64b.

This makes it possible to omit a fourth optical channel to capture twice the partial field of view 64b, enabling smaller sizes of the multi-aperture imaging device 110. In addition, by means of the stereoscopic capturing 64a, an occlusion may be avoided, the avoidance being particularly effective if the optical channels for capturing the same partial field of view are as far apart as possible in the array 14 and/or if the array 76 is positioned transversely/perpendicularly to the line-extension direction y.

The multi-aperture imaging device may also comprise a different arrangement of the optical channels with respect to the partial fields of view and/or a different number of optical channels. Also, a one-dimensional or two-dimensional arrangement of the partial fields of view in the total field of view may be implemented. Instead of capturing two partial fields of view with three optical channels, as illustrated, this may also result in different combinations, such as nine partial fields of view that are imaged with twelve optical channels.

Figure 12A:
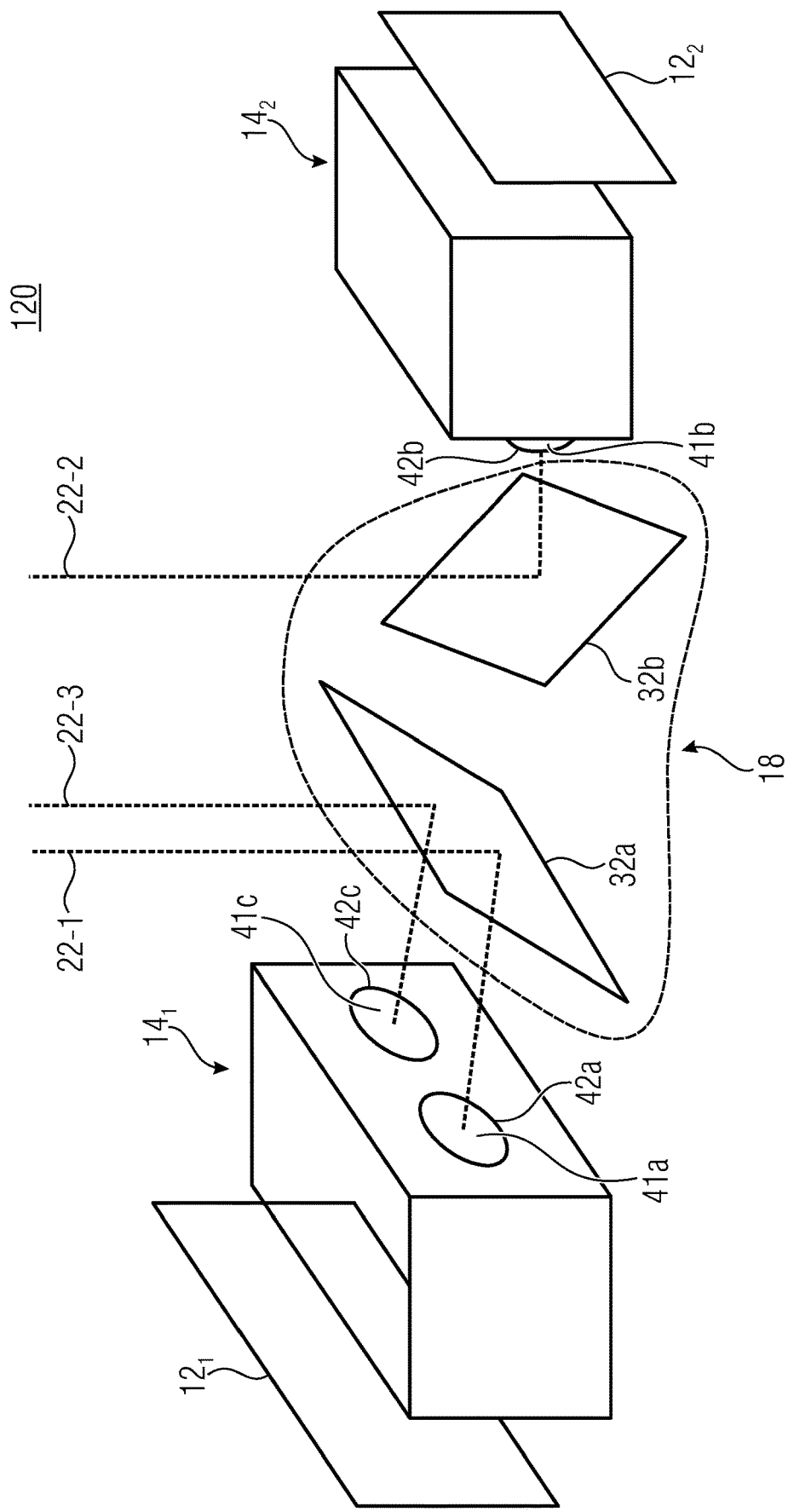

FIG. 12a shows a schematic perspective view of a multi-aperture imaging device 120 according to an embodiment, in which the arrangement of the optics 41a-41c and/or optical channels 42a-42c is changed in comparison to the multi-aperture imaging device 110. While a viewing direction of optical channels in the multi-aperture imaging device 100 may be the same at least in an area between the image sensor and the optics, i.e. the optical channels have a substantially same viewing direction, the viewing directions of the optical channels of the multi-aperture imaging device 110 may be different, e.g. by the viewing direction of the optical channel 42b being opposite to the viewing direction of the optical channels 42a and 42c.

Thus, for example, the optical channels form two opposite groups. For example, in comparison to the multi-aperture imaging device 110, the optical channels 42a and 42c are arranged opposite to the optical channel 42b such that the optic 41b for imaging the partial field of view 64b is arranged opposite to the optics 41a and 41c for imaging the partial field of view 64a. The multi-aperture imaging device 120 comprises the beam-deflecting means 18 that is implemented such that the optical paths 22-1 to 22-3 are deflected. To this end, the beam-deflecting means 18 is arranged between the optics 41a to 41c on the one hand and the optic 41b on the other hand.

The beam-deflecting means 18 may implement a fixed deflection angle. In such a case, the beam-deflecting means 18 may be implemented as a prism or a mirror that is fixedly arranged, for example. It is also possible to use a mutual carrier substrate for both deflection sides, onto which corresponding facets are then applied using a molding technique.

Alternatively, the beam-deflecting means 18 may be configured to vary a viewing direction of the multi-aperture imaging device. In this case, the beam-deflecting means 18 may be implemented such that beam-deflecting elements 32a and 32b are supported to be rotatable about their own, possibly parallel, rotation axis. It is possible to implement the beam-deflecting means 18 such that the beam-deflecting elements are configured to be reflective on both sides and deflect the optical paths 22-1 to 22-3 with different main sides in different states, as is described in connection with FIGS. 4a-4h, for example. Alternatively, it is also possible to use the same main side for deflection in both states.

With respect to a position of the optics 41a and 41c, the optic 41b may exemplarily be opposite to one of the optics 41a or 41c or have a different position. It is advantageous to arrange the optic 41b centered with respect to the optics 41a and 41c since this enables a symmetrical implementation of the multi-aperture imaging device.

The beam-deflecting element 32a may be formed as a mutual facet for the optical paths 22-1 and 22-3 since the optical paths possibly extending in parallel with respect to each other in the area between the image sensor $12_1$ and the array $14_1$ are deflected towards the same partial field of view. Alternative embodiments provide an individual implementation or arrangement of beam-deflecting elements for the optical channels 42a and 42c.

The arrangement of the optical channels 42a, 42b and 42c is advantageous, but exemplary. Thus, it is also possible to arrange the optical channels 42b together with the optical channel 42a or 42c in a mutual array $14_1$ and to arrange the remaining optical channel opposite thereto in the array $14_2$ that is formed by a single optical channel in this case.

As described in connection with the multi-aperture imaging device 110, a different number of optical channels may be arranged overall.

Figure 12B:
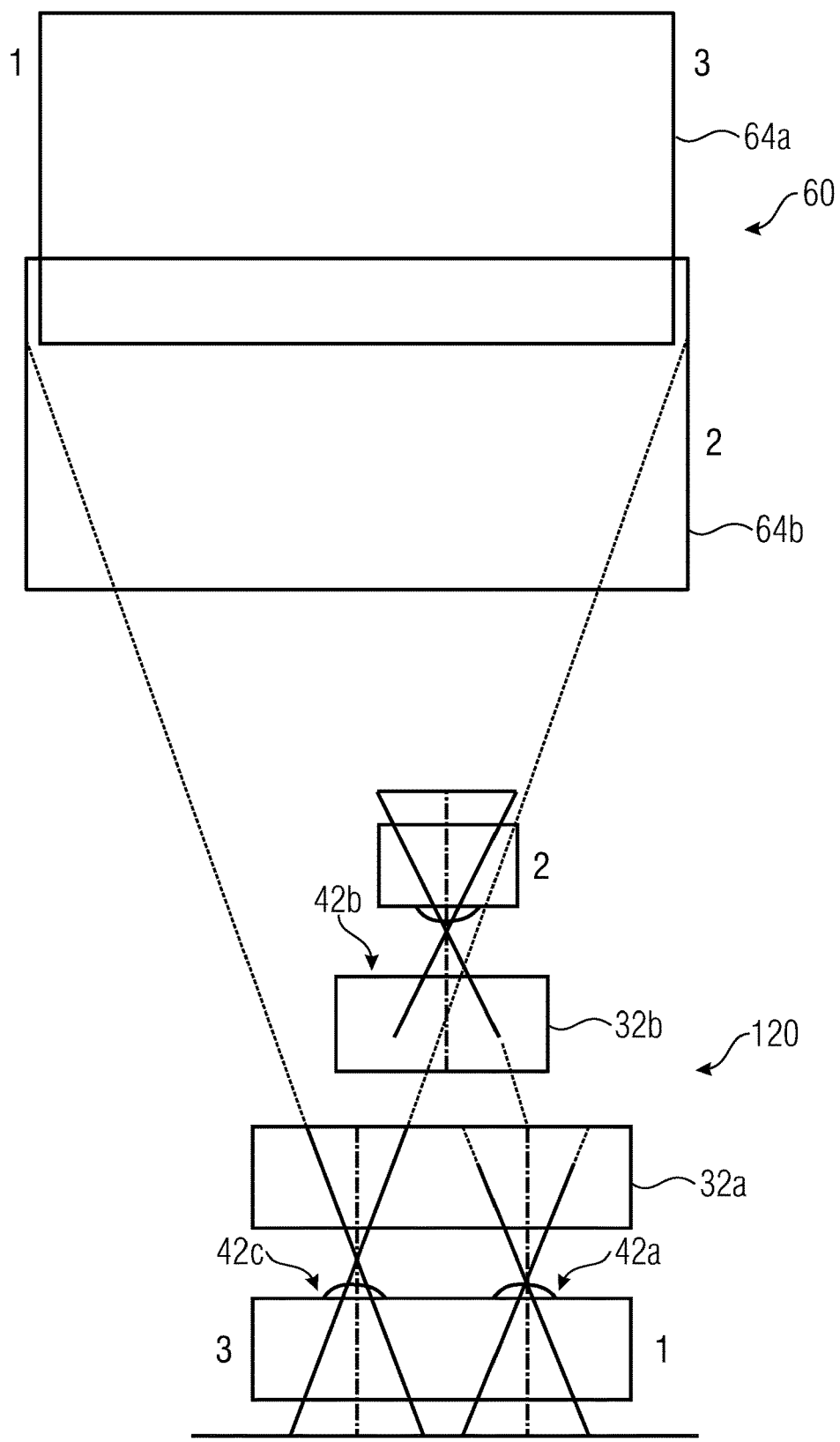
FIG. 12b shows a schematic top view of the multi-aperture imaging device of FIG. 12a together with an illustration of the total field of view.

FIG. 12b shows a schematic top view of the multi-aperture imaging device 120 together with an illustration of the total field of view 60. The opposite arrangement of the optical channels 42a and 42c on the one hand and the optical channel 42b on the other hand enables to capture symmetrically the total field of view 60, same as with the multi-aperture imaging device 110.

While FIGS. 11a, 11b, 12a and 12b describe embodiments of a multi-aperture imaging device that comprises exactly three optical channels that are configured to completely image the total field of view 60 through the partial field of view 64a and the partial field of view 64b, further embodiments are geared towards the fact that a different number of optical channels and/or partial fields of view is provided. With regard to the implementations of the multi-aperture imaging devices 110 and 120, the optical channels for imaging one of the partial fields of view may be adjacently arranged and be spaced apart from an optical channel for imaging a different partial field of view, as is described for the multi-aperture imaging device 110.

As an alternative to this, it is possible to arrange optical channels for imaging a partial field of view adjacently and opposite to one or several optical channels for imaging a different partial field of view, as is described in connection with the multi-aperture imaging device 120.

Each of the illustrated optical channels comprises an associated image sensor area 44. These parts, the optics and the image sensor area, possibly also further components, may be respectively combined into a module so that the multi-aperture imaging device may be provided as a combination of modules. In this case, a module may comprise one or several optical channels. A module with at least two optical channels and/or image sensor areas may be implemented such that the image sensor areas and/or the optics of the optical channels comprise a mutual substrate, e.g. in the form of a carrier 39 described in connection with FIG. 5a.

In combination, the multi-aperture imaging device 110 and the multi-aperture imaging device 120 are implemented such that a first group of optical channels is implemented to capture the total field of view 60 completely, i.e. the partial fields of view 64a and 64b. Completely may be understood such that all image information needed is available. Additional optical channels are not required or provided in order to create the total image. For example, the group may include the optical channels 42a and 42b or 42c and 42w. A further group of optical channels, which may also only include a single optical channel, is configured to capture the total field of view partially. This may be the other one of the optical channels 42a or 42c, respectively.

Figure 13A:
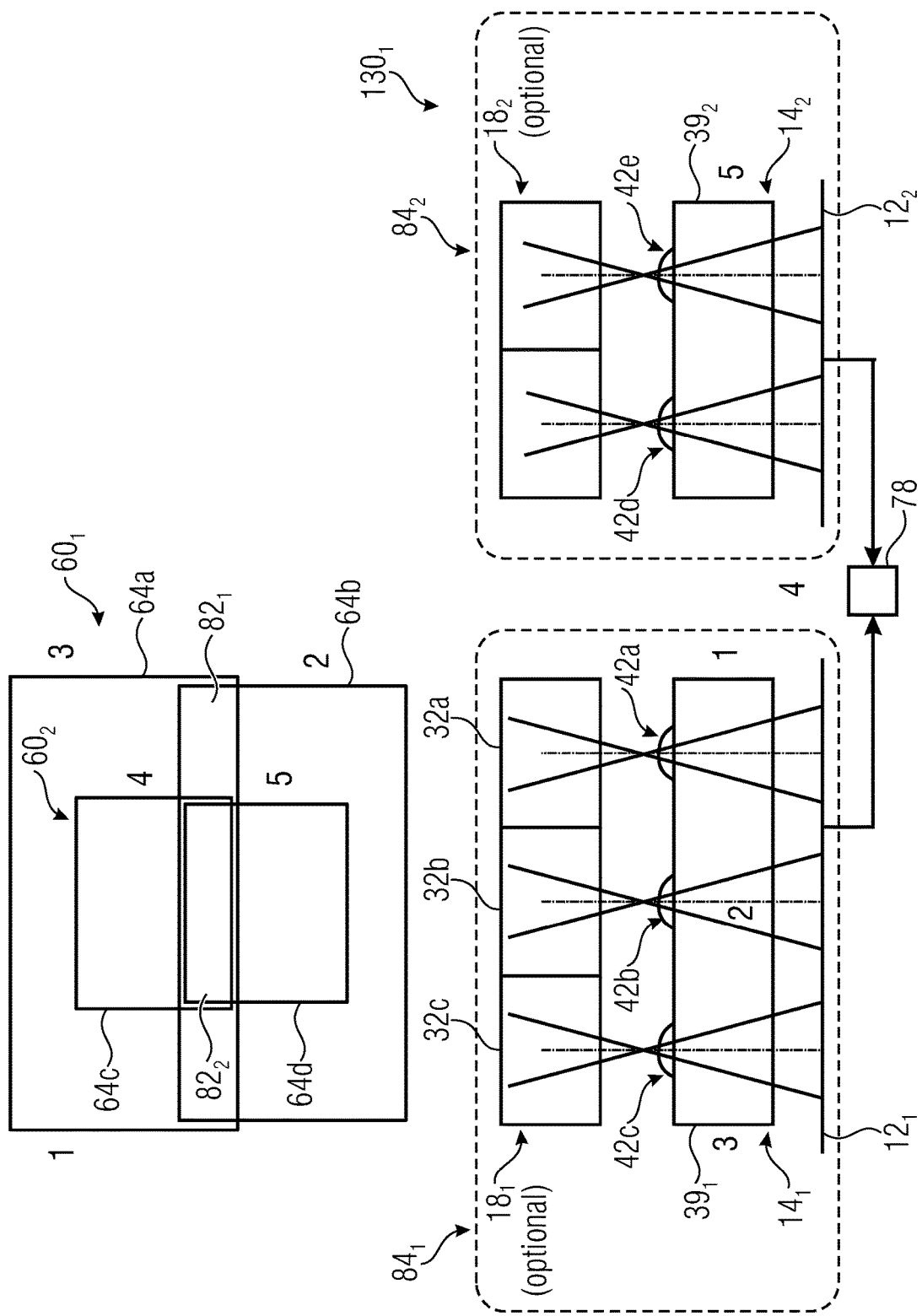
FIGS. 13a-d show schematic top views of multi-aperture imaging devices according to embodiments, each being configured to capture two overlapping fields of view.

FIG. 13a shows a schematic top view of a multi-aperture imaging device $130_1$, which may be implemented similarly to the multi-aperture imaging device 110. Similar to the multi-aperture imaging device 110, matching digits in the area of the optical channels 42 show the associated partial field of view 64 in the object area. For example, the arrangement of the array $14_1$ with the optical channels 42a, 42b, and 42c is formed as a mutual module $84_1$ comprising a continuous transparent carrier $39_1$, for example. Furthermore, for example, a continuous single image sensor $12_1$ with the corresponding image sensor areas is provided.

In addition to capturing or imaging a total field of view $60_1$, which may exemplarily correspond to the total field of view 60 of FIG. 11b, the multi-aperture imaging device further comprises optical channels 42d and 42e configured to sample together a total field of view $60_2$. The total field of view $60_2$ comprises an overlap with the total field of view $60_1$. Although the total field of view $60_2$ is illustrated such that it is a section of the total field of view $60_1$, the total field of view $60_1$ may alternatively also be a section of the total field of view $60_2$, which may be based on a size of the individual partial fields of view.

Thus, the optical channels 42a-42e are still configured to asymmetrically image the total field of view $60_1$, i.e. the partial fields of view with a different number. Further additional optical channels 42d and 42e are associated with different partial fields of view of a different total field of view.

Partial fields of view 64c and 64d may be arranged parallel to the arrangement of the partial fields of view 64a and 64b, however, a different arrangement is also possible. Although the total field of view $60_2$ is illustrated such that it forms a centered section of the total field of view $60_1$, a different positioning and/or orientation are also possible. It may be adjusted by adjusting the beam-deflection and/or by a relative orientation of the optical channels 42d and 42e relative to the optical channels 42a and 42c.

As an example, the arrangement of the optical channels 42d and 42e as a second or further module $84_2$ is formed. However, the optical channels 42a-42e may be formed in any arrangement from one or several modules.

The means 78 may be connected to the image sensors $12_1$ and $12_2$ in order to obtain the image information of one, several, or all partial fields of view. The means 78 may be configured to combine and/or to stitch the imaging information of the partial fields of view 64c and 64d, however, this is also possible without stereoscopically sampling the partial fields of view 64c and 64d. This means that, even if there is no direct stereoscopic information outside of an overlap area $82_2$ of the partial fields of view 64c and 64d, orientation of individual image areas or objects outside of the overlap area $82_2$ is possible. To this end, the means 78 may be configured to generate stereo pairs of partial fields of view of different total fields of view, e.g., by generating a pair of the partial field of view 64a from the optical channel 42a and/or 42c for the partial field of view 64c and/or by forming a stereo pair from the partial fields of view 64b and 64d.

The symmetrical arrangement of the partial fields of view shown is advantageous; however, it does not limit the embodiments in this respect.

The individual modules $84_1$ and $84_2$ may each comprise optional beam-deflecting means $18_1$ and $18_2$, respectively. Alternatively, the beam-deflecting means $18_1$ and/or $18_2$ may also be arranged outside of the modules or may not be provided.

Figure 13B:
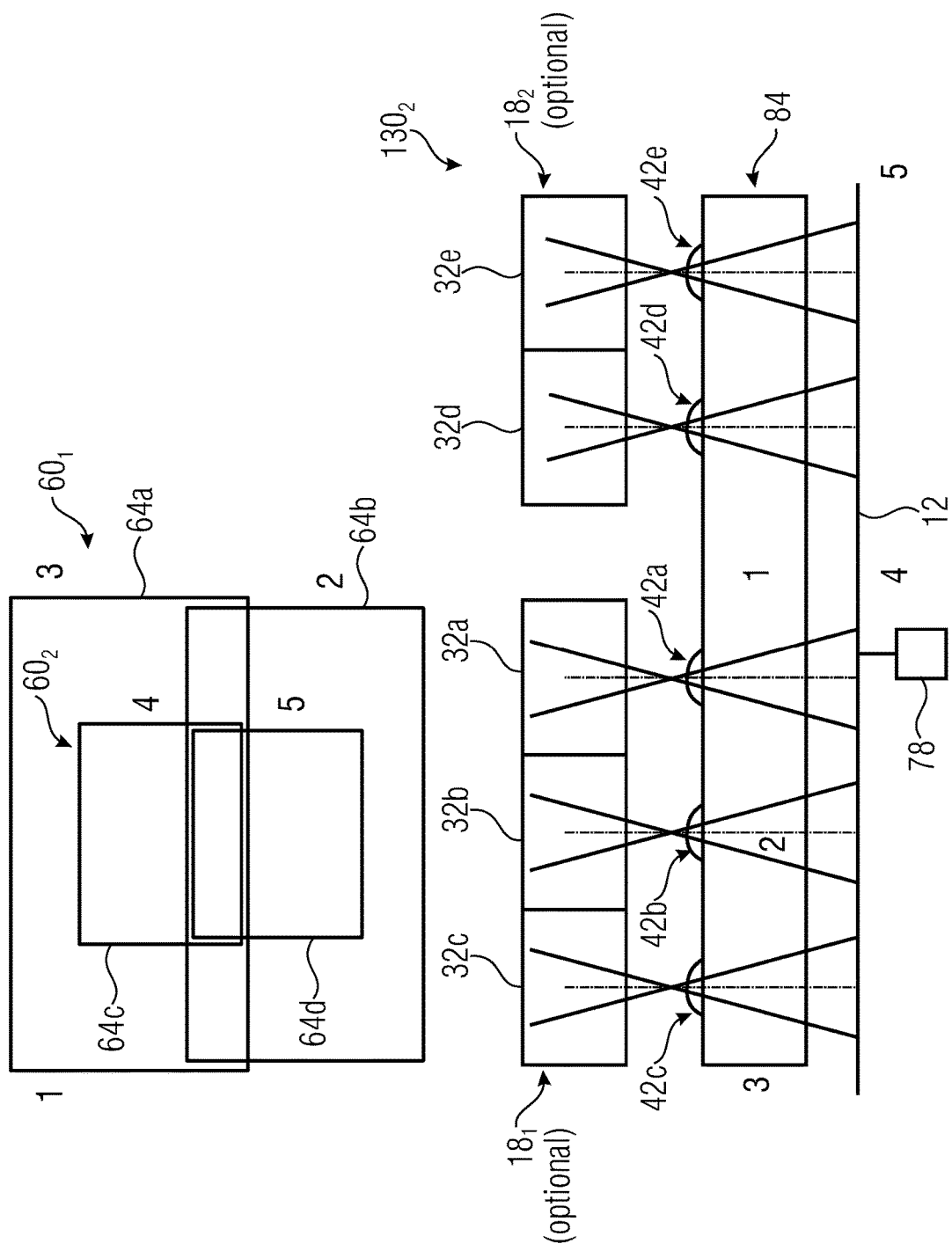

FIG. 13b shows a schematic top view of a multi-aperture imaging device $130_2$, wherein, in contrast to the multi-aperture imaging device $130_1$, the optical channels 42a-42e are formed as a mutual module with the image sensor 12 comprising corresponding image sensor areas for the optical channels 42a-42e. For example, the module is formed without the optional beam-deflecting means $18_1$ and $18_2$ so that the beam-deflecting means $18_1$ and $18_2$ may be arranged separately and/or positioned individually. Alternatively, the optional beam-deflecting means may also be implemented such that it comprises the beam-deflecting areas 32a-32e, which are operable for all optical channels.

As is illustrated in FIG. 13a, the optical channels 42a-42e may be arranged in a mutual linear array of optical channels, wherein said array may be formed by the two partial arrays $14_1$ and $14_2$ or by a mutual module.

Figure 13C:
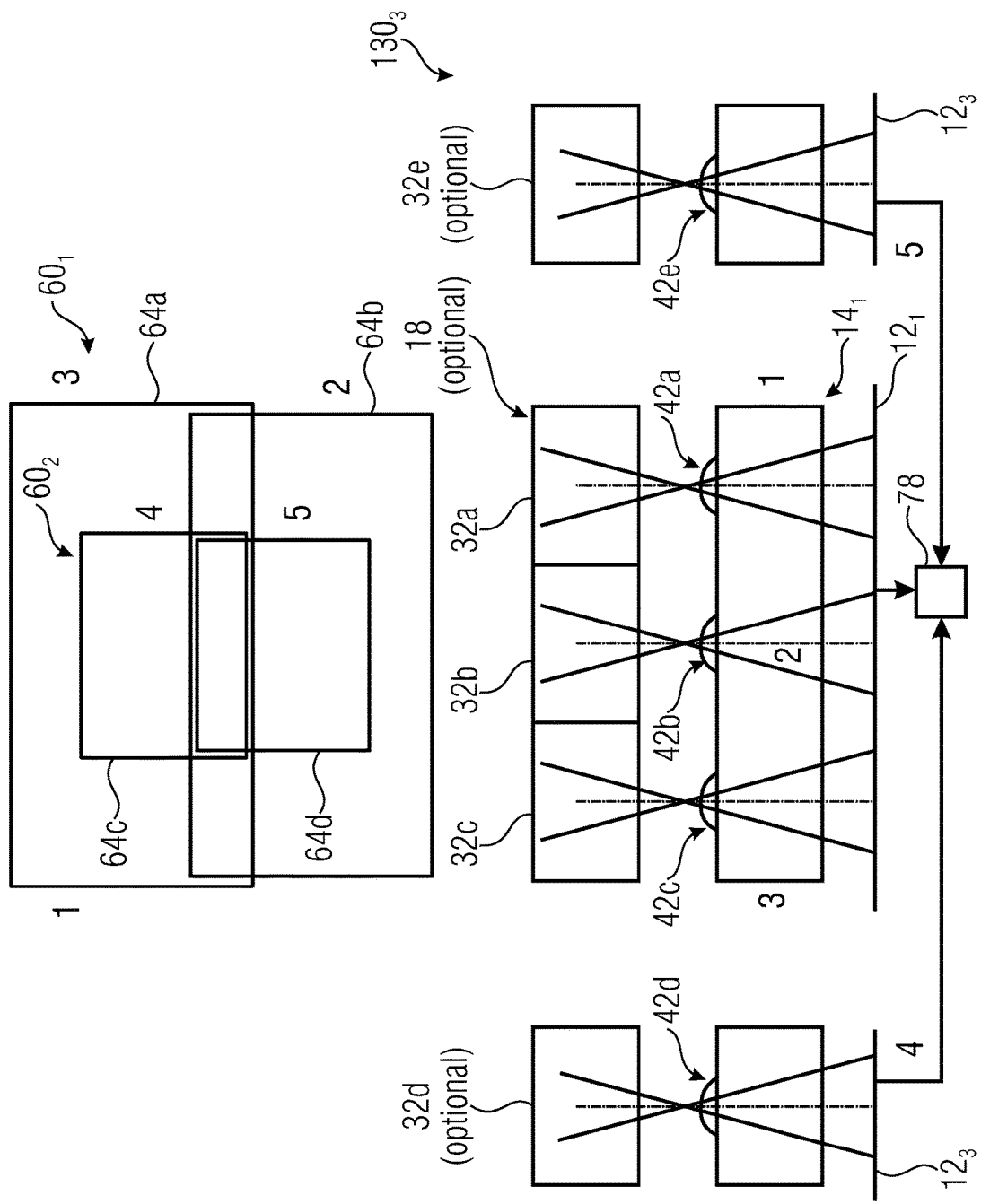

FIG. 13c shows a schematic top view of a multi-aperture imaging device $130_3$, which may be structured similarly to the multi-aperture imaging devices $130_1$ and $130_2$. In contrast to these multi-aperture imaging devices, optical channels 42d and 42e for capturing the partial field of view $60_2$ may be spaced apart from one, several, or all optical channels 42a-42c for capturing the partial field of view $60_1$. In this way, the optical channels 42a-42c may form a linear arrangement and be arranged between the optical channels 42d and 42e, for example. Alternatively, it is also conceivable that the optical channels 42a and 42e and/or the optical channels 42c and 42d are interchanged, for example.

Figure 13D:
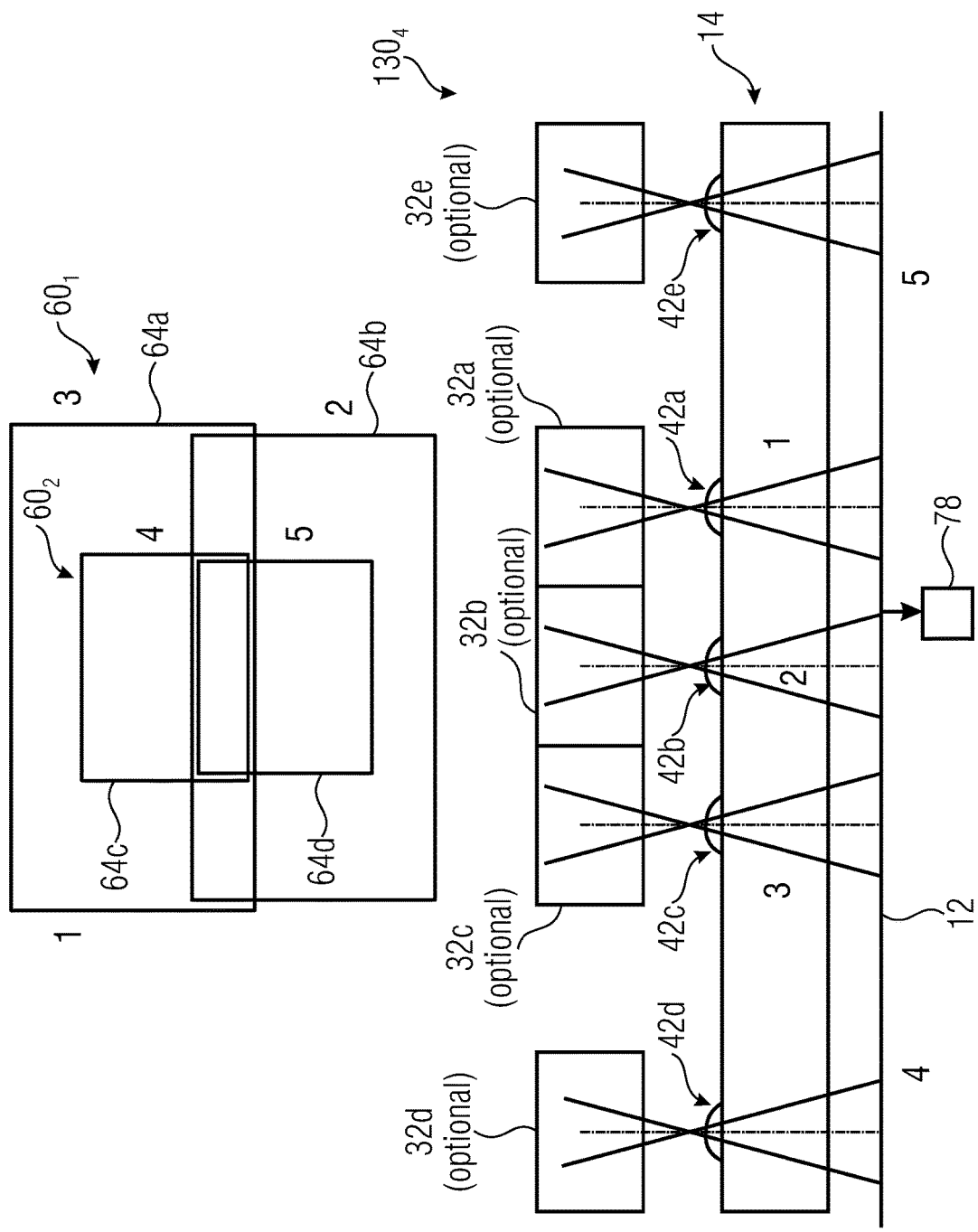

FIG. 13d shows a schematic top view of a multi-aperture imaging device $130_4$ according to an embodiment, wherein optical channels 42a-42c for imaging the total field of view $60_1$ and optical channels for imaging the total field of view $60_2$ are not arranged in different linear arrays of optical channels, as is the case in FIG. 13a, but several or even all optical channels 42a-42e for capturing different total fields of view are arranged in a mutual linear array 14.

Possibly different sizes of the partial fields of view 64a and 64b on the one hand and 64c and 64d on the other hand may lead to different dimensions or sizes of the optics of the optical channels. In this respect, it may be advantageous to implement the optical beam-deflecting elements individually or to group them at the most within groups of optical channels of the same focal length, as is illustrated in FIGS. 13a, 13b, 13c and 13d, for example.

Figure 14:
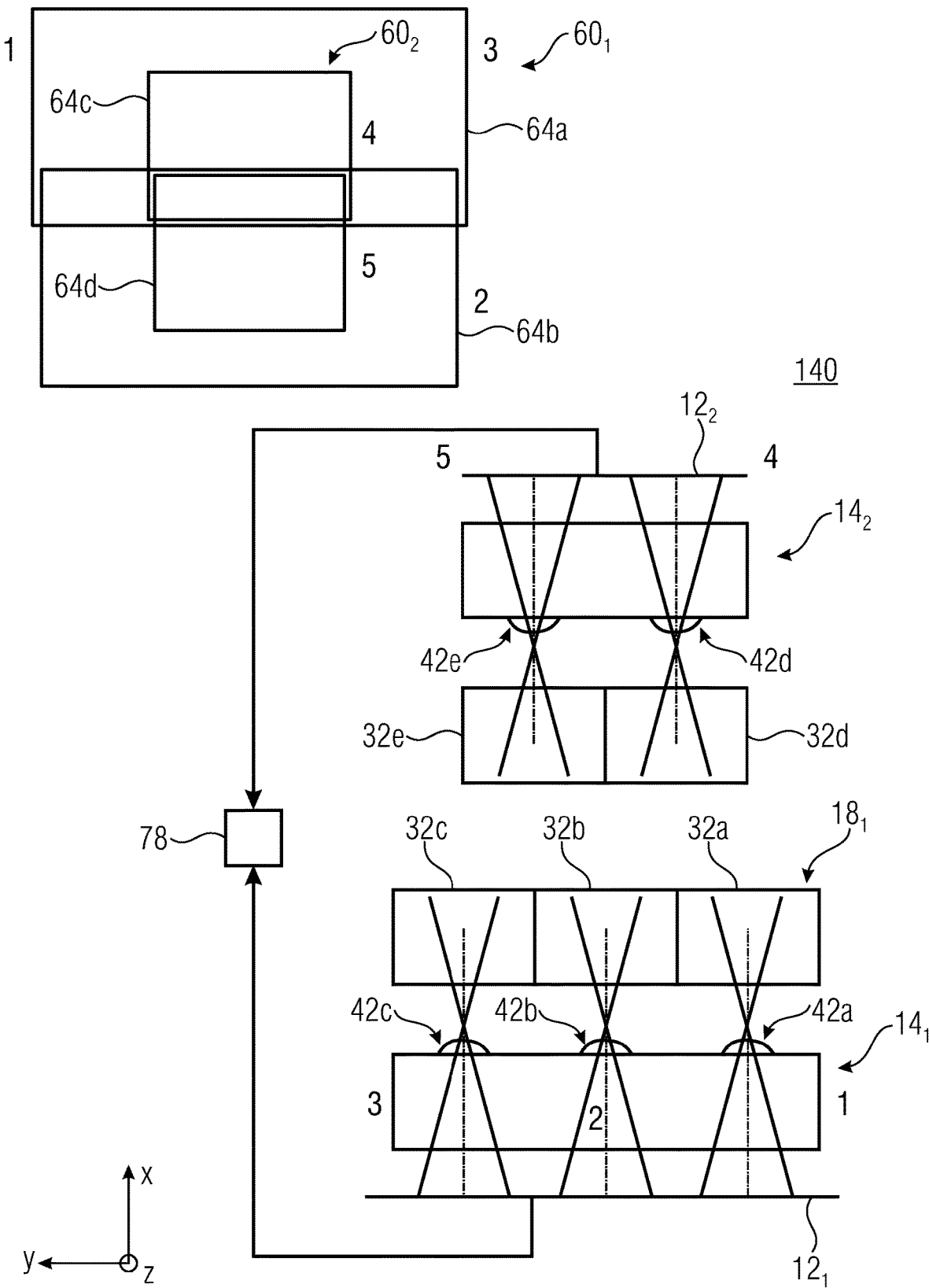
FIG. 14 shows a schematic top view of a multi-aperture imaging device according to an embodiment, wherein optical channels are arranged in two opposite optical channels.

FIG. 14 shows a schematic top view of a multi-aperture imaging device 140 according to an embodiment, wherein optical channels 42a-42e are arranged in a mutual linear array $14_1$ arranged opposite to a linear array $14_2$ including the optical channels 42d and 42e, for example. A corresponding deflection of the optical paths towards the partial fields of view 64a and 64d of the total fields of view $60_1$ and $60_2$ may be carried out by means of the beam-deflecting elements 32a-32e arranged in one or several beam-deflecting means. Grouping the optical channels on the basis of the association to the total fields of view $60_1$ and $60_2$ is selected as an example and describes an advantageous implementation. However, embodiments are not limited thereto, but relate to any arrangement of the optical channels in the different arrays.

The optical channels described herein may be respectively arranged in a same plane so that a dimension of the multi-aperture imaging devices along the z direction may be kept as small as possible. For example, the arrays described herein are arranged with a single line so that different arrays, such as the array $14_1$ and $14_2$—which may also be referred to as partial arrays—are overall arranged in the same plane and each form one line, even if these lines extend in parallel to each other and face each other.

The oppositely arranged arrays $14_1$ and $14_2$ may be arranged symmetrically or centered with respect to each other so that, e.g., they are opposite to each other within the arrays and/or the beam-deflecting areas even if optics of different arrays $14_1$ and $14_2$ are shifted with respect to each other, as is exemplarily described in connection with the multi-aperture imaging device 120.

Figure 15:
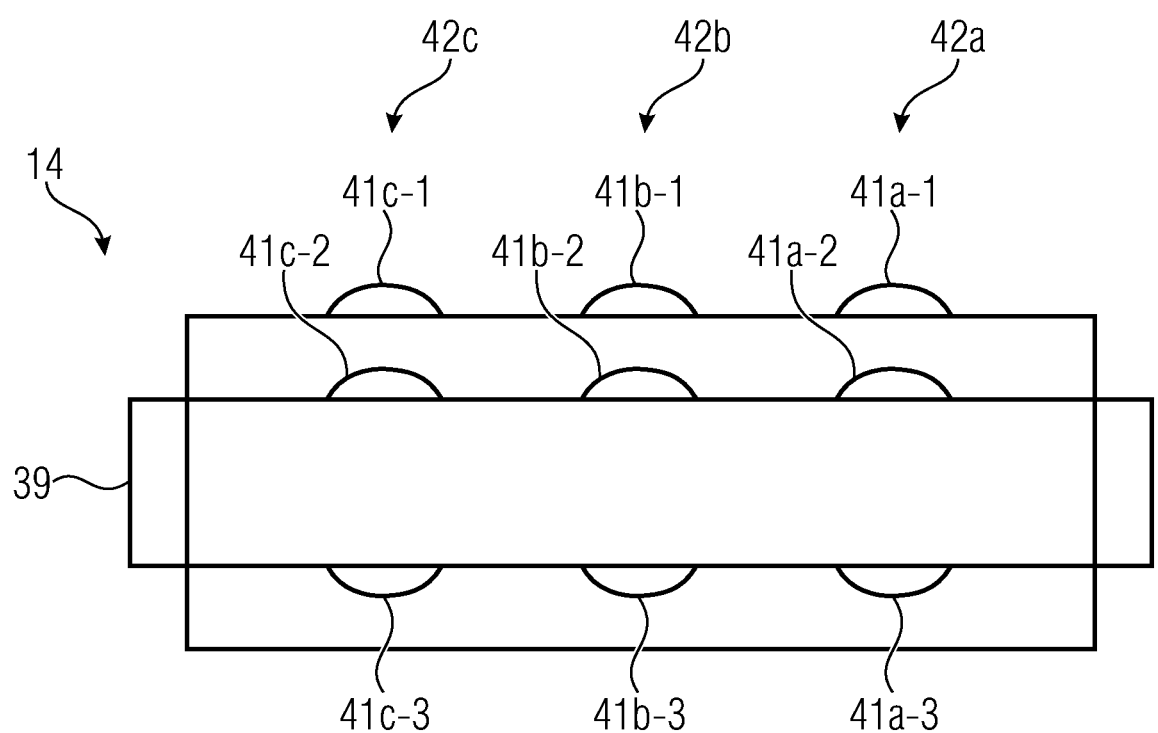
FIG. 15 shows a schematic top view of an array of optical channels according to an embodiment, comprising a mutual substrate for several optical channels.

FIG. 15 shows a schematic top view of an inventive array 14, which may include the optical channels 42a-42c, but may also comprise different, particularly additional, optical channels. In the array 14, which is implemented as a linear array along a line-extension direction, e.g. y, the optical channels 42a-42c are adjacently arranged. The array may comprise the carrier 39 implemented to mechanically fix at least parts of optics of the optical channels 42a-42c. Thus, for example, on all main sides of the carrier 39, optical elements, such as lenses or diffractive elements or the like, 41a-2 and 41a-3 of the optical channel 42a and/or optical elements 41b-2 and/or 41b-3 of the optical channel 42b and/or optical elements 41c-2 and/or 41c-3 of the optical channel 42*c* may be arranged in a mechanically fixed manner. Alternatively or additionally, it is possible to attach further mechanical elements such as lens holders or the like at the carrier 39, where optical elements 41*a*-1, 41*b*-1 and/or 41*c*-1 of the optical channels 42*a*-42*c* may then be arranged. This enables a mutual movement of the optics and an approximately unvaried relative position of the optics with respect to each other, which is advantageous. The optical channels 42*a*-42*c* may extend through the carrier 39, and the carrier 39 may be implemented in a transparent manner, e.g. by using a glass material or polymer material. Alternatively, the carrier 39 may at least comprise transparent areas through which the optical channels 42*a*-42*c* extend, transparent referring to the wave-length range determined for the optical channels 42*a*-42*c*.

The described multi-aperture imaging devices 110, 120, 130$_1$ to 130$_4$ and 140 are independent from each other and may be easily combined individually with the described embodiments of the optical image stabilization and/or focusing. Embodiments are implemented such that actuators of the image stabilizer and/or the focusing means are at least partially located between the planes 63*a* and 63*b*, as is described in connection with FIG. 5*c*.

In other words, multi-aperture cameras may be implemented according to a principle of channel-by-channel division of the total field of view and, compared to conventional cameras, may comprise the advantage of reducing the installation height (in the z direction). To this end, several imaging channels that are adjacently arranged may be provided. Higher numbers of components and greater installation efforts for realizing the channels increases the price and size of the structure. This means that the space requirement increases in the x/y direction. In the embodiments described herein, arrangements in which the total field of view is captured completely by two groups of channels each are varied and four channels are used to this end for the two partial fields of view, leading to the total field of view being imaged completely and information with respect to the depth arrangement of the object space being available for the entire field of view, so that a number of optical channels is reduced. In order to reduce the installation space and to use a smaller number of components, in the embodiments described, a group of channels captures completely the total field of view; however, a further group only captures a part thereof. Thus, the groups have a different number of channels and may be implemented such that optical channels are directed to matching partial fields of view. In a simple realization, which is advantageous, the first group has only two channels (for example on the top side and the bottom side, or on the right side and the left side) and the second group has only one channel (only on the top side or only on the bottom side/only on the right side or on the left side). The image data is fully available for the entire field of view. Depth information is available only for the part that is seen or imaged by two channels.

An arrangement of the order top/bottom/top or bottom/top/bottom, or equivalently right/left, is relevant, so that the resulting stereo pair encloses or includes the channel that samples the partial field of view only once. Alternatively, other arrangements are possible, e.g. bottom/bottom/top and the like.

An additional depth sensor such as a time-of-flight/structured light or additional stereo data may be used for depth information for the entire field of view.

Embodiments make it possible to avoid occlusion effects together with configuring small cameras. The single-channel image is not subject to parallax and may be used as a reference image. A two-channel image is free of parallaxes only at infinite distance in the object area. If the distance is finite or short, parallax occurs, preventing stitching. This may be obtained by twice sampling the additional object area to be stitched.

A centrally arranged unprocessed image may be supplemented by the outer images that show parallax in the optical channels, but together may compensate or fill up occlusions.

In a further aspect of the embodiments described herein, a third group of optical channels is provided, advantageously two channels that, in addition to the first group with a complete field of view (advantageously two channels) and the second group with only a partial field of view (advantageously only one channel), cover a further total field of view by capturing partially overlapping partial fields of view. The further total field of view may at least partially overlap with the first total field of view, wherein a full overlap of the one and the other total field of view advantageously occurs, i.e. the one total field of view is a section of the other total field of view. This may signify a full overlap in which the total fields of view have different sizes. For example, this may be a zoom structure of the additional channels, as is exemplarily described in FIG. 14; however, it may also be a wide-angle structure. In this case, the channels of the third group enclose the first and the second groups.

These embodiments may be combined optionally and individually with an orthogonality of a line vector of the array to a vector of the partial image fields of the first group. Furthermore, an implementation of a continuous substrate for all channels or individual modules of the array may be carried out. Tilting the beam transformation means/beam-deflecting means for changing the viewing direction, two-sided mirroring, and/or a wedge-shaped design may be provided. Image stabilization by means of a translation of the array with respect to the image sensor in combination with a rotation of the beam-deflecting means may also be provided. Drives for focusing means/stabilization in the z direction may be provided and are advantageously implemented such that they are not larger than the expansion of the multi-aperture imaging device in the z direction specified by the optic, which is described with respect to the virtual cuboid of the relevant planes 63*a* and 63*b*. A channel-individual adaption of the image, in particular of the focus positions, may be carried out by adaptive lenses. This means that the optic of at least one optical channel includes adaptive lenses, whereas the multi-aperture imaging device comprises lens control means configured to adjust an optical property of the adaptive lenses. For example, this includes a focal length, a wavelength range of wavelengths that are transmitted or filtered-out, a refractive index, or the like.

Embodiments make it possible to reduce the number of channels, resulting in low manufacturing costs and a small installation space requirement of the footprint in the x/y direction. In addition, high-quality imaging is made possible.

In particular, embodiments may be used in the area of multi-aperture imaging systems in mobile means of the smartphone, but also in the automotive area or in machine imaging (machine division).

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Multi-aperture imaging device, comprising:
an image sensor unit with a plurality of image sensor regions;
a plurality of optical channels, wherein each optical channel comprises an optic for imaging a partial field of view of a total field of view onto an image sensor area of the image sensor unit associated with the optical channel; wherein the partial field of view of an optical channel corresponds to an object area captured with the optics of the optical channel along a single optical path of the optical channel defined by the optics;
wherein the plurality of optical channels is configured to image the total field of view completely; and
wherein a first partial field of view of the total field of view and a second partial field of view of the total field of view are captured by a different number of optical channels.

2. Multi-aperture imaging device according to claim 1, further comprising:
an image evaluation unit, implemented in hardware and/or software, configured to acquire image information based on images of the plurality of partial fields of view from the plurality of image sensor areas and to combine a corresponding plurality of partial images in order to acquire a total image of the total field of view so that the total image is based on a different number of partial images in different total image areas.

3. Multi-aperture imaging device according to claim 2, wherein the image evaluation unit is configured to combine a first image information based on a combination of a first image of the first partial field of view and a second image of the first partial field of view in order to acquire depth information for the first partial field of view, and to acquire the total image based on aligning the first image information with respect to a second image information, wherein the second image information is acquired by means of an individual optical channel.

4. Multi-aperture imaging device according to claim 1, comprising exactly three optical channels configured to image the total field of view completely by means of the first partial field of view and the second partial field of view.

5. Multi-aperture imaging device according to claim 1, wherein the first partial field of view is imaged by exactly two optical channels and the second partial field of view is imaged by a single optical channel.

6. Multi-aperture imaging device according to claim 5, wherein the plurality of optical channels is adjacently arranged in an array of optical channels, and an optical channel for imaging the second partial field of view is arranged between two optical channels for imaging the first partial field of view in the array.

7. Multi-aperture imaging device according to claim 5, wherein a first optic of a first optical channel for imaging the second partial field of view is arranged opposite to a second optic of a second optical channel and a third optic of a third optical channel for imaging the first total field of view;
wherein the multi-aperture imaging device comprises a beam-deflecting unit, implemented in hardware and/or software, for deflecting an optical path of the first, second, and third optical channels, said unit being arranged between the first optic on the one hand and the second and third optics on the other hand.

8. Multi-aperture imaging device according to claim 1, wherein the optical channels for imaging the first partial field of view are adjacently arranged and are spaced apart from an optical channel for imaging the second partial field of view.

9. Multi-aperture imaging device according to claim 1, wherein the optical channels for imaging the first partial field of view are adjacently arranged and are arranged opposite to an optical channel for imaging the second partial field of view.

10. Multi-aperture imaging device according to claim 1, wherein the total field of view is a first total field of view; and wherein the plurality of optical channels comprises at least one optical channel for imaging a third partial field of view of a second total field of view and one optical channel for imaging a fourth partial field of view of the second total field of view, wherein the second total field of view comprises an overlap with the first total field of view.

11. Multi-aperture imaging device according to claim 10, wherein the second total field of view is a section of the first total field of view; or wherein the first field of view is a section of the second total field of view.

12. Multi-aperture imaging device according to claim 10, with an image evaluation unit, implemented in hardware and/or software, configured to acquire image information based on images of the plurality of partial fields of view from the plurality of image sensor areas and to create a total image of the second total field of view using image information acquired by image sensor areas associated with optical channels for imaging the first total field of view.

13. Multi-aperture imaging device according to claim 10, wherein the optical channels for imaging the first total field of view and optical channels for imaging the second total field of view are arranged in a mutual linear array of optical channels.

14. Multi-aperture imaging device according to claim 13, wherein optical channels for capturing the second total field of view are spaced apart at least from one optical channel for capturing the first total field of view.

15. Multi-aperture imaging device according to claim 10, wherein the optical channels for imaging the first total field of view are arranged in a first linear array of optical channels, and wherein optical channels for imaging the second total field of view are arranged in a second linear array of optical channels, wherein the first array and the second array are arranged opposite to each other.

16. Multi-aperture imaging device according to claim 1, wherein at least one first and one second optical channel of the plurality of optical channels are adjacently arranged in a mutual array of optical channels.

17. Multi-aperture imaging device according to claim 16, wherein the array comprises a mutual carrier where at least part of the optics of the first and second optical channels is mechanically fixed, and wherein the optical channels extend through the carrier.

18. Multi-aperture imaging device according to claim 1, wherein the first partial field of view and the second partial field of view are arranged adjacent to each other in the total field of view and partially overlap with each other.

19. Multi-aperture imaging device according to claim 1, wherein the plurality of optical channels is arranged in a mutual plane in at least one line extending along a first direction;

and centers of the plurality of partial fields of view are adjacent in a second direction in order to form a one-dimensional array, and are arranged perpendicularly to the first direction.

20. Multi-aperture imaging device according to claim 1, comprising a beam-deflecting unit, implemented in hardware and/or software, for deflecting an optical path of the plurality of optical channels.

21. Multi-aperture imaging device according to claim 20, wherein the beam-deflecting unit is formed in an array of facets, wherein one facet is associated with each optical channel, and wherein each of the facets comprises the first beam-deflecting area and the second beam-deflecting area, wherein the facets are formed as mirrors that are reflective on both sides.

22. Multi-aperture imaging device according to claim 21, configured to deflect, in a first state, the plurality of optical channels with a first main side into a first direction; and to deflect, in a second state, the plurality of optical channels with a second main side into a second direction; wherein the beam-deflecting unit is rotationally movable between the first state and the second state.

23. Multi-aperture imaging device according to claim 1, wherein at least one optical channel is part of an imaging module that comprises a combined unit comprising the optic of the optical channel and the associated image sensor area.

24. Multi-aperture imaging device according to claim 23, wherein one module comprises at least two optical channels, wherein the image sensor areas and/or the optics of the optical channels comprise a mutual substrate.

25. Multi-aperture imaging device according to claim 1, wherein the plurality of optical channels comprises a first group of optical channels; and comprises a second group with at least one optical channel, wherein the first group is configured to capture the total field of view completely, and wherein the second group is configured to capture the total field of view incompletely.

26. Multi-aperture imaging device according to claim 1, comprising:

a beam-deflecting unit, implemented in hardware and/or software, for deflecting an optical path of the optical channels;

an optical image stabilizer configured to generate a relative movement between the image sensor unit, the optics of the optical channels and the beam-deflecting unit based on a translational movement between the image sensor unit and the optics in parallel or antiparallel to a line-extension direction along which the optics are arranged, and/or based on a rotation of the beam-deflecting unit around a rotational axis, in order to enable optical image stabilization.

27. Multi-aperture imaging device according to claim 26, wherein the image stabilizer comprises at least one actuator and is arranged such that it is arranged at least partially between two planes spanned by sides of a cuboid, wherein the sides of the cuboid are aligned in parallel with respect to each other as well as with respect to a line-extension direction of an array of the optical channels and a part of the optical paths of the optical channels between the image sensor unit and the beam-deflecting unit, and whose volume is as small as possible but still comprises the image sensor unit, the array and the beam-deflecting unit.

28. Multi-aperture imaging device according to claim 1, comprising a focusing unit that comprises an actuator for providing a relative movement between an optic of one of the optical channels and the image sensor unit.

29. Multi-aperture imaging device according to claim 28, comprising a beam-deflecting unit, implemented in hardware and/or software, for deflecting an optical path of the optical channels;

wherein the focusing unit comprises at least one actuator for adjusting a focus of the multi-aperture imaging device, wherein the focusing unit is arranged such that it is arranged at least partially between two planes spanned by sides of a cuboid, wherein the sides of the cuboid are aligned in parallel with respect to each other as well as with respect to a line-extension direction of an array of the optical channels and a part of the optical path of the optical channels between the image sensor unit and the beam-deflecting unit, and whose volume is as small as possible but still comprises the image sensor unit, the array and the beam-deflecting unit.

30. Multi-aperture imaging device according to claim 1, wherein the optic of at least one optical channel comprises adaptive lenses; wherein the multi-aperture imaging device comprises a lens control unit, implemented in hardware and/or software, configured to adjust an optical property of the adaptive lens.

31. Multi-aperture imaging device according to claim 10, wherein the first total field of view provided for one of a zoom view and a wide-angle view of the second total field of view; or wherein the second total field of view provided for one of a zoom view and a wide-angle view of the first total field of view.

\* \* \* \* \*